US012737730B2

(12) United States Patent
Hassan et al.

(10) Patent No.: US 12,737,730 B2
(45) Date of Patent: Sep. 15, 2026

(54) ENHANCED AUTOMATION OF CONFLICT RECONCILIATION FOR OVERLAPPING MEETINGS WITH THE SAME ROOM

(71) Applicant: Microsoft Technology Licensing, LLC, Redmond, WA (US)

(72) Inventors: Amer Aref Hassan, Kirkland, WA (US); Gareth Lyndon Eadred Bridges, Duvall, WA (US); Shaun Paul Dunning, San Clemente, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/759,651

(22) Filed: Jun. 28, 2024

(65) Prior Publication Data

US 2026/0004254 A1 Jan. 1, 2026

(51) Int. Cl.
*G06Q 10/00* (2026.01)
*G06Q 10/1093* (2023.01)
*G06Q 10/02* (2012.01)

(52) U.S. Cl.
CPC ......... *G06Q 10/1093* (2013.01); *G06Q 10/02* (2013.01)

(58) Field of Classification Search
CPC ...................................................... G06Q 10/02
See application file for complete search history.

(56) References Cited

U.S. PATENT DOCUMENTS 8,077,852 B1 12/2011 Das
8,831,198 B1 9/2014 Abraham
11,748,714 B1 * 9/2023 Gada ................ G06Q 10/06311 705/7.19
2003/0149605 A1 * 8/2003 Cragun ................ G06Q 10/109 705/7.13

(Continued)

OTHER PUBLICATIONS

R. Rodrigues Pires de Mello, T. Ângelo Gelaim and R. Azambuja Silveira, "Negotiation Strategies in Multi-Agent Systems for Meeting Scheduling," 2018 XLIV Latin American Computer Conference (CLEI), Sao Paulo, Brazil, 2018, pp. 242-250 (Year: 2018).*

(Continued)

*Primary Examiner* — Matheus Ribeiro Stivaletti
(74) *Attorney, Agent, or Firm* — Scott Y. Shigeta; Newport IP, LLC

(57) ABSTRACT

The disclosed techniques are directed to a system that manages use scenarios implementing and managing deliberate overlapping meetings conference calls. For example, an executive may organize hybrid meetings by scheduling an all-day meeting, e.g., 9 AM to 5 PM, in a conference room, and also scheduling multiple sub-meetings with and joined by different attendees by coming to the conference room and/or joining from conference calls. For example, first sub-meetings may be scheduled from 9 AM to 11 AM and scheduled for the same conference room as the all-day meeting. Instead of rejecting the request to reserve the conference room for the sub-meeting, which in existing systems would occur because of the reservation set by the all-day meeting, the system accepts the request to reserve the (Continued)

conference room for the sub-meeting. The system also notifies all invitees of each sub-meeting of the conference room reservation.

20 Claims, 48 Drawing Sheets

(56) References Cited

U.S. PATENT DOCUMENTS

| | | | | |
|---|---|---|---|---|
| 2007/0265903 | A1* | 11/2007 | Blair | G06Q 10/109 705/7.19 |
| 2013/0335513 | A1 | 12/2013 | Broadworth | |
| 2014/0222907 | A1 | 8/2014 | Seligmann | |
| 2014/0289326 | A1 | 9/2014 | Mccormack | |
| 2015/0092615 | A1 | 4/2015 | Frankel | |
| 2016/0234264 | A1 | 8/2016 | Coffman et al. | |
| 2018/0012191 | A1 | 1/2018 | Rosenberg | |
| 2018/0365655 | A1* | 12/2018 | Grødum | G06Q 10/063114 |
| 2020/0394570 | A1* | 12/2020 | Ge | G06F 16/24565 |

OTHER PUBLICATIONS

Non-Final Office Action mailed on Nov. 19, 2025, in U.S. Appl. No. 18/759,654, 16 pages.
Notice of Allowance mailed on Sep. 23, 2025, in U.S. Appl. No. 18/759,658, 18 Pages.
Notice of Allowance mailed on May 5, 2026, in U.S. Appl. No. 18/759,654, 18 pages.

* cited by examiner

101

8 AM
9 AM
10 AM
11 AM
12 PM
1 PM
2 PM
3 PM
4 PM
5 PM

105
Ship Room
Teams Meeting: Conf Room 30/25
Serena Davis

106A
Ship Room
Teams Meeting: Conf Room 30/25
Serena Davis

106B
Ship Room
Teams Meeting: Conf Room 30/25
Serena Davis

106C
Ship Room
Teams Meeting: Conf Room 30/25
Serena Davis

REQUEST 111A

FIRST MEETING OBJECT 105
NAME: SHIP ROOM
DATE: 5/20/24 9 AM TO 5 PM
ROOM: 30/25
ROOM STATUS: ACCEPTED
INVITEES:
USER A ORGANIZER

PRIMARY MEETING
109

REQUEST 111B

SECOND MEETING OBJECT 106A
NAME: SHIP ROOM
DATE: 5/20/24 9 AM TO 11 AM
ROOM: 30/25
ROOM STATUS: ACCEPTED
INVITEES:
USER A ORGANIZER
USER B AUDIENCE
USER D AUDIENCE
USER E AUDIENCE

SUB-MEETING
109

REQUEST 111C

THIRD MEETING OBJECT 106B
NAME: SHIP ROOM
DATE: 5/20/24 11 AM TO 1 PM
ROOM: 30/25
ROOM STATUS: ACCEPTED
INVITEES:
USER A ORGANIZER
USER B AUDIENCE
USER C AUDIENCE
USER F AUDIENCE

SUB-MEETING
109

...

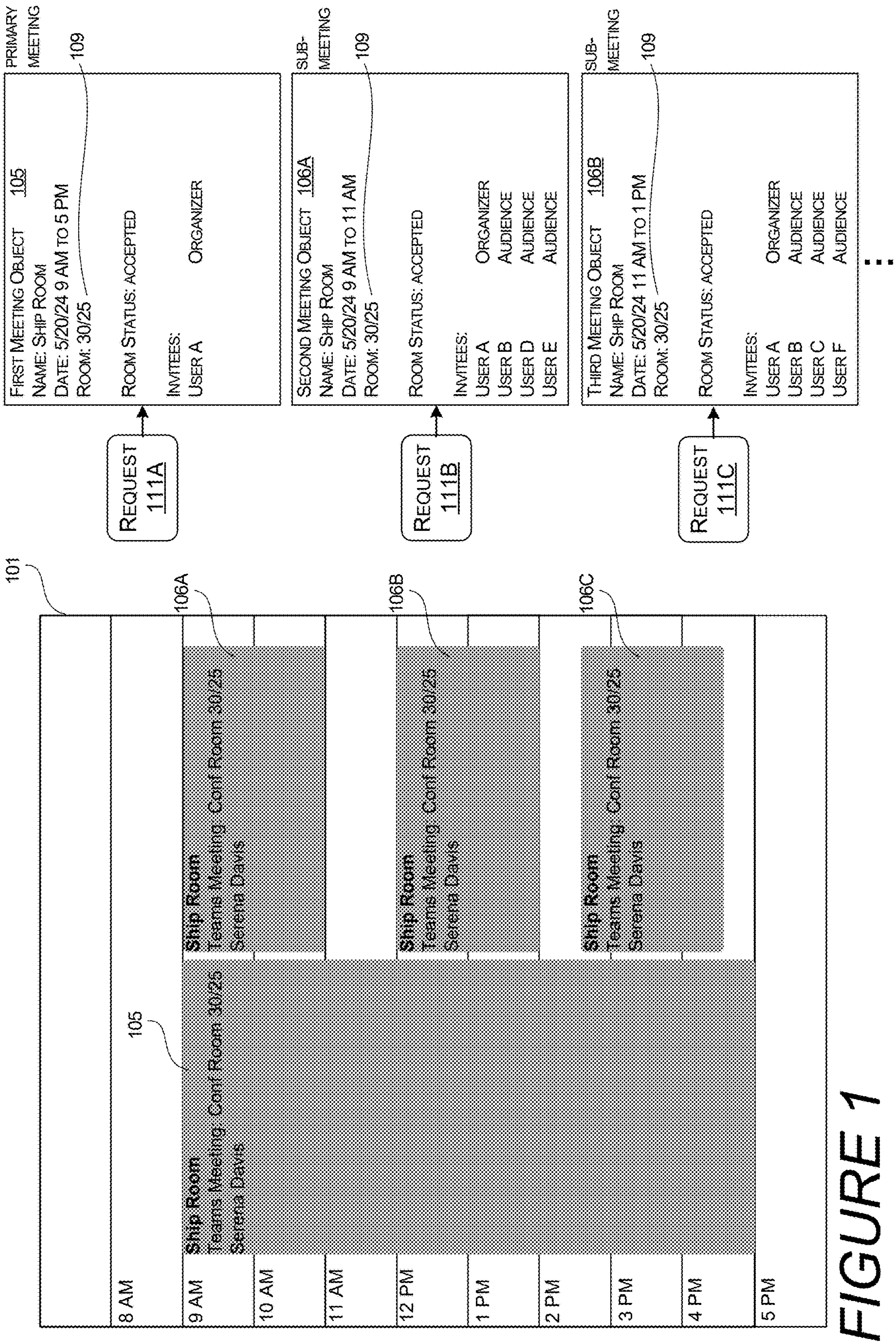

FIGURE 1

System Displays Room Status to Invitees

File Meeting Tracking Help
NAME: SHIP ROOM
DATE: 5/20/24 9 AM TO 5 PM
ROOM: 30/25
STATUS:
ROOM 30/25: ACCEPTED
USER A ORGANIZER NA
USER B AUDIENCE ACCEPTED
USER C AUDIENCE ACCEPTED

112

File Meeting Tracking Help
NAME: SHIP ROOM
DATE: 5/20/24 9 AM TO 11 AM
ROOM: 30/25
STATUS:
ROOM 30/25: ACCEPTED
USER A ORGANIZER NA
USER B AUDIENCE ACCEPTED
USER D AUDIENCE ACCEPTED

112

File Meeting Tracking Help
NAME: SHIP ROOM
DATE: 5/20/24 11 AM TO 1 PM
ROOM: 30/25
STATUS:
ROOM 30/25: ACCEPTED
USER A ORGANIZER NA
USER B AUDIENCE ACCEPTED
USER C AUDIENCE ACCEPTED

112

MEETING OBJECT 201
UI 210
11A
User A (10A)

MEETING OBJECT 201
UI 210
Displayed on Devices for Users: A, B, D, E

MEETING OBJECT 201
UI 210
Displayed on Devices for Users: A, B, C, F

...

FIRST MEETING OBJECT 105
NAME: SHIP ROOM
DATE: 5/20/24 9 AM TO 5 PM
ROOM: 30/25
ROOM STATUS: ACCEPTED
INVITEES:
USER A ORGANIZER

PRIMARY MEETING

SECOND MEETING OBJECT 106A
NAME: SHIP ROOM
DATE: 5/20/24 9 AM TO 11 AM
ROOM: 30/25
ROOM STATUS: ACCEPTED
INVITEES:
USER A ORGANIZER
USER B AUDIENCE
USER D AUDIENCE
USER E AUDIENCE

SUB-MEETING

THIRD MEETING OBJECT 106B
NAME: SHIP ROOM
DATE: 5/20/24 11 AM TO 1 PM
ROOM: 30/25
ROOM STATUS: ACCEPTED
INVITEES:
USER A ORGANIZER
USER B AUDIENCE
USER C AUDIENCE
USER F AUDIENCE

SUB-MEETING

...

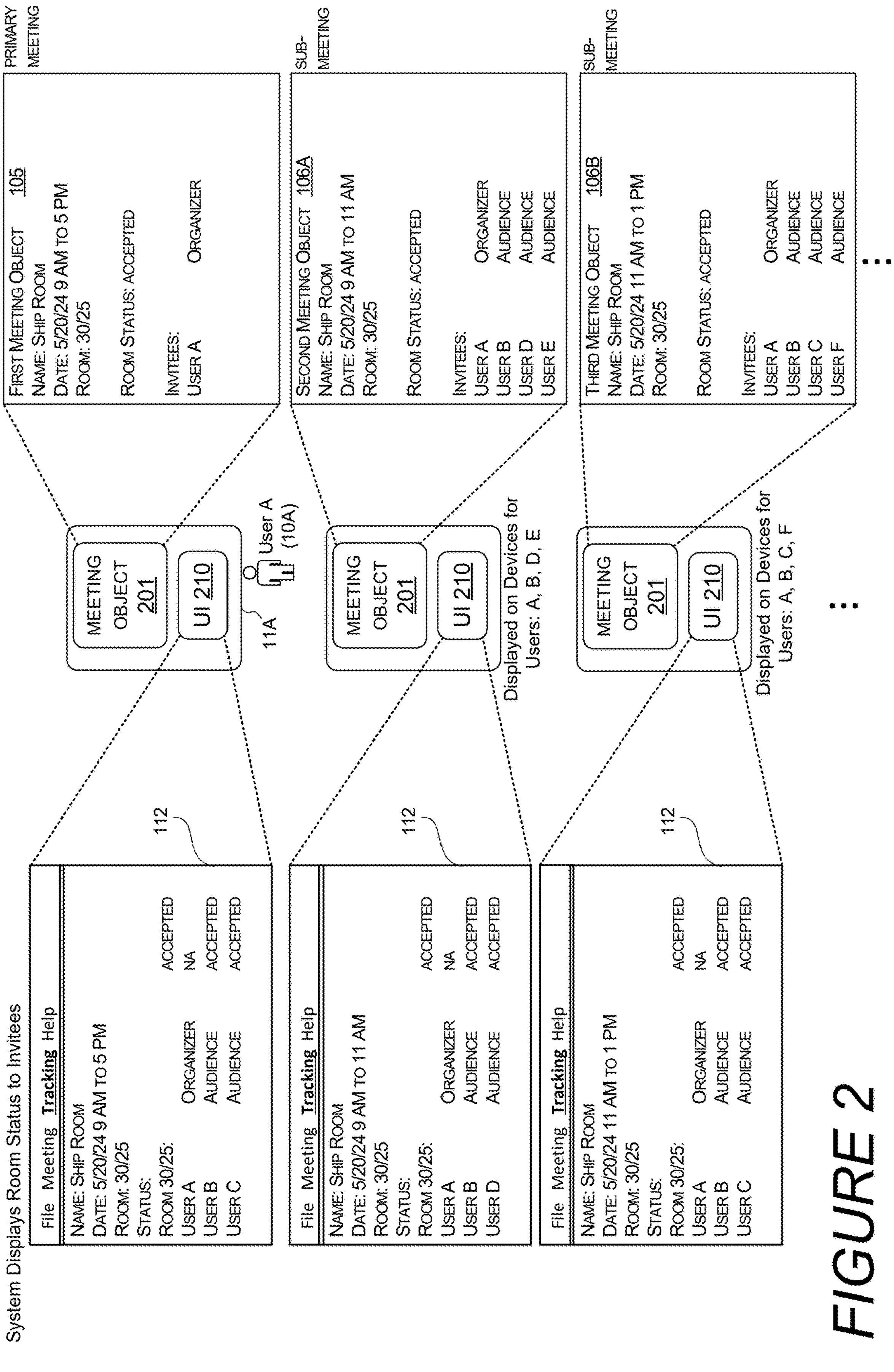

FIGURE 2

System Declines the request for a room if the overlapping meetings request access to the same room File Meeting Tracking Help
NAME: SHIP ROOM
DATE: 5/20/24 9 AM TO 5 PM
ROOM: 30/25
STATUS:
ROOM 30/25: ACCEPTED
USER A ORGANIZER NA
USER B AUDIENCE ACCEPTED
USER C AUDIENCE ACCEPTED MEETING OBJECT 201
UI 210
11A
User A (10A)

FIRST MEETING OBJECT 105
NAME: SHIP ROOM
DATE: 5/20/24 9 AM TO 5 PM
ROOM: 30/25
ROOM STATUS: ACCEPTED
INVITEES:
USER A ORGANIZER

File Meeting Tracking Help
NAME: SHIP ROOM
DATE: 5/20/24 9 AM TO 11 AM
ROOM: 30/25
STATUS:
ROOM 30/25: DECLINED
USER F ORGANIZER NA
USER B AUDIENCE ACCEPTED
USER D AUDIENCE ACCEPTED MEETING OBJECT 201
UI 210
Displayed on Devices for Users: B, D, E, F SECOND MEETING OBJECT 106A
NAME: SHIP ROOM
DATE: 5/20/24 9 AM TO 11 AM
ROOM: 30/25
ROOM STATUS: DECLINED
INVITEES:
USER F ORGANIZER
USER B AUDIENCE
USER D AUDIENCE
USER E AUDIENCE File Meeting Tracking Help
NAME: SHIP ROOM
DATE: 5/20/24 11 AM TO 1 PM
ROOM: 30/25
STATUS:
ROOM 30/25: DECLINED
USER D ORGANIZER NA
USER B AUDIENCE ACCEPTED
USER C AUDIENCE ACCEPTED MEETING OBJECT 201
UI 210
Displayed on Devices for Users: B, C, F, D THIRD MEETING OBJECT 106B
NAME: SHIP ROOM
DATE: 5/20/24 11 AM TO 1 PM
ROOM: 30/25
ROOM STATUS: DECLINED
INVITEES:
USER D ORGANIZER
USER B AUDIENCE
USER C AUDIENCE
USER F AUDIENCE

⋮

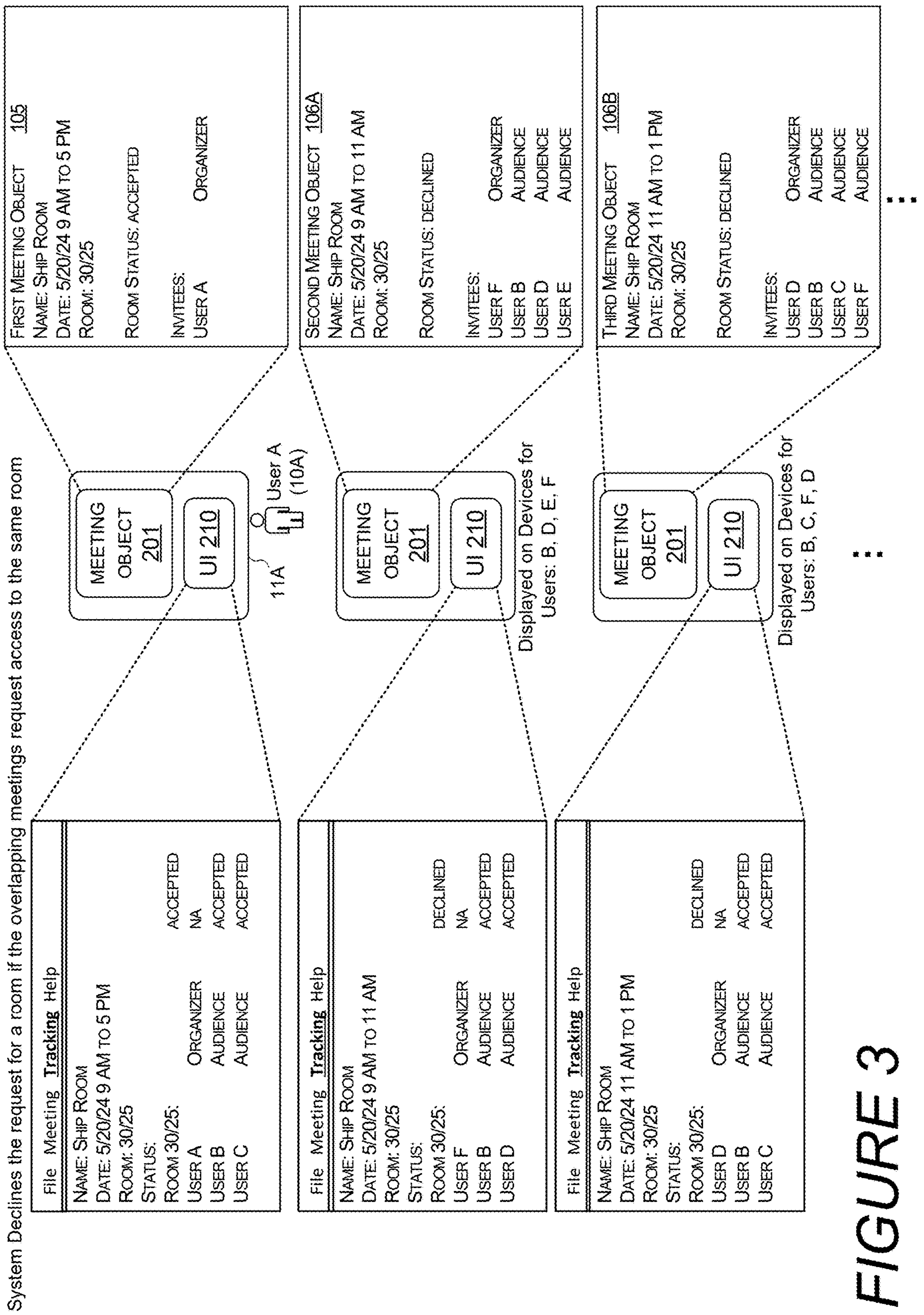

FIGURE 3

If an overlapping sub-meeting meets one or more criteria:
generate a sub-meeting object 106A with the same bridge information as the primary meeting
If an overlapping sub-meeting does not meet one or more criteria:
generate a sub-meeting object 106B with different bridge information than the primary meeting Determining that overlapping meetings are deliberate by a user input:
User A provides first input for a primary meeting, e.g., an all-day meeting to reserve a room.

<u>Determining that overlapping meetings are deliberate by a user input:</u>
In response to the first input for the primary meeting, system generates a primary meeting object with bridge information

DETAILS CHAT FILES +

TITLE SALES REVIEW MEETING

INVITEE USER A, USER B, USER D, USER E

LOCATION CONF ROOM 2/3425

START 10/2/25 9:00 AM END 10/2/25 5:00 PM

Save And Close

Room Reservation Meeting

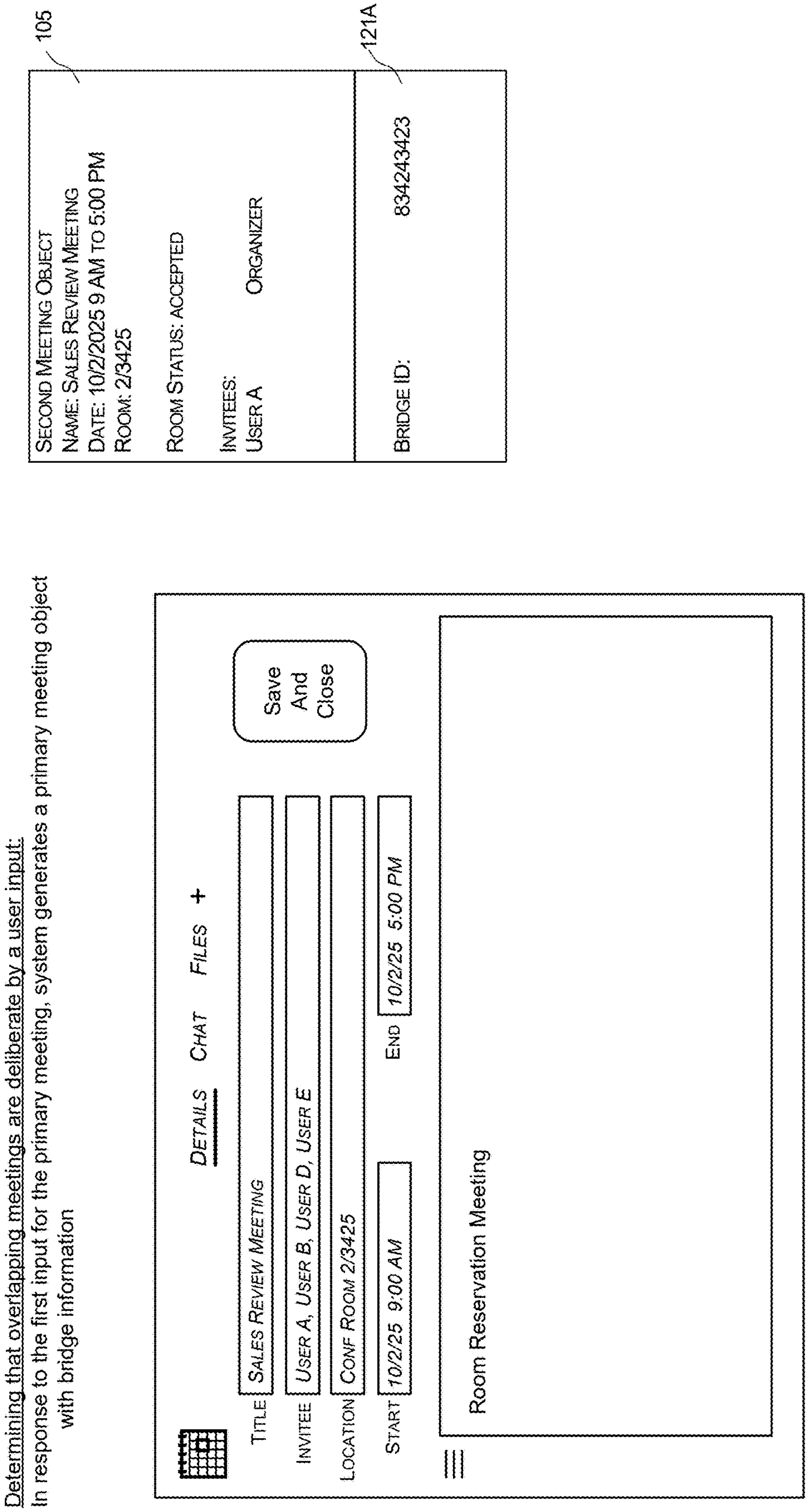

FIGURE 13B

Determining that overlapping meetings are deliberate by a user input:
User A provides second input for a sub-meeting, e.g., a two hour meeting that overlaps with the all-day meeting Determining that overlapping meetings are deliberate by a user input:
In response to the input for an overlapping meeting, system generates a prompt for user intent DETAILS CHAT FILES +
TITLE SALES REVIEW MEETING
INVITEE USER A, USER B, USER D, USER E
LOCATION CONF ROOM 2/3425
START 10/2/25 9:00 AM
END 10/2/25 11:00 AM
Save And Close
This meeting overlaps with another meeting scheduled for 9:00 AM to 5:00 PM
Use the Same Call Bridge
Use a Different Call Bridge
Edit Meeting
113
Q&A

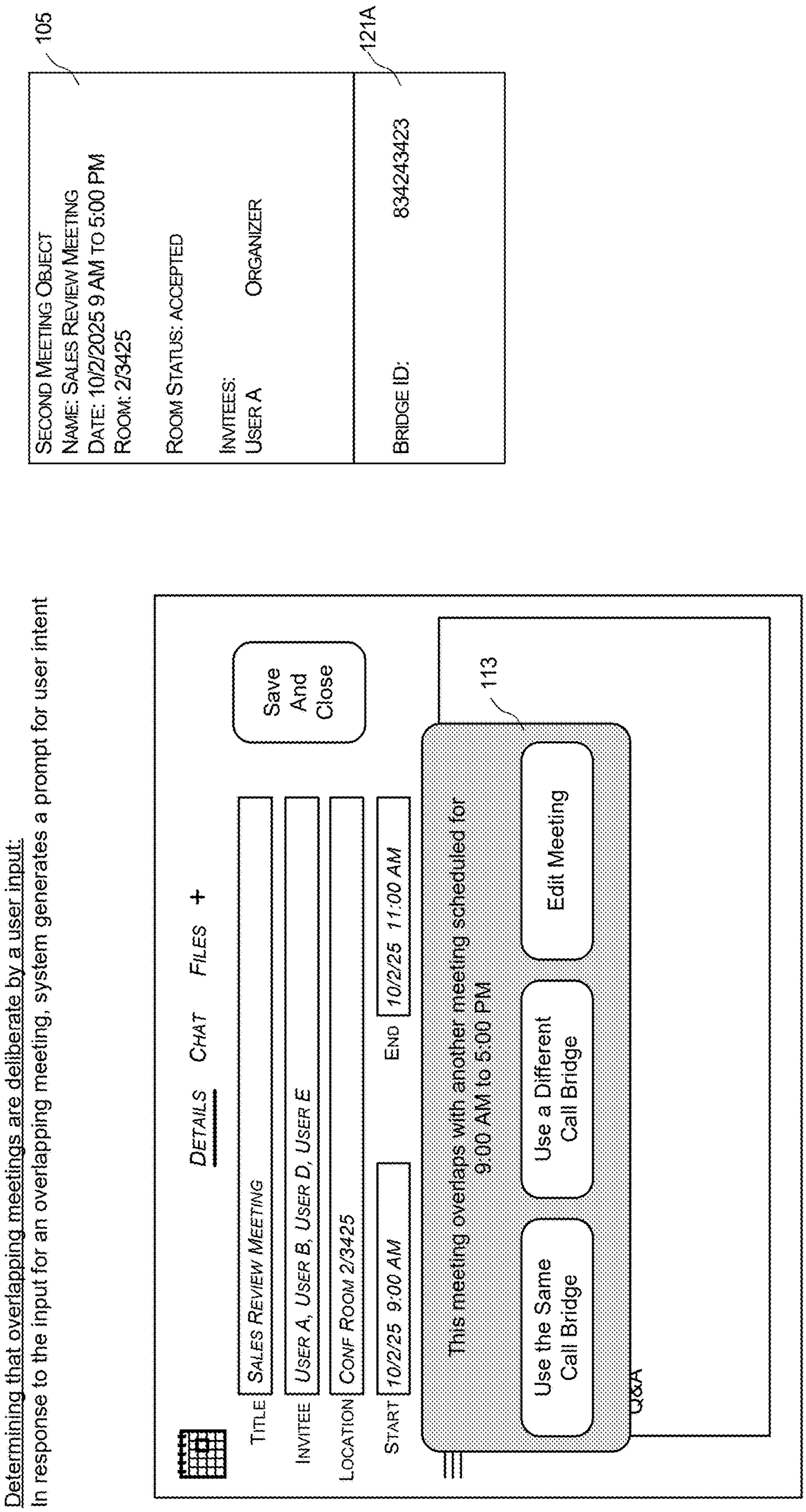

FIGURE 13D

Determining that overlapping meetings are deliberate by a user input:
In response to a user input indicating that overlap was deliberate, generate a sub-meeting object with the same bridge information as the primary meeting

DETAILS CHAT FILES +

TITLE SALES REVIEW MEETING
INVITEE USER A, USER B, USER D, USER E
LOCATION CONF ROOM 2/3425
START 10/2/25 9:00 AM END 10/2/25 11:00 AM

Save And Close

This meeting overlaps with another meeting scheduled for 9:00 AM to 5:00 PM

Use the Same Call Bridge
Use a Different Call Bridge
Edit Meeting

Q&A

PRIMARY MEETING

105

FIRST MEETING OBJECT
NAME: SALES REVIEW MEETING
DATE: 10/2/2025 9 AM TO 5:00 PM
ROOM: 2/3425

ROOM STATUS: ACCEPTED

INVITEES:
USER A ORGANIZER

121A

BRIDGE ID: 834243423

SUB-MEETING

106A

SECOND MEETING OBJECT
NAME: SHIP ROOM
DATE: 5/20/24 9 AM TO 11 AM
ROOM: 30/25

ROOM STATUS: ACCEPTED

INVITEES:
USER A ORGANIZER
USER B AUDIENCE
USER D AUDIENCE
USER E AUDIENCE

121A

BRIDGE ID: 834243423

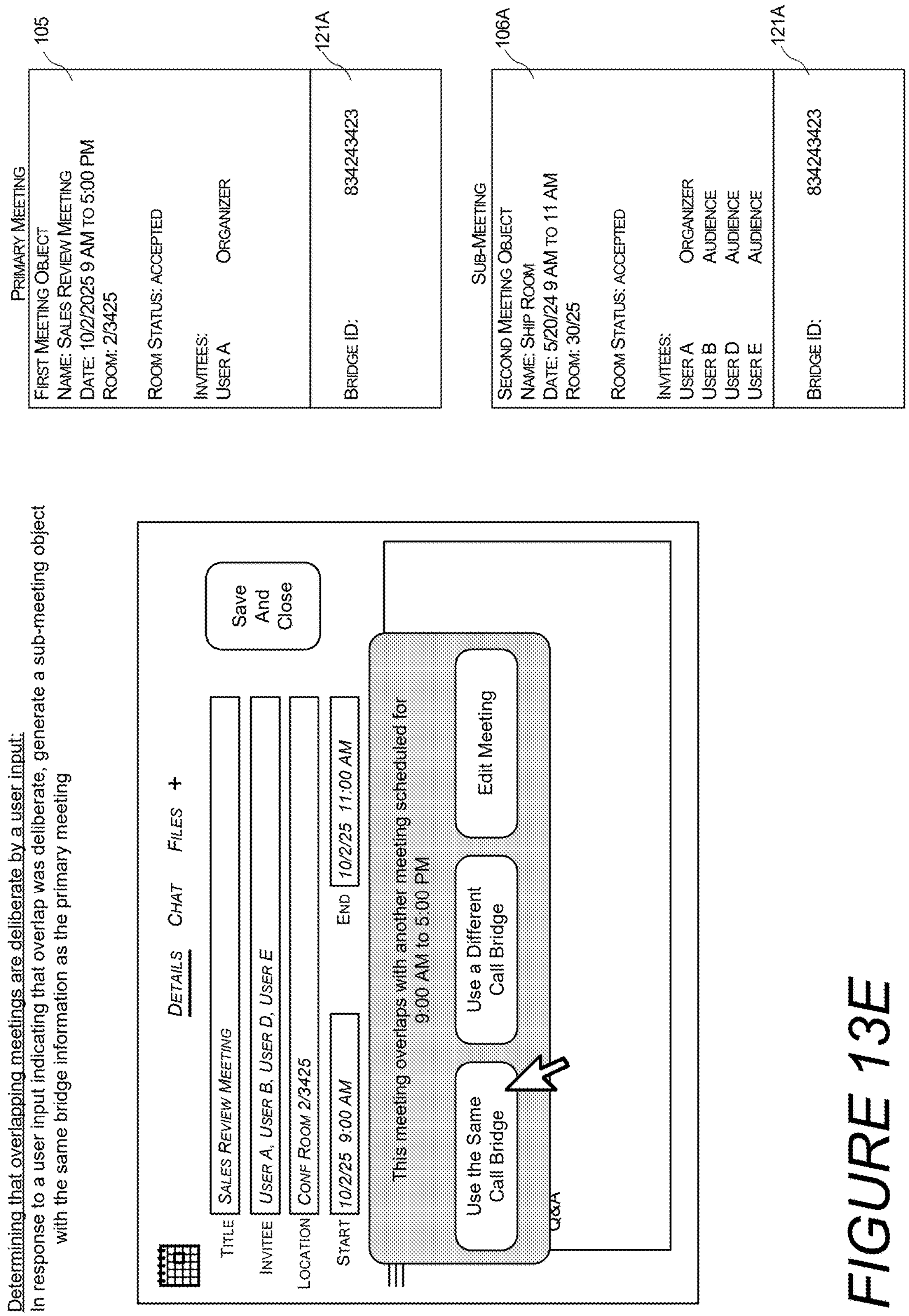

FIGURE 13E

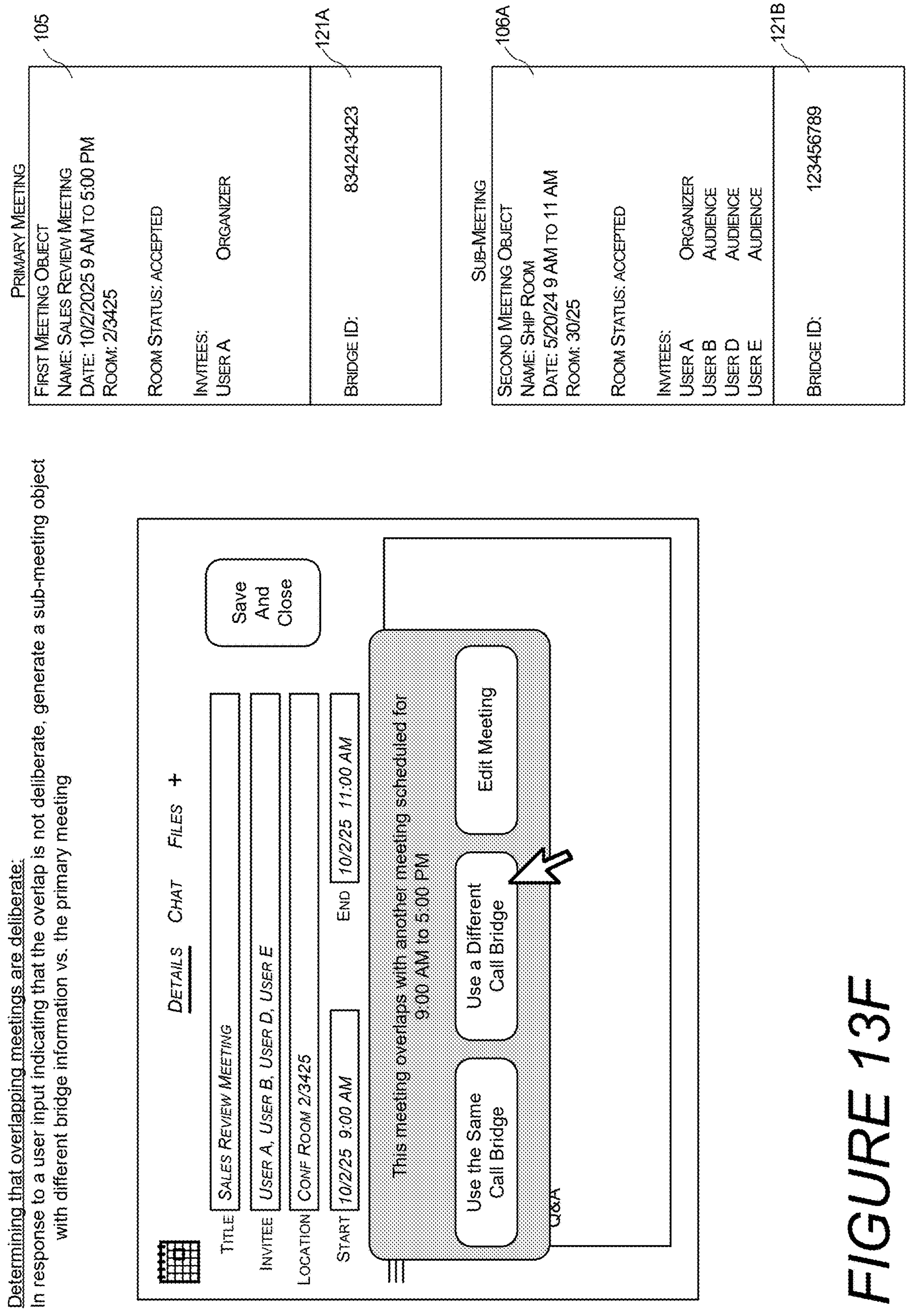

FIGURE 13F

Determining that overlapping meetings are deliberate:
In response to a user input indicating that the overlap is not deliberate, generate a sub-meeting object with different bridge information vs. the primary meeting

PRIMARY MEETING

FIRST MEETING OBJECT
NAME: SALES REVIEW MEETING
DATE: 10/2/2025 9 AM TO 5:00 PM
ROOM: 2/3425

ROOM STATUS: ACCEPTED

INVITEES:
USER A ORGANIZER

BRIDGE ID: 834243423

105
121A

SUB-MEETING

SECOND MEETING OBJECT
NAME: SHIP ROOM
DATE: 5/20/24 9 AM TO 11 AM
ROOM: 30/25

ROOM STATUS: ACCEPTED

INVITEES:
USER A ORGANIZER
USER B AUDIENCE
USER D AUDIENCE
USER E AUDIENCE

BRIDGE ID: 123456789

106A
121B

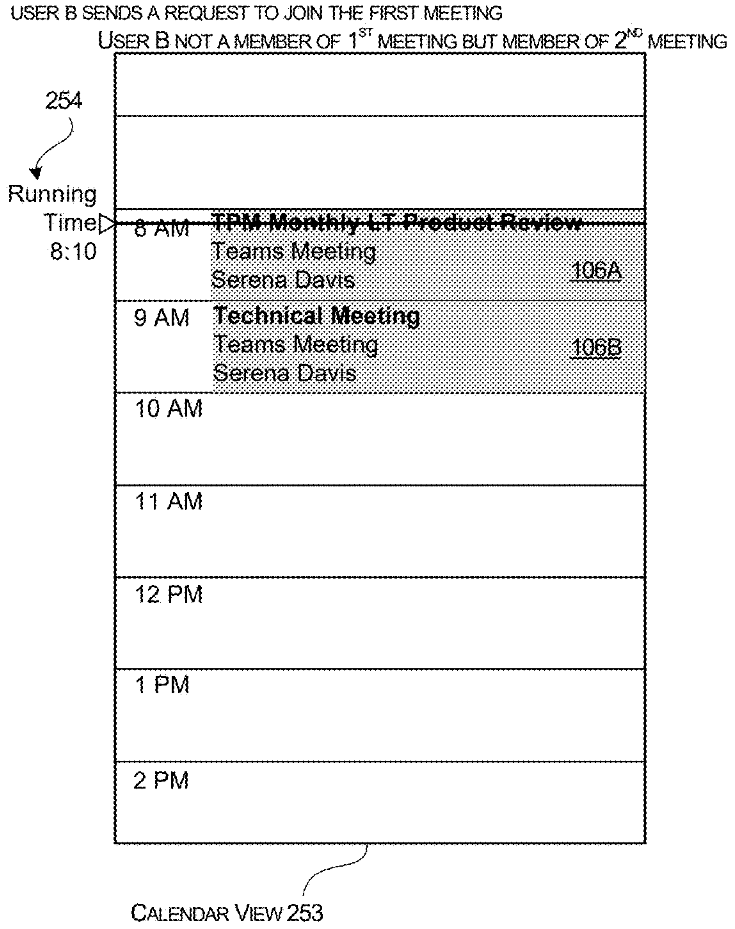

FIRST MEETING OBJECT 106A
NAME: TPM MONTHLY LT PRODUCT REVIEW
DATE: 5/20/24 8 AM TO 9 AM
ROOM: 30/25
BRIDGE CONFIGURATION: 800-555-1234, PIN 1234; MEETING ID: 5093498
ROOM STATUS: ACCEPTED

107A

| INVITEES: | ROLE | STATUS | BRIDGE ACCESS PERMISSIONS: |
|---|---|---|---|
| USER A | ORGANIZER | CONNECTED | ALL HOURS |
| USER B | AUDIENCE | INVITEE | 8 AM TO 9 AM |
| USER C | AUDIENCE | CONNECTED | 8 AM TO 9 AM |
| USER D | AUDIENCE | CONNECTED | 8 AM TO 9 AM |
| USER E | AUDIENCE | CONNECTED | 8 AM TO 9 AM |

SECOND MEETING OBJECT 106B
NAME: TECHNICAL MEETING
DATE: 5/20/24 9 AM TO 10 AM
ROOM: 30/25
BRIDGE CONFIGURATION: 800-555-1234, PIN 1234; MEETING ID: 5093498
ROOM STATUS: ACCEPTED

107B

| INVITEES: | ROLE | STATUS | BRIDGE ACCESS PERMISSIONS: |
|---|---|---|---|
| USER A | ORGANIZER | CONNECTED | ALL HOURS |
| USER B | AUDIENCE | INVITEE | 9 AM TO 10 AM |
| USER F | AUDIENCE | INVITEE | 9 AM TO 10 AM |
| USER G | AUDIENCE | INVITEE | 9 AM TO 10 AM |

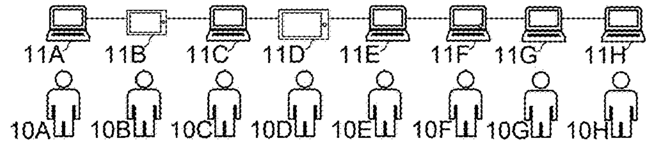

FIGURE 16A

OPERATING STATE DURING THE FIRST MEETING
THE COMMUNICATION SESSION IN A FIRST STATE DURING THE FIRST MEETING
PERMISSIONS ALLOW PEOPLE NAMED IN THE FIRST MEETING TO BE IN COMMUNICATION WITH ONE ANOTHER VIA AUDIO STREAMS AND/OR VIDEO STREAMS.
PERMISSIONS RESTRICT PEOPLE FROM JOINING IF THEY ARE NOT NAMED IN THE FIRST MEETING

IN RESPONSE TO USER B'S REQUEST TO JOIN THE CALL,
USER B JOINS SINCE THEY ARE A MEMBER OF THE FIRST MEETING

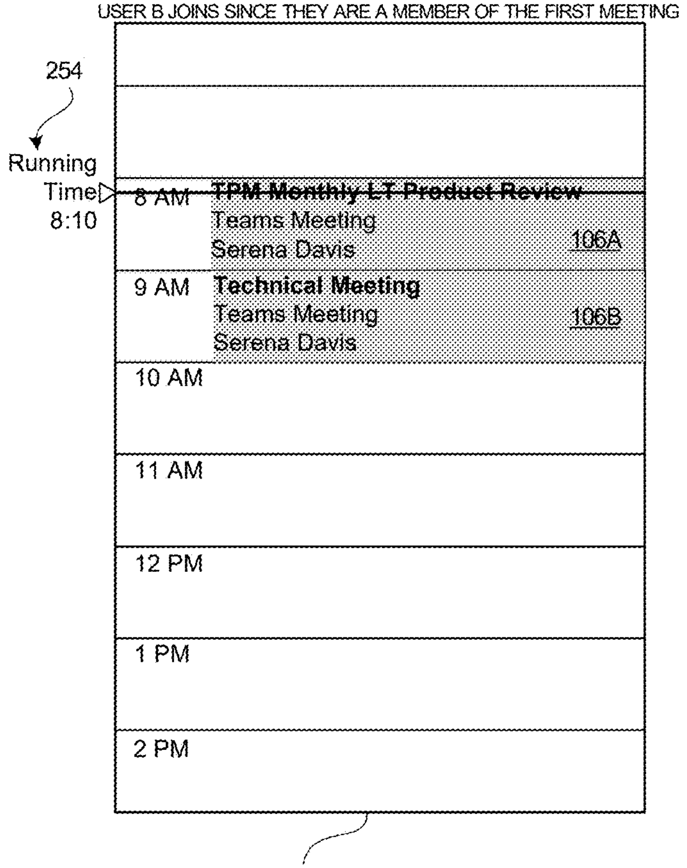

CALENDAR VIEW 253

FIRST MEETING OBJECT 106A
NAME: TPM MONTHLY LT PRODUCT REVIEW
DATE: 5/20/24 8 AM TO 9 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
|---|---|---|---|
| USER A | ORGANIZER | CONNECTED | ALL HOURS |
| USER B | AUDIENCE | **CONNECTED** | 8 AM TO 9 AM |
| USER C | AUDIENCE | CONNECTED | 8 AM TO 9 AM |
| USER D | AUDIENCE | CONNECTED | 8 AM TO 9 AM |
| USER E | AUDIENCE | CONNECTED | 8 AM TO 9 AM |

SECOND MEETING OBJECT 106B
NAME: TECHNICAL MEETING
DATE: 5/20/24 9 AM TO 10 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
|---|---|---|---|
| USER A | ORGANIZER | CONNECTED | ALL HOURS |
| USER B | AUDIENCE | INVITEE | 9 AM TO 10 AM |
| USER F | AUDIENCE | INVITEE | 9 AM TO 10 AM |
| USER G | AUDIENCE | INVITEE | 9 AM TO 10 AM |

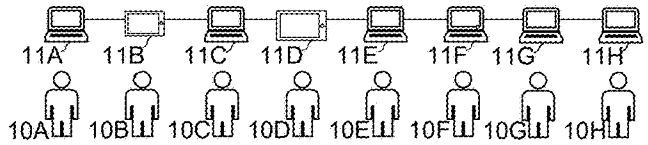

OPERATING STATE DURING THE FIRST MEETING
THE COMMUNICATION SESSION IN A FIRST STATE DURING THE FIRST MEETING
PERMISSIONS ALLOW PEOPLE NAMED IN THE FIRST MEETING TO BE IN COMMUNICATION WITH ONE ANOTHER VIA AUDIO STREAMS AND/OR VIDEO STREAMS.
PERMISSIONS RESTRICT PEOPLE FROM JOINING IF THEY ARE NOT NAMED IN THE FIRST MEETING

FIGURE 16B

IN RESPONSE TO USER B'S REQUEST TO JOIN THE CALL,
USER B IS IN A HOLDING AREA SINCE THEY ARE NOT A MEMBER OF THE MEETING

254
Running Time 8:10

8 AM TPM Monthly LT Product Review
Teams Meeting
Serena Davis 106A

9 AM Technical Meeting
Teams Meeting
Serena Davis 106B

10 AM
11 AM
12 PM
1 PM
2 PM

CALENDAR VIEW 253

FIRST MEETING OBJECT 106A
NAME: TPM MONTHLY LT PRODUCT REVIEW
DATE: 5/20/24 8 AM TO 9 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
| --- | --- | --- | --- |
| USER A | ORGANIZER | CONNECTED | ALL HOURS |
| USER C | AUDIENCE | CONNECTED | 8 AM TO 9 AM |
| USER D | AUDIENCE | CONNECTED | 8 AM TO 9 AM |
| USER E | AUDIENCE | CONNECTED | 8 AM TO 9 AM |
| USER B | NO CONNECTION | HOLDING AREA | 9 AM TO 10 AM |

SECOND MEETING OBJECT 106B
NAME: TECHNICAL MEETING
DATE: 5/20/24 9 AM TO 10 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
| --- | --- | --- | --- |
| USER A | ORGANIZER | CONNECTED | ALL HOURS |
| USER B | AUDIENCE | HOLDING AREA | 9 AM TO 10 AM |
| USER F | AUDIENCE | INVITEE | 9 AM TO 10 AM |
| USER G | AUDIENCE | INVITEE | 9 AM TO 10 AM |

11A 11B 11C 11D 11E 11F 11G 11H
10A 10B 10C 10D 10E 10F 10G 10H

OPERATING STATE DURING THE FIRST MEETING
THE COMMUNICATION SESSION IN A FIRST STATE DURING THE FIRST MEETING
PERMISSIONS ALLOW PEOPLE NAMED IN THE FIRST MEETING TO BE IN COMMUNICATION WITH ONE ANOTHER VIA AUDIO STREAMS AND/OR VIDEO STREAMS.
PERMISSIONS RESTRICT PEOPLE FROM JOINING IF THEY ARE NOT NAMED IN THE FIRST MEETING

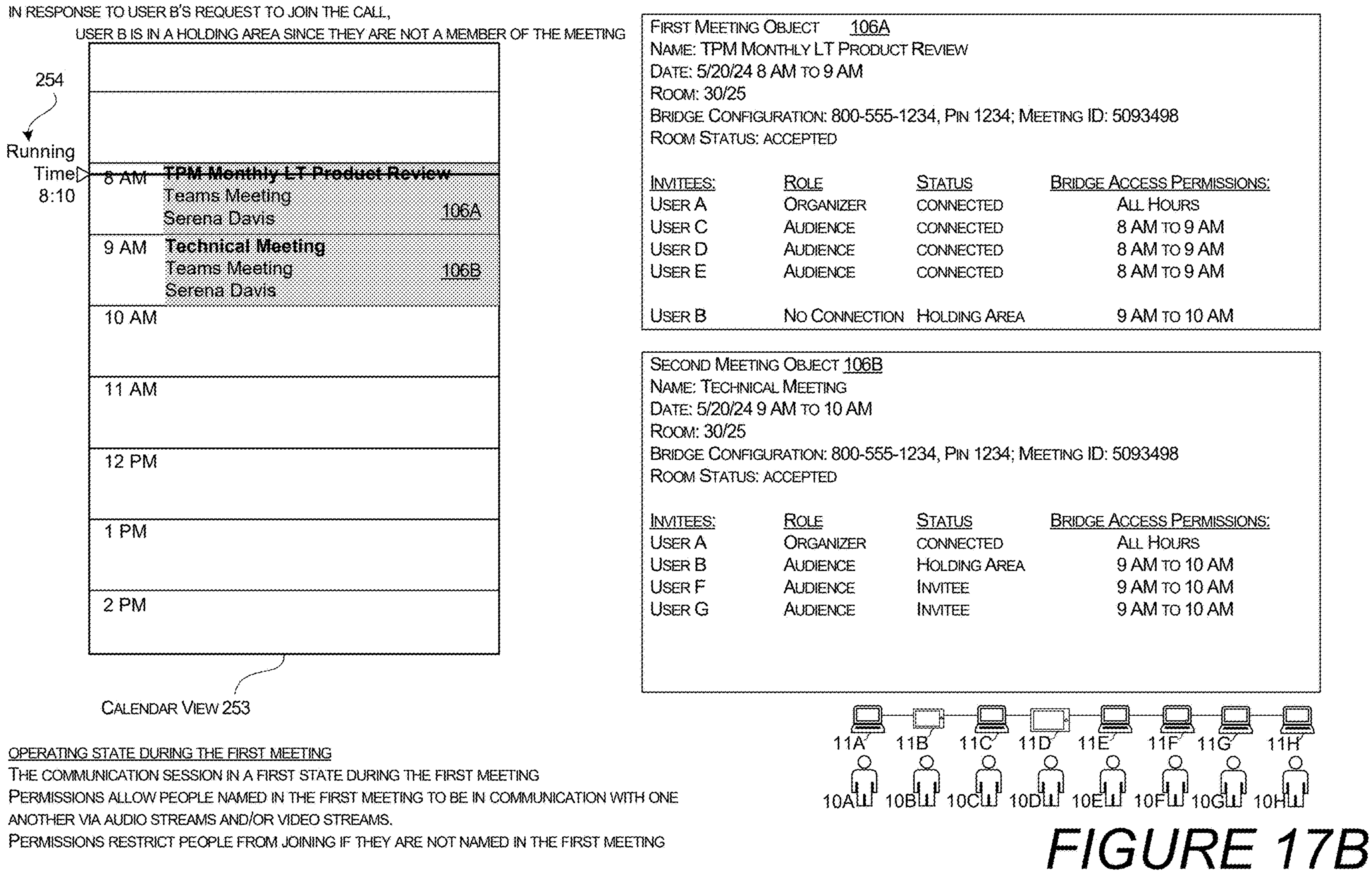

FIGURE 17B

USER B IS CONNECTED SINCE THEY WERE ALLOWED TO JOIN BY A CURRENT MEMBER

254
Running Time 8:10

8 AM TPM Monthly LT Product Review
Teams Meeting
Serena Davis 106A
9 AM Technical Meeting
Teams Meeting 106B
Serena Davis
10 AM
11 AM
12 PM
1 PM
2 PM

CALENDAR VIEW 253

FIRST MEETING OBJECT 106A
NAME: TPM MONTHLY LT PRODUCT REVIEW
DATE: 5/20/24 8 AM TO 9 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
|---|---|---|---|
| USER A | ORGANIZER | CONNECTED | ALL HOURS |
| USER C | AUDIENCE | CONNECTED | 8 AM TO 9 AM |
| USER D | AUDIENCE | CONNECTED | 8 AM TO 9 AM |
| USER E | AUDIENCE | CONNECTED | 8 AM TO 9 AM |
| USER B | AUDIENCE | CONNECTED | 9 AM TO 10 AM |

SECOND MEETING OBJECT 106B
NAME: TECHNICAL MEETING
DATE: 5/20/24 9 AM TO 10 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
|---|---|---|---|
| USER A | ORGANIZER | CONNECTED | ALL HOURS |
| USER B | AUDIENCE | CONNECTED | 9 AM TO 10 AM |
| USER F | AUDIENCE | INVITEE | 9 AM TO 10 AM |
| USER G | AUDIENCE | INVITEE | 9 AM TO 10 AM |

11A 11B 11C 11D 11E 11F 11G 11H
10A 10B 10C 10D 10E 10F 10G 10H

OPERATING STATE DURING THE FIRST MEETING
THE COMMUNICATION SESSION IN A FIRST STATE DURING THE FIRST MEETING
PERMISSIONS ALLOW PEOPLE NAMED IN THE FIRST MEETING TO BE IN COMMUNICATION WITH ONE ANOTHER VIA AUDIO STREAMS AND/OR VIDEO STREAMS.
PERMISSIONS RESTRICT PEOPLE FROM JOINING IF THEY ARE NOT NAMED IN THE FIRST MEETING

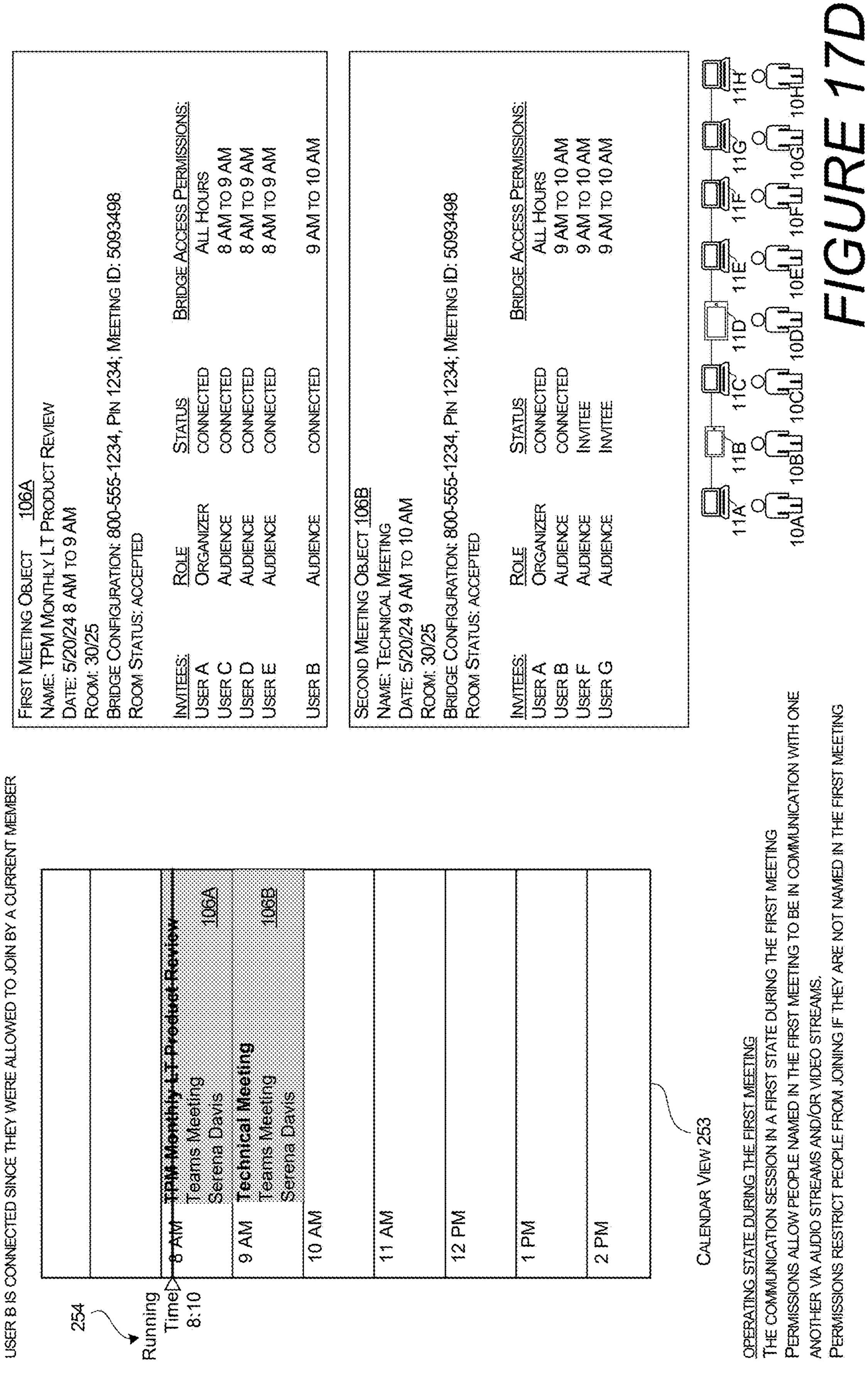

FIGURE 17D

IN RESPONSE TO USER B'S REQUEST TO JOIN THE CALL,
USER B IS IN A HOLDING AREA SINCE THEY ARE NOT A MEMBER OF 1ST MEETING

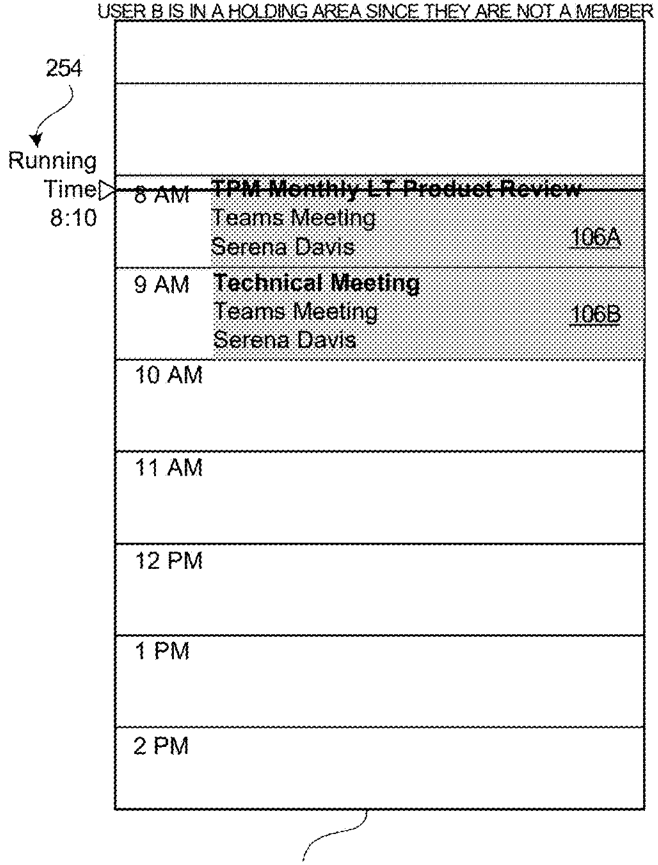

CALENDAR VIEW 253

FIRST MEETING OBJECT 106A
NAME: TPM MONTHLY LT PRODUCT REVIEW
DATE: 5/20/24 8 AM TO 9 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
|---|---|---|---|
| USER A | ORGANIZER | CONNECTED | ALL HOURS |
| USER C | AUDIENCE | CONNECTED | 8 AM TO 9 AM |
| USER D | AUDIENCE | CONNECTED | 8 AM TO 9 AM |
| USER E | AUDIENCE | CONNECTED | 8 AM TO 9 AM |
| USER B | NO CONNECTION | HOLDING AREA | 9 AM TO 10 AM |

SECOND MEETING OBJECT 106B
NAME: TECHNICAL MEETING
DATE: 5/20/24 9 AM TO 10 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
|---|---|---|---|
| USER A | ORGANIZER | CONNECTED | ALL HOURS |
| USER B | AUDIENCE | WAITING AREA | 9 AM TO 10 AM |
| USER F | AUDIENCE | INVITEE | 9 AM TO 10 AM |
| USER G | AUDIENCE | INVITEE | 9 AM TO 10 AM |

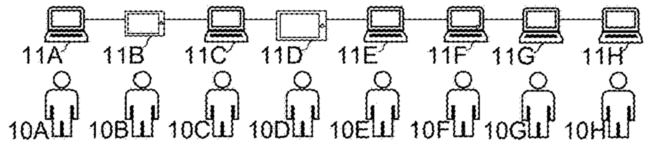

FIGURE 18B

OPERATING STATE DURING THE FIRST MEETING
THE COMMUNICATION SESSION IN A FIRST STATE DURING THE FIRST MEETING
PERMISSIONS ALLOW PEOPLE NAMED IN THE FIRST MEETING TO BE IN COMMUNICATION WITH ONE ANOTHER VIA AUDIO STREAMS AND/OR VIDEO STREAMS.
PERMISSIONS RESTRICT PEOPLE FROM JOINING IF THEY ARE NOT NAMED IN THE FIRST MEETING

USER B STILL IN HOLDING AREA TILL MEETING ENDS OR UNTIL ALLOWED BY A MEMBER

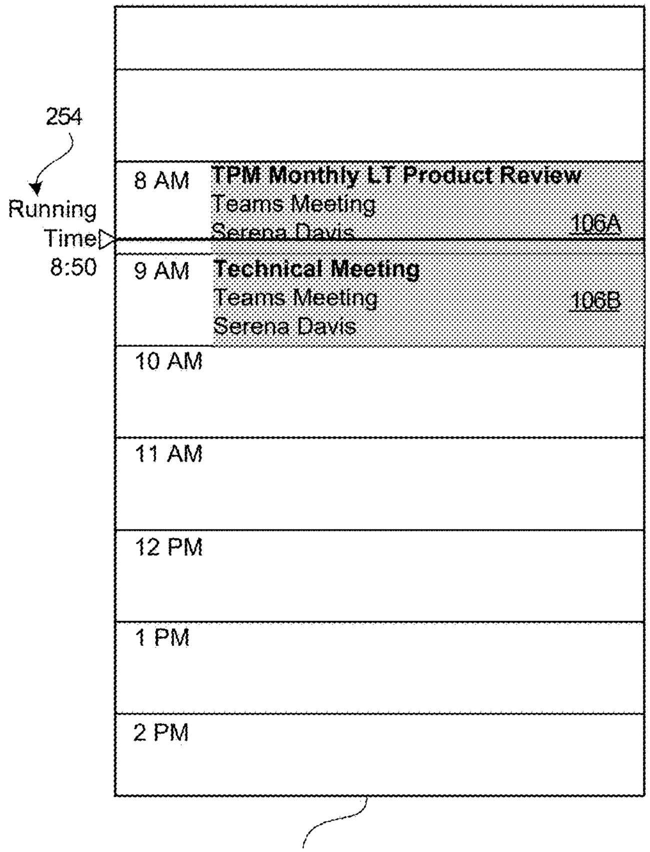

CALENDAR VIEW 253

FIRST MEETING OBJECT 106A
NAME: TPM MONTHLY LT PRODUCT REVIEW
DATE: 5/20/24 8 AM TO 9 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
|---|---|---|---|
| USER A | ORGANIZER | CONNECTED | ALL HOURS |
| USER C | AUDIENCE | CONNECTED | 8 AM TO 9 AM |
| USER D | AUDIENCE | CONNECTED | 8 AM TO 9 AM |
| USER E | AUDIENCE | CONNECTED | 8 AM TO 9 AM |
| USER B | NA | HOLDING AREA | 9 AM TO 10 AM |

SECOND MEETING OBJECT 106B
NAME: TECHNICAL MEETING
DATE: 5/20/24 9 AM TO 10 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
|---|---|---|---|
| USER A | ORGANIZER | CONNECTED | ALL HOURS |
| USER B | AUDIENCE | INVITEE | 9 AM TO 10 AM |
| USER F | AUDIENCE | INVITEE | 9 AM TO 10 AM |
| USER G | AUDIENCE | INVITEE | 9 AM TO 10 AM |

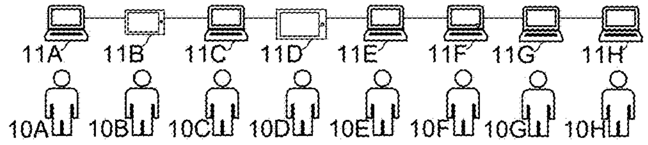

OPERATING STATE DURING THE FIRST MEETING
THE COMMUNICATION SESSION IN A FIRST STATE DURING THE FIRST MEETING
PERMISSIONS ALLOW PEOPLE NAMED IN THE FIRST MEETING TO BE IN COMMUNICATION WITH ONE ANOTHER VIA AUDIO STREAMS AND/OR VIDEO STREAMS.
PERMISSIONS RESTRICT PEOPLE FROM JOINING IF THEY ARE NOT NAMED IN THE FIRST MEETING

FIGURE 18D

USER B IS CONNECTED WHEN FIRST MEETING IS AT THE END TIME

254
Running Time 9:01

| | |
|---|---|
| 8 AM | **TPM Monthly LT Product Review** Teams Meeting Serena Davis 106A |
| 9 AM | **Technical Meeting** Teams Meeting 106B Serena Davis |
| 10 AM | |
| 11 AM | |
| 12 PM | |
| 1 PM | |
| 2 PM | |

CALENDAR VIEW 253

FIRST MEETING OBJECT 106A
NAME: TPM MONTHLY LT PRODUCT REVIEW
DATE: 5/20/24 8 AM TO 9 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
|---|---|---|---|
| USER A | ORGANIZER | CONNECTED | ALL HOURS |
| USER C | AUDIENCE | CONNECTED | 8 AM TO 9 AM |
| USER D | AUDIENCE | CONNECTED | 8 AM TO 9 AM |
| USER E | AUDIENCE | CONNECTED | 8 AM TO 9 AM |
| USER B | AUDIENCE | CONNECTED | 9 AM TO 10 AM |

SECOND MEETING OBJECT 106B
NAME: TECHNICAL MEETING
DATE: 5/20/24 9 AM TO 10 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
|---|---|---|---|
| USER A | ORGANIZER | CONNECTED | ALL HOURS |
| USER B | AUDIENCE | CONNECTED | 9 AM TO 10 AM |
| USER F | AUDIENCE | INVITEE | 9 AM TO 10 AM |
| USER G | AUDIENCE | INVITEE | 9 AM TO 10 AM |

11A 11B 11C 11D 11E 11F 11G 11H
10A 10B 10C 10D 10E 10F 10G 10H

OPERATING STATE DURING THE FIRST MEETING
THE COMMUNICATION SESSION IN A FIRST STATE DURING THE FIRST MEETING
PERMISSIONS ALLOW PEOPLE NAMED IN THE FIRST MEETING TO BE IN COMMUNICATION WITH ONE ANOTHER VIA AUDIO STREAMS AND/OR VIDEO STREAMS.
PERMISSIONS RESTRICT PEOPLE FROM JOINING IF THEY ARE NOT NAMED IN THE FIRST MEETING

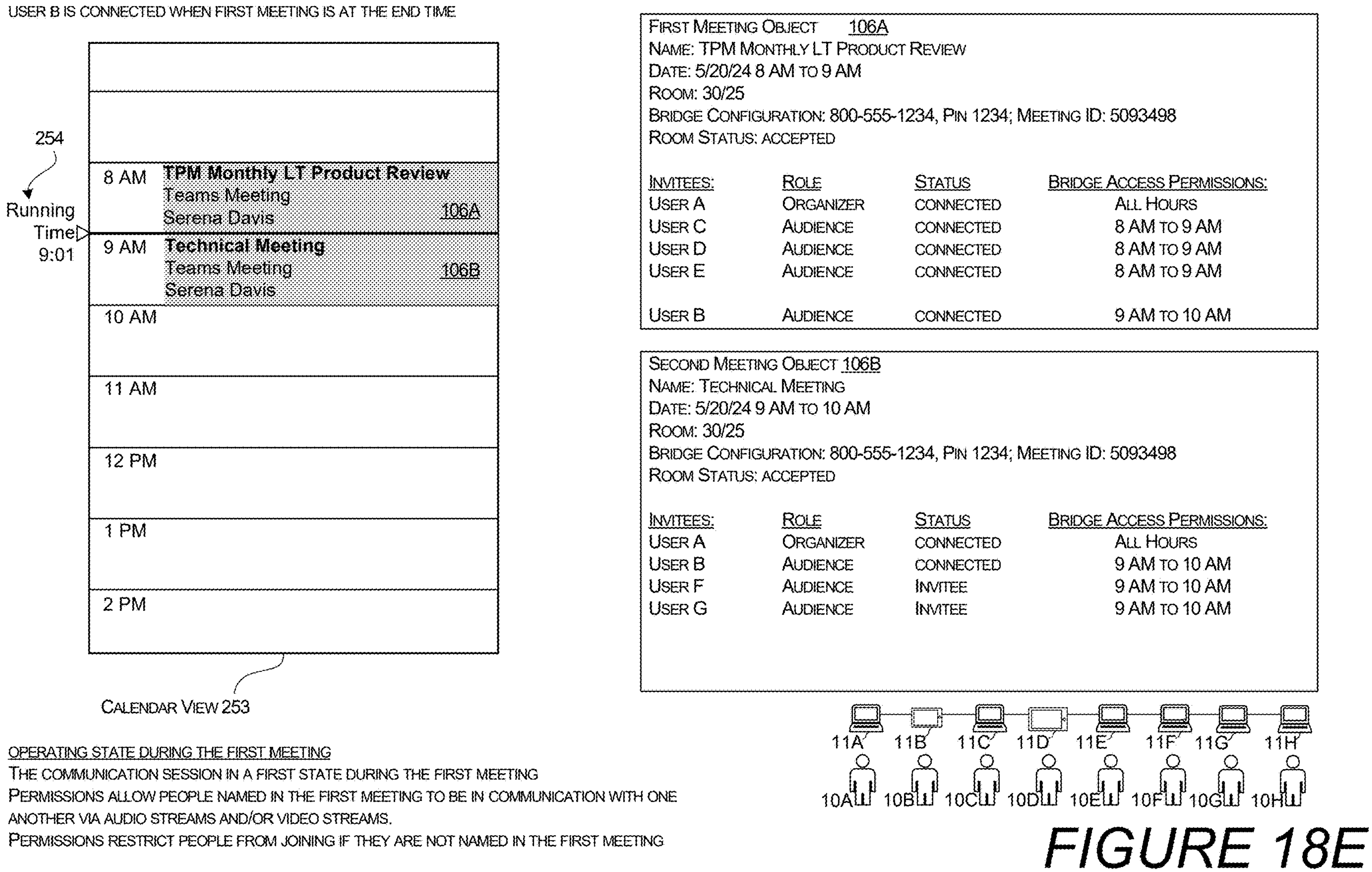

FIGURE 18E

USER B OF THE SECOND MEETING SENDS REQUEST TO JOIN THE CALL USING THE BRIDGE DURING THE FIRST MEETING

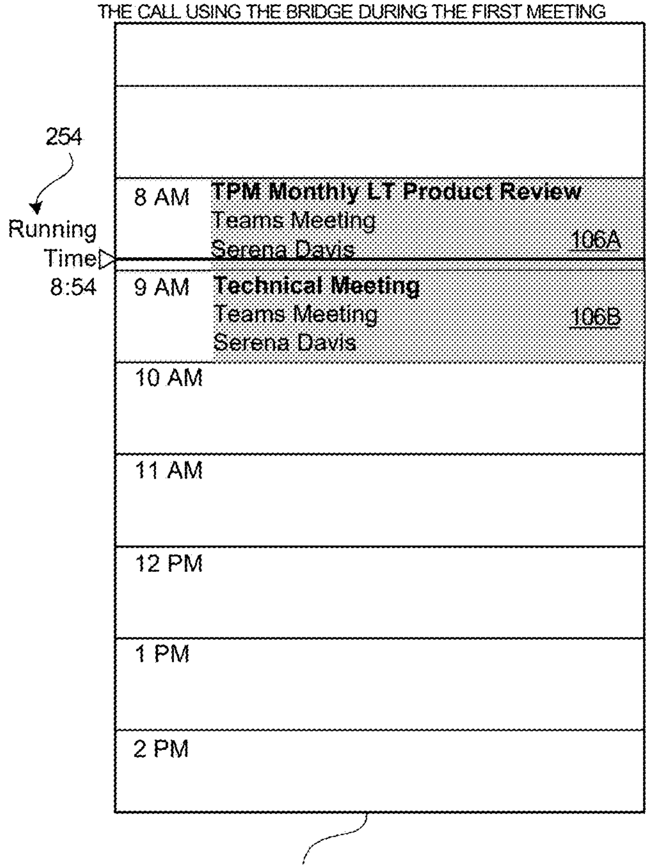

CALENDAR VIEW 253

FIRST MEETING OBJECT 106A
NAME: TPM MONTHLY LT PRODUCT REVIEW
DATE: 5/20/24 8 AM TO 9 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
|---|---|---|---|
| USER A | ORGANIZER | CONNECTED | ALL HOURS |
| USER C | AUDIENCE | CONNECTED | 8 AM TO 9 AM |
| USER D | AUDIENCE | CONNECTED | 8 AM TO 9 AM |
| USER E | AUDIENCE | CONNECTED | 8 AM TO 9 AM |

SECOND MEETING OBJECT 106B
NAME: TECHNICAL MEETING
DATE: 5/20/24 9 AM TO 10 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
|---|---|---|---|
| USER A | ORGANIZER | CONNECTED | ALL HOURS |
| USER B | AUDIENCE | INVITEE | 9 AM TO 10 AM |
| USER F | AUDIENCE | INVITEE | 9 AM TO 10 AM |
| USER G | AUDIENCE | INVITEE | 9 AM TO 10 AM |

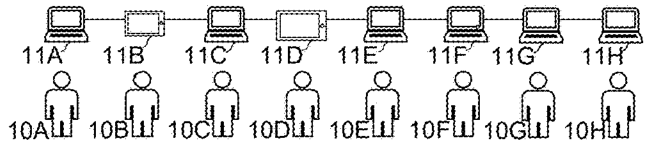

FIRST OPERATING STATE:
THE COMMUNICATION SESSION IN A FIRST STATE DURING THE FIRST MEETING
PERMISSIONS ALLOW PEOPLE NAMED IN THE FIRST MEETING TO BE IN COMMUNICATION WITH ONE ANOTHER VIA AUDIO STREAMS AND/OR VIDEO STREAMS.
PERMISSIONS RESTRICT PEOPLE FROM JOINING IF THEY ARE NOT NAMED IN THE FIRST MEETING

FIGURE 19B

IN RESPONSE TO THE REQUEST FROM USER B TO JOIN THE CALL
PLACE USER B IN A WAIT STATE

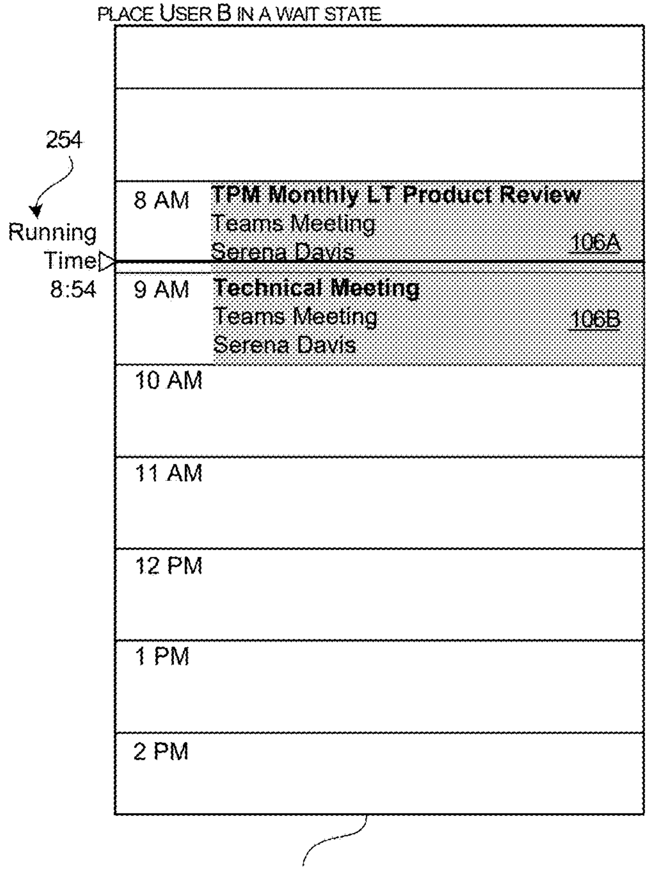

CALENDAR VIEW 253

FIRST MEETING OBJECT 106A
NAME: TPM MONTHLY LT PRODUCT REVIEW
DATE: 5/20/24 8 AM TO 9 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
|---|---|---|---|
| USER A | ORGANIZER | CONNECTED | ALL HOURS |
| USER C | AUDIENCE | CONNECTED | 8 AM TO 9 AM |
| USER D | AUDIENCE | CONNECTED | 8 AM TO 9 AM |
| USER E | AUDIENCE | CONNECTED | 8 AM TO 9 AM |
| USER B | NO CONNECTION | WAITING AREA | 8 AM TO 9 AM |

SECOND MEETING OBJECT 106B
NAME: TECHNICAL MEETING
DATE: 5/20/24 9 AM TO 10 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
|---|---|---|---|
| USER A | ORGANIZER | CONNECTED | ALL HOURS |
| USER B | AUDIENCE | WAITING AREA | 9 AM TO 10 AM |
| USER F | AUDIENCE | INVITEE | 9 AM TO 10 AM |
| USER G | AUDIENCE | INVITEE | 9 AM TO 10 AM |

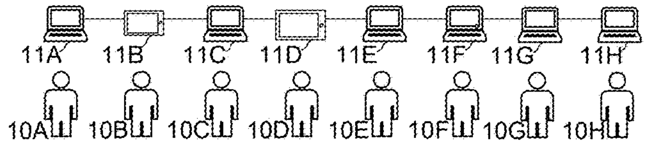

FIRST OPERATING STATE:
THE COMMUNICATION SESSION IN A FIRST STATE DURING THE FIRST MEETING
PERMISSIONS ALLOW PEOPLE NAMED IN THE FIRST MEETING TO BE IN COMMUNICATION WITH ONE ANOTHER VIA AUDIO STREAMS AND/OR VIDEO STREAMS.
PERMISSIONS RESTRICT PEOPLE FROM JOINING IF THEY ARE NOT NAMED IN THE FIRST MEETING

FIGURE 19C

IN RESPONSE TO A PREDETERMINED PERSON LEAVING,
USER B IS PERMITTED AS ACTIVE PARTICIPANT IN THE COMMUNICATION SESSION

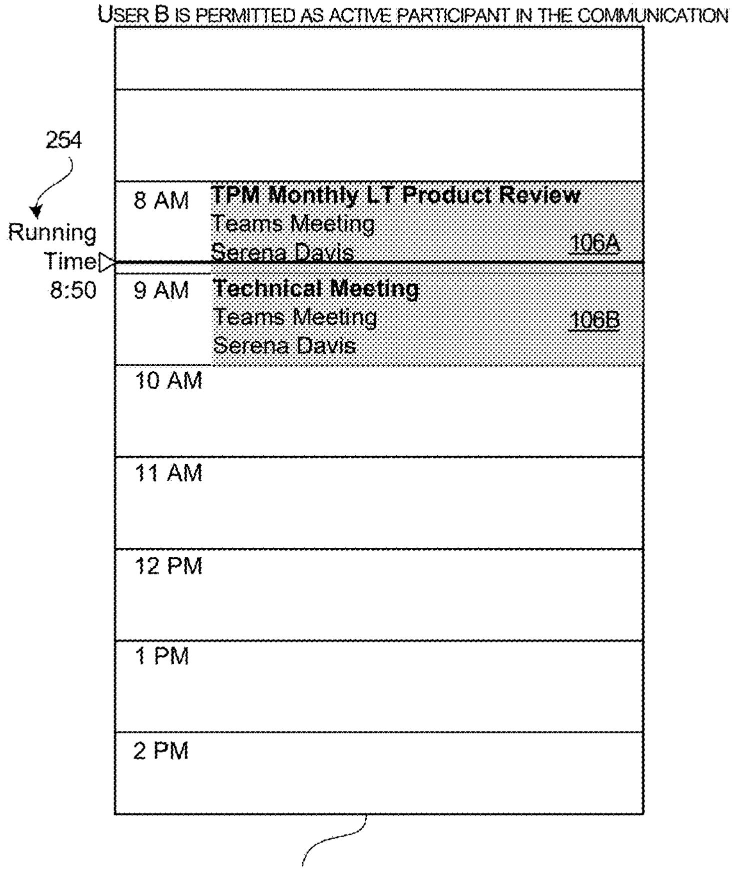

CALENDAR VIEW 253

FIRST MEETING OBJECT 106A
NAME: TPM MONTHLY LT PRODUCT REVIEW
DATE: 5/20/24 8 AM TO 9 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
|---|---|---|---|
| USER A | ORGANIZER | CONNECTED | ALL HOURS |
| USER C | AUDIENCE | CONNECTED | 8 AM TO 9 AM |
| USER D | NOT CONNECTED | LEFT MEETING | 8 AM TO 9 AM |
| USER E | AUDIENCE | CONNECTED | 8 AM TO 9 AM |
| USER B | AUDIENCE | ***CONNECTED*** | 8 AM TO 9 AM |

SECOND MEETING OBJECT 106B
NAME: TECHNICAL MEETING
DATE: 5/20/24 9 AM TO 10 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
|---|---|---|---|
| USER A | ORGANIZER | CONNECTED | ALL HOURS |
| USER B | AUDIENCE | **CONNECTED** | 9 AM TO 10 AM |
| USER F | AUDIENCE | INVITEE | 9 AM TO 10 AM |
| USER G | AUDIENCE | INVITEE | 9 AM TO 10 AM |

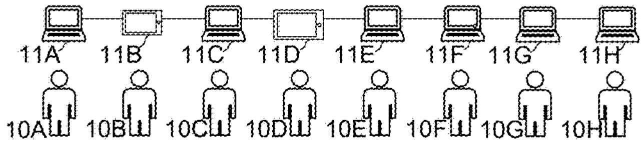

SECOND OPERATING STATE:
PERMISSIONS ALLOW PARTICIPANTS OF THE FIRST MEETING TO BE IN COMMUNICATION WITH ONE ANOTHER AND WITH ALLOWED PARTICIPANT OF THE SECOND MEETING (WHO IS ALSO NOT NAMED IN THE FIRST MEETING)

FIGURE 19E

USER B OF THE SECOND MEETING SENDS REQUEST TO JOIN THE CALL USING THE BRIDGE DURING THE FIRST MEETING

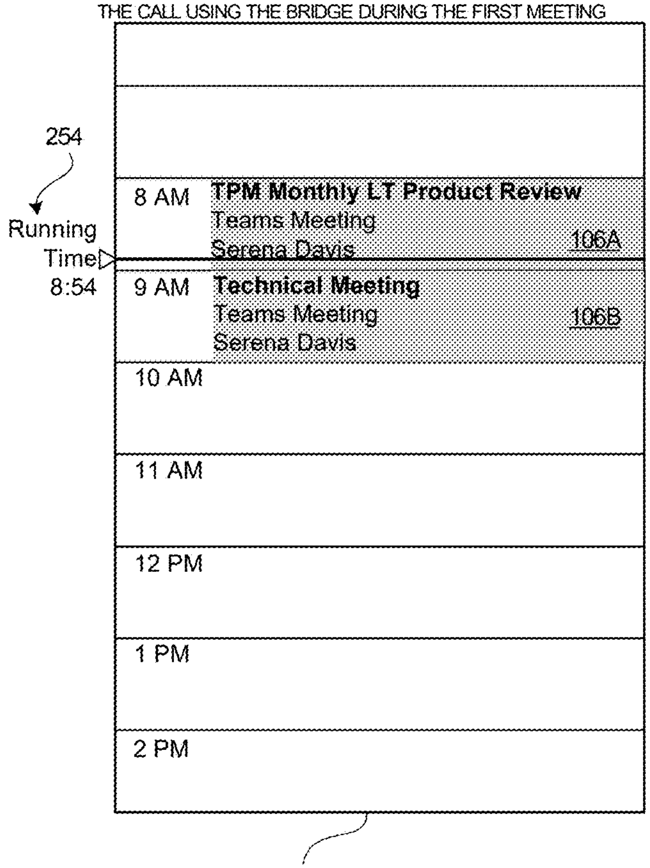

CALENDAR VIEW 253

FIRST MEETING OBJECT 106A
NAME: TPM MONTHLY LT PRODUCT REVIEW
DATE: 5/20/24 8 AM TO 9 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
|---|---|---|---|
| USER A | ORGANIZER | CONNECTED | ALL HOURS |
| USER C | AUDIENCE | CONNECTED | 8 AM TO 9 AM |
| USER D | AUDIENCE | CONNECTED | 8 AM TO 9 AM |
| USER E | AUDIENCE | CONNECTED | 8 AM TO 9 AM |

SECOND MEETING OBJECT 106B
NAME: TECHNICAL MEETING
DATE: 5/20/24 9 AM TO 10 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
|---|---|---|---|
| USER A | ORGANIZER | CONNECTED | ALL HOURS |
| USER B | AUDIENCE | INVITEE | 9 AM TO 10 AM |
| USER F | AUDIENCE | INVITEE | 9 AM TO 10 AM |
| USER G | AUDIENCE | INVITEE | 9 AM TO 10 AM |

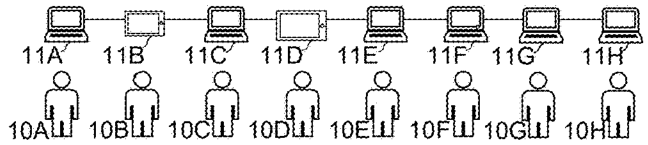

FIRST OPERATING STATE:
THE COMMUNICATION SESSION IN A FIRST STATE DURING THE FIRST MEETING
PERMISSIONS ALLOW PEOPLE NAMED IN THE FIRST MEETING TO BE IN COMMUNICATION WITH ONE ANOTHER VIA AUDIO STREAMS AND/OR VIDEO STREAMS.
PERMISSIONS RESTRICT PEOPLE FROM JOINING IF THEY ARE NOT NAMED IN THE FIRST MEETING

FIGURE 20B

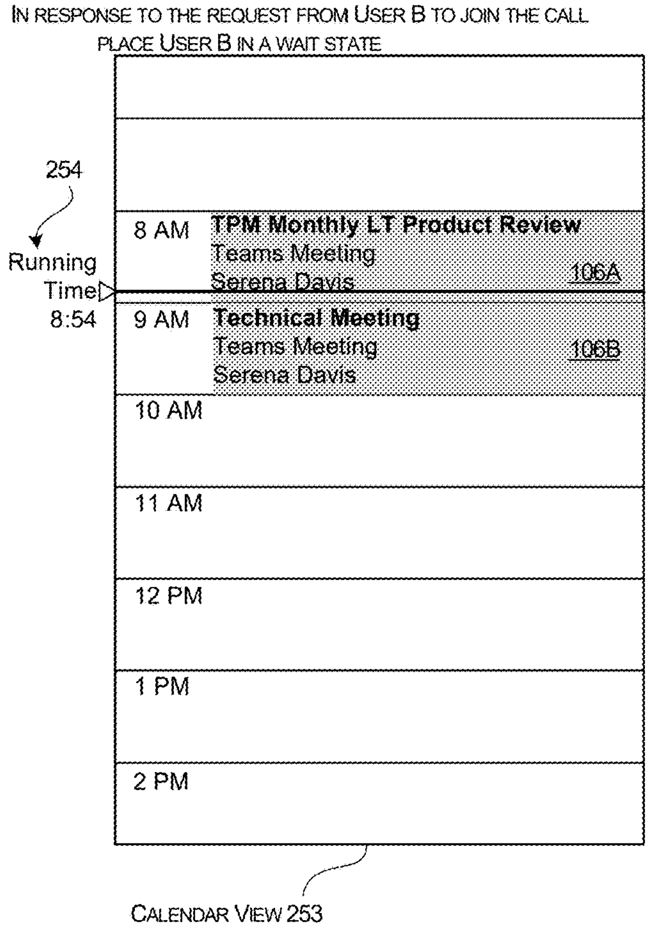

FIRST MEETING OBJECT 106A
NAME: TPM MONTHLY LT PRODUCT REVIEW
DATE: 5/20/24 8 AM TO 9 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
|---|---|---|---|
| USER A | ORGANIZER | CONNECTED | ALL HOURS |
| USER C | AUDIENCE | CONNECTED | 8 AM TO 9 AM |
| USER D | AUDIENCE | CONNECTED | 8 AM TO 9 AM |
| USER E | AUDIENCE | CONNECTED | 8 AM TO 9 AM |
| USER B | NO CONNECTION | WAITING AREA | 8 AM TO 9 AM |

SECOND MEETING OBJECT 106B
NAME: TECHNICAL MEETING
DATE: 5/20/24 9 AM TO 10 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
|---|---|---|---|
| USER A | ORGANIZER | CONNECTED | ALL HOURS |
| USER B | AUDIENCE | WAITING AREA | 9 AM TO 10 AM |
| USER F | AUDIENCE | INVITEE | 9 AM TO 10 AM |
| USER G | AUDIENCE | INVITEE | 9 AM TO 10 AM |

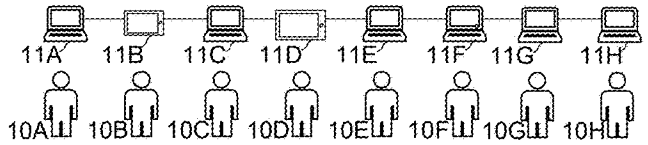

FIRST OPERATING STATE:
THE COMMUNICATION SESSION IN A FIRST STATE DURING THE FIRST MEETING
PERMISSIONS ALLOW PEOPLE NAMED IN THE FIRST MEETING TO BE IN COMMUNICATION WITH ONE ANOTHER VIA AUDIO STREAMS AND/OR VIDEO STREAMS.
PERMISSIONS RESTRICT PEOPLE FROM JOINING IF THEY ARE NOT NAMED IN THE FIRST MEETING

FIGURE 20C

IN RESPONSE TO A PREDETERMINED GROUP LEAVING,
USER B IS PERMITTED AS ACTIVE PARTICIPANT IN THE COMMUNICATION SESSION

254
Running Time 8:50

| | |
|---|---|
| 8 AM | **TPM Monthly LT Product Review** Teams Meeting Serena Davis 106A |
| 9 AM | **Technical Meeting** Teams Meeting Serena Davis 106B |
| 10 AM | |
| 11 AM | |
| 12 PM | |
| 1 PM | |
| 2 PM | |

CALENDAR VIEW 253

FIRST MEETING OBJECT 106A
NAME: TPM MONTHLY LT PRODUCT REVIEW
DATE: 5/20/24 8 AM TO 9 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
|---|---|---|---|
| USER A | ORGANIZER | CONNECTED | ALL HOURS |
| USER C | NOT CONNECTED | LEFT MEETING | 8 AM TO 9 AM |
| USER D | NOT CONNECTED | LEFT MEETING | 8 AM TO 9 AM |
| USER E | NOT CONNECTED | LEFT MEETING | 8 AM TO 9 AM |
| USER B | AUDIENCE | ***CONNECTED*** | 8 AM TO 9 AM |

SECOND MEETING OBJECT 106B
NAME: TECHNICAL MEETING
DATE: 5/20/24 9 AM TO 10 AM
ROOM: 30/25
BRIDGE CONFIGURATION: 800-555-1234, PIN 1234; MEETING ID: 5093498
ROOM STATUS: ACCEPTED

| INVITEES: | ROLE | STATUS | BRIDGE ACCESS PERMISSIONS: |
|---|---|---|---|
| USER A | ORGANIZER | CONNECTED | ALL HOURS |
| USER B | AUDIENCE | **CONNECTED** | 9 AM TO 10 AM |
| USER F | AUDIENCE | INVITEE | 9 AM TO 10 AM |
| USER G | AUDIENCE | INVITEE | 9 AM TO 10 AM |

11A 11B 11C 11D 11E 11F 11G 11H
10A 10B 10C 10D 10E 10F 10G 10H

SECOND OPERATING STATE:
PERMISSIONS ALLOW PARTICIPANTS OF THE FIRST MEETING TO BE IN COMMUNICATION WITH ONE ANOTHER AND WITH ALLOWED PARTICIPANT OF THE SECOND MEETING (WHO IS ALSO NOT NAMED IN THE FIRST MEETING)

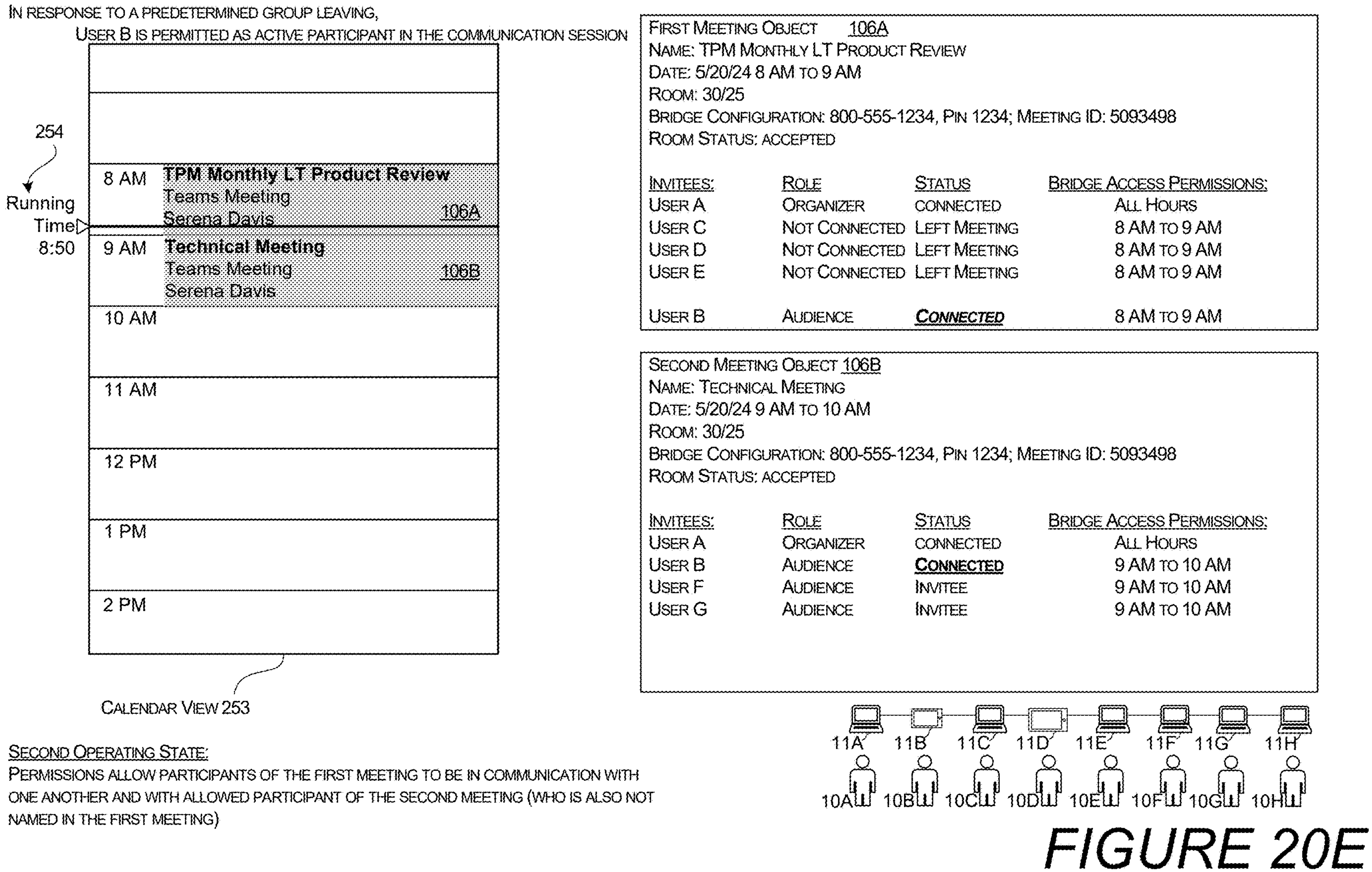

802 RECEIVES A FIRST REQUEST FOR A PRIMARY MEETING

804 RECEIVE A SECOND REQUEST FOR A SUB-MEETING

806 IDENTIFY A SCHEDULING CONFLICT

808 CHECK THE IDENTITIES OF THE ORGANIZERS OF EACH MEETING

810 RECONCILE THE CONFLICT

812 SYSTEM SELECTIVELY USE IDENTICAL OR DIFFERENT BRIDGE CONFIGURATIONS

814 MANAGE A CONFERENCE LOBBY FEATURE

ENHANCED AUTOMATION OF CONFLICT RECONCILIATION FOR OVERLAPPING MEETINGS WITH THE SAME ROOM

BACKGROUND

There are a number of different types of collaborative systems that allow users to communicate. For example, some systems allow people to collaborate by sharing content using video and audio streams, shared files, chat messages, etc. Some systems manage communication sessions, which are also referred to herein as online meetings, virtual reality sessions, broadcasts, etc. Such sessions can include events that have a distinct start time and an end time that occur on specific dates. People can schedule these sessions on a calendar and have a number of events scheduled throughout the day. Users can schedule meetings in advance, invite other participants, and use various content sharing features such as audio, video, chat, screen sharing, whiteboards, etc.

Although some existing systems provide a number of features that allow people to collaborate during specific events, such systems have a number of drawbacks. For example, when a user arranges overlapping meetings using the same conference room for a given timeslot, existing systems will only allocate the room to one of the meetings. Thus, since existing systems only allow one meeting for a particular conference room at a given timeslot, the system issues a rejection for meeting requests that attempt to reserve an allocated room. This can cause confusion for the invitees of the meeting as the room appears as "declined," which disincentivizes invitees to attend a meeting in person. In such cases, they are more likely to call in if a bridge configuration, e.g., a Conference Call ID, is provided.

The above-described issues may arise in a situation where users who work remotely often set up a meeting to reserve a conference room for the day, e.g., from 9 to 5 on a given day. This gives that user an established location to conduct several meetings throughout the day. That allows the user to set up several short-period meetings, e.g., 1-hour meetings within that 9 to 5 period, using the same conference room. One issue that arises from the use of existing systems is that existing systems do not confirm the same conference room for these short-period meetings, e.g., sub-meetings, that overlap the time of the user's first all-day meeting. Thus, there is no true scheduling conflict in this scenario since the intent of the meeting organizer is to reserve the room for an all-day reservation, and then use the room for the short-period meetings. The result is that existing calendaring systems treat these meeting arrangements as a conflict and only show the conference room as confirmed for the all-day meeting, while the other short-period meetings show the conference room as unconfirmed, e.g., rejected. This rejected status is shown on the calendar for every invitee of the short-period meetings. This can lead to confusion and a lack of attendance for the invitees for the short-period meetings.

The techniques disclosed herein also provide improved access to accurate information without requiring a user to look up a room status. By automatically assigning a room to overlapping meetings, users do not have to send emails or other forms of communication to understand the true status and intent of a conference room status. This is particularly helpful in small-screen devices, since the users are required to open several applications to perform these extra tasks.

The above-described technical issues can also cause additional inefficiencies when users are unaware of the true status of a room reservation. In such situations, users may call into a meeting instead of showing up in person. This can lead to a loss in the communication of some of the shared content, as some shared content may be intended for an in-person meeting. These situations often lead to reduced productivity and inefficient use of computing resources, underscoring the need for more efficient solutions and user interface arrangements.

SUMMARY

The disclosed techniques are directed to a system that manages use scenarios implementing and managing deliberate overlapping meetings with conference calls. For example, an executive may organize hybrid meetings by scheduling an all-day meeting, e.g., 9 AM to 5 PM, in a conference room, and also scheduling multiple sub-meetings with, and joined by, different groups of attendees by coming to the conference room and/or joining from conference calls. For example, a first sub-meeting may be scheduled from 9 AM to 11 AM and scheduled for the same conference room as the all-day meeting. Instead of rejecting the request to reserve the conference room for the sub-meeting, which some existing systems would do because of the reservation set by the all-day meeting, the system disclosed herein accepts the request to reserve the conference room for the sub-meeting when a request for sub-meeting identifies the same room or location as an overlapping meeting. The system also notifies all invitees of the sub-meeting of the conference room reservation.

In some embodiments, a system manages overlapping meetings and meeting invitations, and properly schedules the meetings and manages the replies to meeting invitations, e.g., the acceptance notifications and notifications for conference rooms and invitees. In one illustrative example, when a scheduling server receives data defining overlapping meeting invitations that both request the same conference room, existing systems will reject one or both of such meeting invitations that are requesting the same conference room. Instead of sending a rejection to invitations that are requesting the same conference room, the techniques described herein reconcile the purported "scheduling conflicts," properly accept the invitations for overlapping meetings and allocate the conference room for the individual meetings. The system can also control permissions and policies for invitees for each meeting to properly grant access to resources within a conference room, e.g., access to controlling cameras, speakers, etc. The access controlled by the server also allows each invitee to access shared content.

The technical challenge of managing meeting invitations that request the same conference room for overlapping timeslots is solved by the technical solution of enhanced automation of conflict reconciliation techniques that allow overlapping meetings to be assigned to the same room when one or more criteria are detected. The one or more criteria can include an analysis of the organizer of each meeting and or delegates of the organizers. For example, if the primary meeting and a conflicting sub-meeting both request the same room, and those meetings are requested by the same user, or a delegate of that user, the system can reconcile the conflict and allocate the room for both meetings, and provide notifications to each invitee of the allocation.

The system provides improved user interaction by providing accurate information on the status of a conference room when overlapping meetings are scheduled for that conference room. Permissions and policies are also set automatically so users do not have to interrupt a meeting to set access permissions and policies. Thus, in addition to improving the security of a system by automatically controlling permissions, the techniques disclosed herein can provide a number of other computing resource efficiencies. By providing the correct information to users about a room status, meeting participants can go to a meeting in person with more confidence that the information about the room is correct. By going to in-person meetings instead of using the conference call information, users can communicate with a higher degree of accuracy by being able to view gestures and side conversations in real-time, instead of using computing resources in an online call to gather that other contextual information.

When accurate information and permission transitions are provided with a higher level of accuracy, such systems described herein benefit over existing systems because fewer manual inputs are needed. This eliminates the element of human error when it comes to manually setting permissions. Such benefits can increase the efficiency and security of a computing system by reducing the number of times a user needs to interact with a computing device to obtain information or restrict access to information. For example, if users in a meeting miss shared content because of inefficient human interactions, they must often resort to prolonged meetings, extensive use of meeting recordings, or require duplicate copies of previously shared content that may require email systems, etc. Thus, various computing resources such as network resources, memory resources, and processing resources can be reduced by mitigating scenarios where content is missed or inadvertently restricted. Also, the disclosed techniques can ultimately lead to a reduction in undesirable permission settings, which can leave exposed attack vectors.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1 is a diagram of a user interface showing a calendar and data objects that correspond to meetings of the calendar.

FIG. 2 is a diagram of a user interface that includes status indicators showing that a room has been reserved for overlapping meetings when requested by the same organizer or a delegate of the organizer.

FIG. 3 is a diagram of user interfaces that include status indicators showing that a room has been declined for overlapping meetings when meetings are not requested by the same organizer or a delegate of the organizer.

FIG. 13B shows the second stage of a process of receiving a user input for determining that a meeting conflict is deliberate or not deliberate.

FIG. 13D shows the fourth stage of a process of receiving a user input for determining that a meeting conflict is deliberate or not deliberate.

FIG. 13E shows an outcome of a process of receiving a user input for determining that a meeting conflict is deliberate.

FIG. 13F shows an alternate outcome of a process of receiving a user input for determining that a meeting conflict is not deliberate.

FIG. 16A shows a first state of a process of a conference lobby feature during back-to-back conference calls where a user is requesting to join a meeting.

FIG. 16B shows a second state of a process of a conference lobby feature during back-to-back conference calls where a user is allowed to join a meeting since they are listed as a meeting member.

FIG. 17B shows a second state of a process of a conference lobby feature during back-to-back conference calls where a user is held in a holding area since they are not listed as a member of the first meeting.

FIG. 17D shows a change in the meeting object when the user is moved out of the holding area after an input from a meeting member admits the user in the meeting.

FIG. 18B shows a second state of a process of a conference lobby feature during back-to-back conference calls where a user is held in a holding area since they are not listed as a member of the first meeting.

FIG. 18D shows that the user is still in the holding area if they are not admitted by a member of the meeting.

FIG. 18E shows a change in the meeting object when the user is moved out of the holding area and connected to the meeting when the meeting is over.

FIG. 19B shows a second state of a process of a conference lobby feature during back-to-back conference calls where a user that is a member of a second meeting is requesting to join a call during a first meeting.

FIG. 19C shows a state of a process of a conference lobby feature during back-to-back conference calls where a user is held in a holding area since they are not listed as a member of the first meeting.

FIG. 19E shows a change in the meeting object when the user is moved out of the holding area and connected to the meeting when they are permitted to join during the first meeting.

FIG. 20B shows a second state of a process of a conference lobby feature during back-to-back conference calls where a user that is a member of a second meeting is requesting to join a call during a first meeting.

FIG. 20C shows a state of a process of a conference lobby feature during back-to-back conference calls where a user is held in a holding area since they are not listed as a member of the first meeting.

FIG. 20E shows a change in the meeting object when the user is moved out of the holding area and connected to the meeting when the system determines that the first meeting is over.

DETAILED DESCRIPTION

Figure 4:
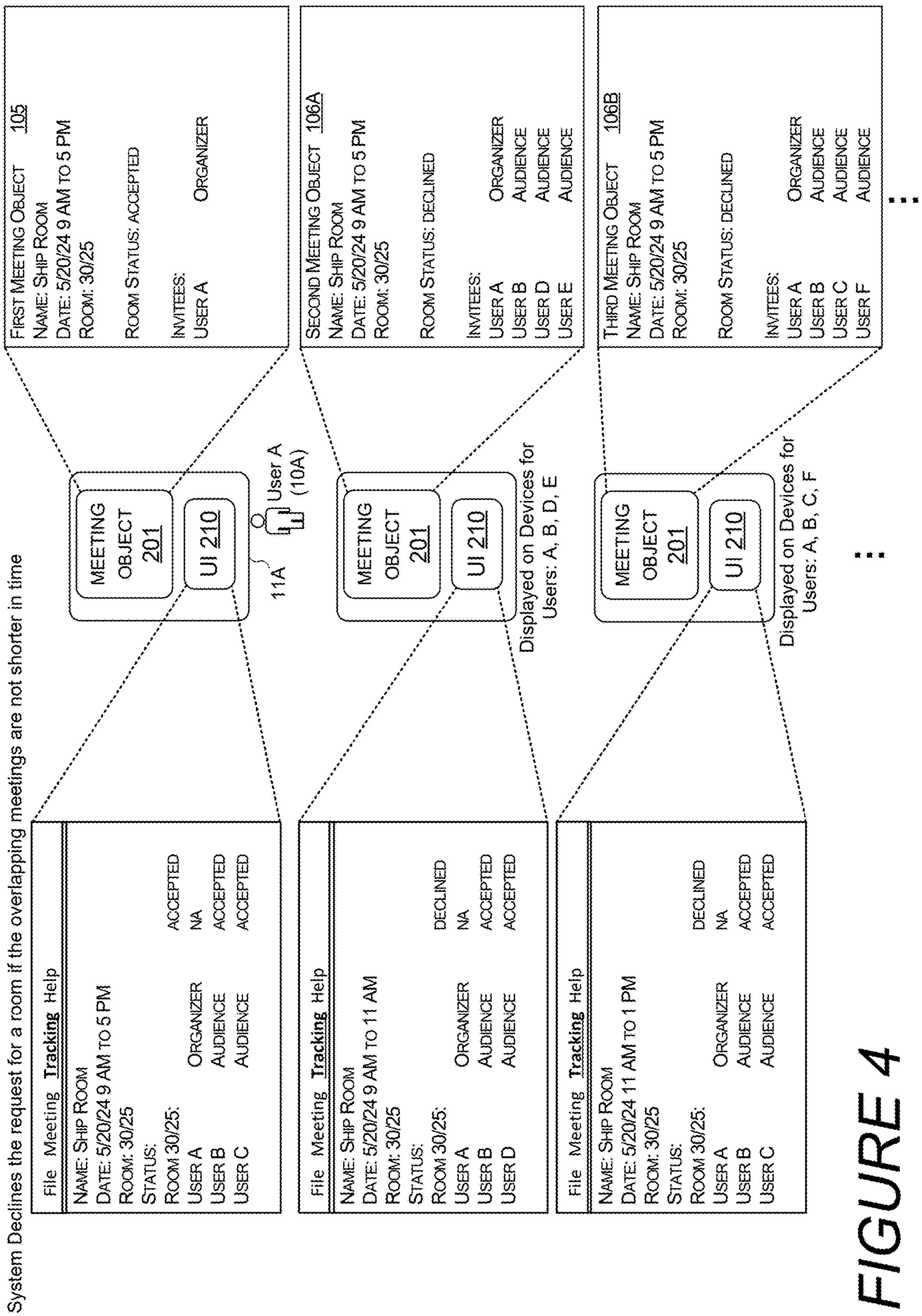
FIG. 4 is a diagram of user interfaces that include status indicators showing that a room has been declined for overlapping meetings when the over lapping meetings do not include a primary meeting and a sub-meeting with a shorter duration than the primary meeting.

FIG. 1 shows a system for implementing and managing deliberate overlapping meetings with conference calls. The example of FIG. 1 includes a user interface 101 showing meetings 120 a calendar: a primary meeting 105, a first sub-meeting 106A, a second sub-meeting 106B, and a third sub-meeting 106C. FIG. 1 also shows meeting objects that correspond to meetings, where each object defines attributes for each meeting, such as, but not limited to, a meeting name, meeting time, meeting location, meeting status, meeting invitees, etc. In this scenario, a company executive is organizing hybrid meetings by scheduling an all-day meeting (a primary meeting 105), e.g., 9 AM to 5 PM, in a conference room having a room identifier 109, and also scheduling multiple sub-meetings (secondary meetings or sub-meetings) with and joined by different attendees by coming to the conference room and/or joining the conference call defined in the meeting objects.

In this example, the first sub-meeting is scheduled from 9 AM to 11 AM and scheduled for the same conference room as the all-day meeting, a second sub-meeting is scheduled from 12 PM to 2 PM and scheduled for the same conference room as the all-day meeting, a third sub-meeting is scheduled from 2:30 PM to 4:30 PM and scheduled for the same conference room as the all-day meeting. Also shown, a meeting system has accepted the request for the room, building 30, room 25. As described in more detail below, instead of rejecting the request to reserve the conference room for the sub-meeting, which in existing systems would occur because of the reservation set by the all-day meeting, in response to the detection of one or more criteria, the system accepts the request to reserve the conference room for the sub-meetings. Also described below, the system also notifies all invitees of each sub-meeting of the conference room reservation and acceptance statuses for each of the invitees.

To generate the data objects shown in FIG. 1, a system receives a first request for a primary meeting for a first time period. This request for the primary meeting can include a title, room number, and identities of invitees. The system can also generate bridge information for conducting an on-line meeting for the invitees. In some cases, the primary meeting may define a time period using a start time and an end time for reserving the room for several sub-meetings. For example, the primary meeting may be an all-day meeting, sub-meetings can be shorter periods than the primary meeting. The system receives a first request for a primary meeting 105 for a first time period. The first request can include an identifier 109 for a meeting room, such as a conference room, building, etc. In this case, the identifier for a meeting room is 30/25, Building 30, room 25. The system also receives a second request for a sub-meeting 106B for a second time period overlapping at least a portion of the first time period. The second request including the identifier for the same meeting room that is included in the request for the primary meeting.

The overlap can be partial, or the primary meeting can completely overlap the duration of the sub-meeting. In this example, requests are received for multiple sub-meetings, which includes a first sub-meeting 106A, a second sub-meeting 106B, and a third sub-meeting 106C. Although only two sub-meetings are shown in this example, it can be appreciated that there may be many other sub-meetings that at least partially overlap the primary meeting.

The system identifies a scheduling conflict by determining that the primary meeting 105 and the sub-meeting 106A overlap for at least a portion of the primary meeting, and also determining that the meeting request for the sub-meeting is for the same room identified in the request for the primary meeting.

This can include operations for determining that the second request for the sub-meeting includes the identifier for the same meeting room identified in the first request for the primary meeting. The system also determines that the second time period of the sub-meeting overlaps at least the portion of the first time period of the primary meeting. The system then identifies a scheduling conflict in response to determining that the second request for the sub-meeting includes the identifier for the same meeting room as the request for the primary meeting and in response to determining that the second time period of the sub-meeting overlaps at least the portion of the first time period of the primary meeting. In this example, the primary meeting and the sub-meeting are requested by the same person and the room is the same for both requests.

If a conflict is detected, the system determines if the first request for the primary meeting and the second request for the sub-meeting are arranged by the same user, or a delegate of one user. The system then reconciles the conflict in response to determining that the request for the primary meeting and the request for the sub-meeting are both arranged by the same user or a delegate of the user. The reconciliation includes (1) reserving the room and changing permissions allowing the original organizer to exclusively continue making reservations for the same room within the time of the primary meeting. As shown in FIG. 1, the system allocates the meeting room for the primary meeting and the sub-meeting. This allocation also restricts the meeting room from being scheduled by other users other than the user (organizer of the primary meeting) or a delegate of the user.

FIG. 2 shows that the system displays a UI indicating that the room has been accepted for meetings with overlapping schedules. This includes communicating a confirmation of a reservation for the meeting room to invitees included in the primary meeting and the sub-meeting. The system causes a display of the confirmation on the display screens of each device for the invitees. One technical benefit is that others see the room has accepted, they are more inclined to come to the meeting, vs. a scenario where the room is rejected, and they see the conflict possibly increasing the chance they may not attend in person. The UI 210 having the room status may be displayed to the invitees of each respective meeting, showing that the system has accepted and reserved the room for the primary meeting and the sub-meetings, even when overlapping meetings claim the same room. The system restricts other users, other than the organizer of the primary meeting or a delegate of that user, from reserving the room. This restriction of not allowing other users to schedule the room in overlapping meetings adds a more granular security benefit in that others are restricted from accessing room resources while the room is reserved for the organizer of the primary meeting, allowing that person to schedule several overlapping meetings.

FIG. 3 shows an example of the system declining one or more requests of overlapping meetings attempting reserve the same room. In this example, the request for the primary meeting is from a first user and the request for the first sub-meeting is from a second user, where the first user and the second user are not the same person and neither user is a delegate of one another. In such embodiments, the system determines that the first request for the primary meeting is requested by a first user and determines that the second request for the sub-meeting is requested by a second user. Then the system determines that the second user is different than the first user and determines that the second user is not a delegate of the first user. In response to determining that the second user is different than the first user and determining that the second user is not the delegate of the first user, the system allocates the meeting room for the primary meeting for the first time period and communicates a confirmation of the meeting room to invitees of the primary meeting. For instance, the first meeting object 105 of the primary meeting is granted use of the room, 30/25. However, in response to determining that the second user is different than the first user and determining that the second user is not the delegate of the first user, the system restricts the second user from reserving the meeting room, and communicates a confirmation of a rejection of the meeting room to invitees included in the sub-meeting and the second user. This is shown in the second meeting object 106A, which has a different organizer (User F) than the organizer of the primary meeting 105 (User A). Thus, the second meeting object 106A has a status for the room as declined. The third meeting object 106B for the second sub-meeting has a similar status for the room since that organizer of the second sub-meeting (User D) is different than the organizer of the primary meeting 105 (User A).

In some embodiments, the system declines the request for a room if the overlapping meetings do not have a shorter time period. As shown in FIG. 4, if the organizer of the primary meeting attempts to setup a second meeting 106A and that second meeting 106A does not have a shorter time period than the primary meeting, and the second meeting requests the same room as the primary meeting, the request for the room for the second meeting is declined. This example shows that the primary meeting requests a room for 8 hours, and the subsequent meeting requests the same room for 8 hours as well. This indicates that the person may have inadvertently duplicated their request and the second request for the room is denied even if it is requested by the same person or a delegate of that person.

This embodiment can include operations where a system determines that a conflict is not deliberate, e.g., if the sub-meeting is the same length as the primary meeting. These operations can include determining that the second time period for a sub-meeting 106A is not shorter than the first time period for the primary meeting 105. In response to determining that the second time period for the sub-meeting is not shorter than the first time period for the primary meeting, allocating the meeting room for the primary meeting for the first time period, e.g., the 9-5 meeting. The system also restricts the second room from reserving the meeting room, and communicates a confirmation of a rejection of the meeting room to invitees included in the sub-meeting and the second user.

Figure 5:
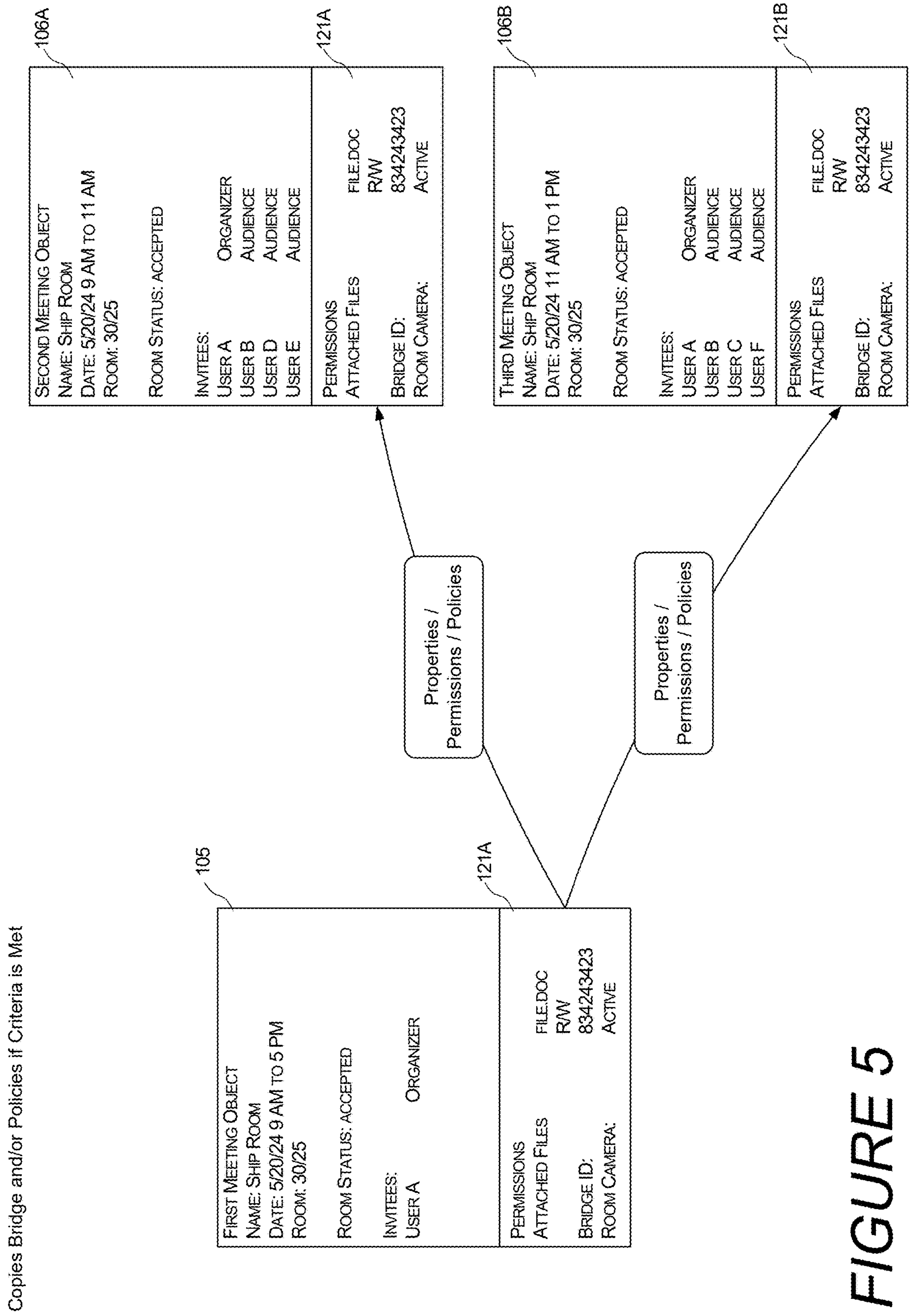
FIG. 5 is a block diagram showing a transfer of policies and permissions from overlapping meetings when the overlapping meetings are requested by the same organizer or a delegate of the organizer.

In some configurations, as shown in FIG. 5, when the system reconciles a conflict between a primary meeting and a sub-meeting, the system copies meeting properties, such as bridge call information, from the primary meeting to the secondary meeting automatically without user input. The bridge call information can be copied in response to determining that the first request for the primary meeting and the second request for the sub-meeting are arranged by a single user or the delegate of the user.

This embodiment can include copying the call bridge information from the primary meeting to the sub-meeting. Further, the system can cause a display of the call bridge information to the invitees from the primary meeting 105 and the invitees from the sub-meeting. This enables continual access to a communication session for the users of each sub-meeting. This allows them to join the call at any time even if they are joining outside of the time period defined in the sub-meeting where they are listed as an invitee.

Also shown in FIG. 5, the system can also copy meeting permissions and policies when the system reconciles a conflict between a primary meeting 105 and a sub-meeting 106A. The permissions 121A can give access to files and shared content of the primary meeting to allow invitees of a sub-meeting, that meets the criteria defined herein, access to the shared content. For instance, if the document file.doc is shared in the primary meeting 105, and the second meeting 106A and third meeting 106B have the same organizer or a delegate of the organizer and have at least a partial overlap, the system allows the attendees of the second meeting 106A and third meeting 106B to access the same file. The same transfer can be done with the policies of each meeting. Policies can include parameters on how meetings are run, e.g., roles and responsibilities for each member of a meeting, rules on how in-room cameras are to be used, activation and deactivation of camera, microphones, etc.

These operations can include copying permissions and policies for meeting devices for facilitating communication of audio streams and video streams of a communication session from the primary meeting to a sub-meeting, and/or copying the policies indicating at least one of volume levels for speakers receiving audio streams of a communication session, access to shared files, or video settings for cameras capturing video streams of the communication session. These copy operations can be invoked in response to determining that the first request for the primary meeting and the second request for the sub-meeting are arranged by the user or the delegate of the user. Once copied, the permissions allow the invitees from the primary meeting and the invitees from the sub-meeting to modify operating states of the meeting devices and access shared content.

Figure 6:
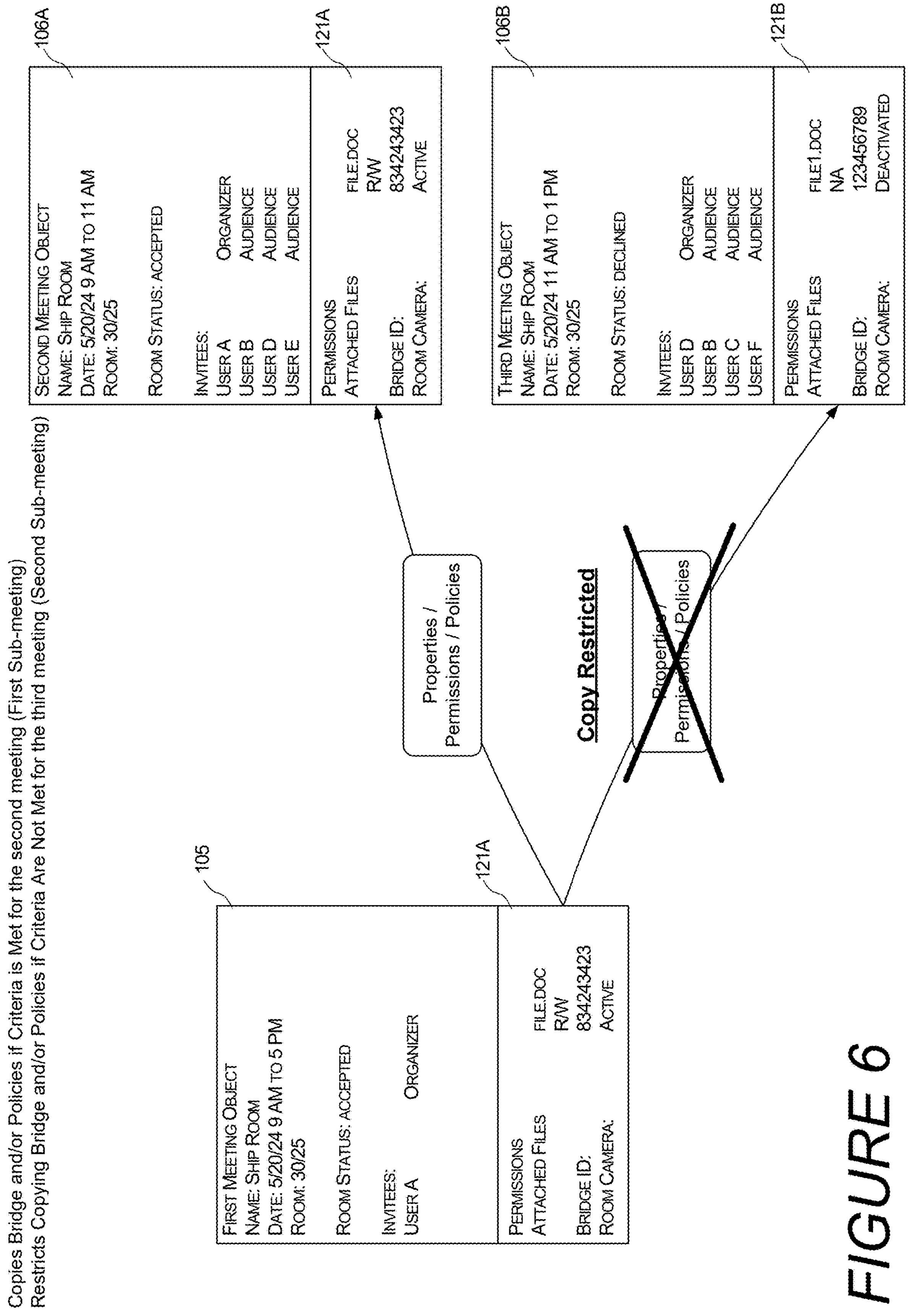
FIG. 6 is a block diagram showing when a transfer of policies and permissions from overlapping meetings are denied, when the overlapping meetings are not requested by the same organizer or a delegate of the organizer.

FIG. 6 shows an example where properties, policies and permissions 121A are restricted from being transferred from a primary meeting to a sub-meeting, e.g., the second sub-meeting 106B, in response to determining that the request for the primary meeting is from a first user and the request for the sub-meeting is from a second user, who is different than the first user, and where the first user and second user are not delegates of one another. In this example, since the organizer is different for the primary meeting 105 and the second sub-meeting 106B, the properties, policies and permissions 121C of the second sub-meeting 106C are not copied from the properties, policies and permissions 121A of the primary meeting 105. However, in this example, the properties, policies and permissions 121B of the first sub-meeting 106B are copied from the properties, policies and permissions 121A of the primary meeting 105. This is in response to determining that the request for the primary meeting is from a user (User A) and the request for the sub-meeting is from the same user (User A).

In a scenario where policies and permissions 121B of the second sub-meeting 106 are not copied from the properties, policies and permissions 121A of the primary meeting 105, the system can generate unique bridge information for the sub-meeting, such as the second sub-meeting 106B shown in FIG. 6. In this example, the bridge information for the second sub-meeting 106B is independently generated so that the invitees of the second sub-meeting 106B cannot call in and interfere with the call of the other meetings, e.g., the first sub-meeting 106A.

Figure 7:
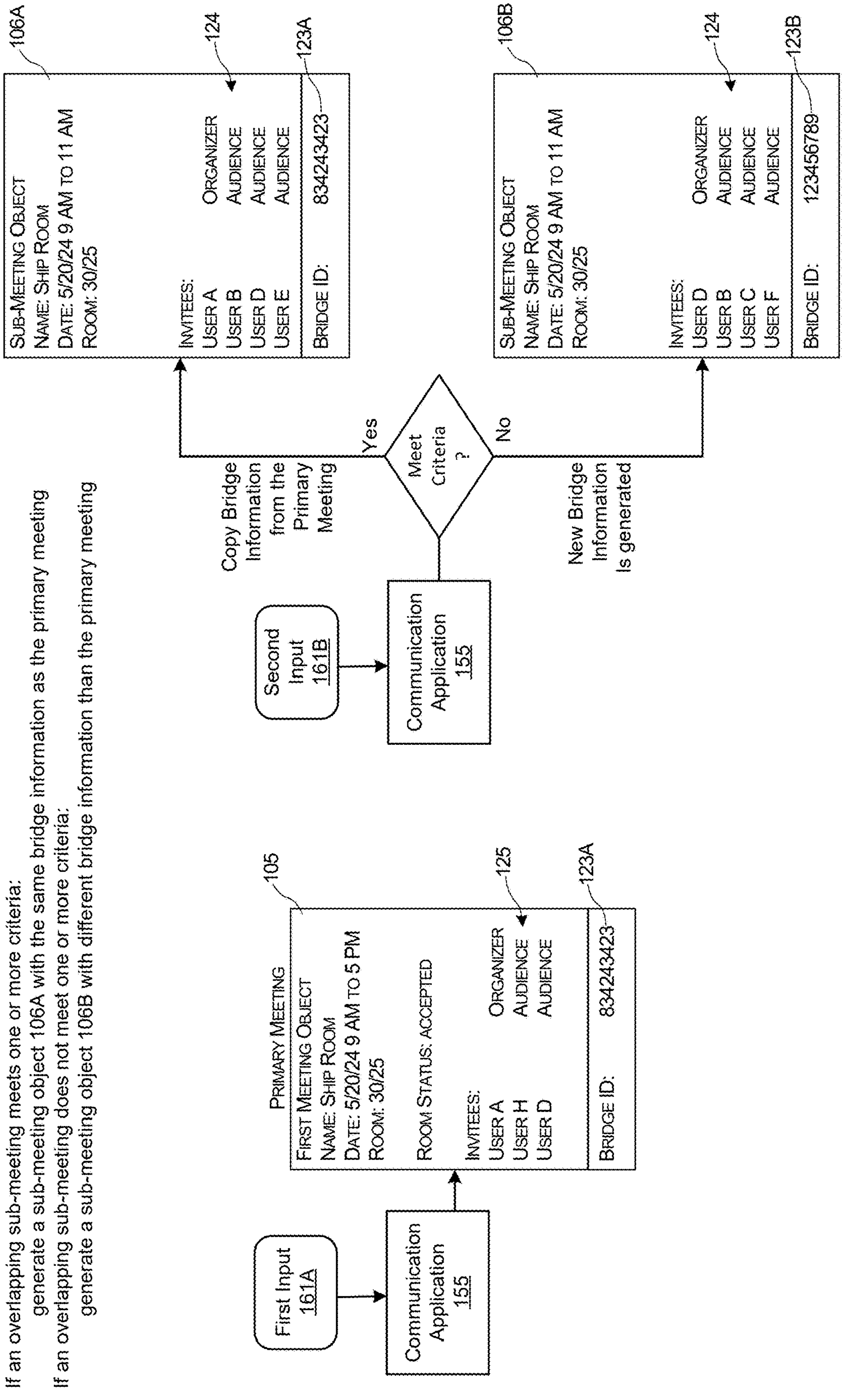
FIG. 7 shows examples of meeting objects that result when a system determines that a meeting conflict is deliberate if overlapping meetings have attributes that meet one or more criteria.

Referring now to FIG. 7, the disclosed techniques include embodiments for dynamically selecting bridge configurations for meetings that overlap existing meetings. The system can use identical or different bridge configurations mixer/dial-in number/PIN depending on whether meeting invites are directed to deliberate overlapping meetings. In some configurations, identical bridge configurations are used across the individual meetings when a system determines that invitations to the individual meetings are deliberate overlapping meetings. However, the system generates a unique bridge configuration for each respective meeting if the invitations for the individual meetings do not indicate deliberate overlapping meetings. The system can use one or more criteria to determine if two or more overlapping meetings are deliberate.

For example, if overlapping meetings are set up by the same organizer or a delegate of that organizer, the system determines that the overlapping meetings are deliberate, and those meetings are configured with the same bridge configuration. In another example, overlapping meetings that are assigned to the same conference room, the system determines that the overlapping meetings are deliberate, and those meetings are configured with the same bridge configuration. The system can also use an artificial intelligence model to analyze historical information to determine that the overlapping meetings are deliberate.

Referring now to FIG. 7, an example of how a system determines that a meeting conflict is deliberate or not deliberate is shown and described below. This example shows that the same bridge configuration can be used for overlapping meetings if overlapping meetings have attributes that meet one or more criteria. This example also shows that different bridge configurations can be used in each overlapping meeting if the overlapping meetings have attributes that do not meet one or more criteria.

As shown in FIG. 7, the system can receive a first request 161A for causing a generation of a primary meeting object 105 defining attributes of a primary meeting for a first time period, e.g., 9 AM to 5 PM, the first request causing the system to generate a first bridge configuration 123A for facilitating a first communication session. In response to the input, the system generates the primary meeting object 105 including attributes of the primary meeting. The system also generates the first bridge configuration 123A for inclusion in the attributes of the primary meeting. This first bridge configuration 123A is for facilitating the first communication session. Where only invitees of the primary meeting, e.g., users having access to the assigned bridge configuration, are able to join the first communication session.

The system also receives a second input that includes data for the overlapping meeting. The second input causes the system to determine if the overlap is deliberate, e.g., meets or satisfies criteria described herein. Depending on the attributes of a sub-meeting defined in the second request 161B, the system can either create (1) a sub-meeting 106A having a bridge configuration that is identical to the first bridge configuration 123A of the primary meeting, or (2) a sub-meeting 106B having a bridge configuration that is different than the first bridge configuration 123A of the primary meeting. The system determines if the overlap is deliberate by the use of one or more criteria described herein. In either outcome, the sub-meetings can be generated using the attributes of the second request 161B, e.g., the name of the meeting, a defined timeline, etc. The second input includes a second request 161B for causing a generation of a sub-meeting object 106 defining attributes of a sub-meeting for a second time period that overlaps at least a portion of the first time period. For illustrative purposes, overlapping meetings are also referred to herein as conflicting meetings.

In response to receiving the second request 161B for causing a generation of a sub-meeting object 106 defining a sub-meeting for the second time period that overlaps at least a portion of the first time period, the system generates the sub-meeting object 106 defining the sub-meeting for the second time period that overlaps at least the portion of the first time period. Also, in response to receiving the second request 161B, the system determines if the attributes of the sub-meeting satisfy one or more criteria with respect to the attributes of the primary meeting. Attributes of a meeting can be the name of an organizer, a description room number, a list of invitees, a start time, an end time, a description, shared content, etc. The system can use any criteria for comparing the attribute of the primary meeting with attributes of the sub-meeting.

In response to determining that the attributes of the sub-meeting satisfy the one or more criteria with respect to the attributes of the primary meeting, the system copies or uses the first bridge configuration 123A from the primary meeting object for storage in association with the sub-meeting object 106. The first bridge configuration 123A permitting invitees 124 of the sub-meeting to join the first communication session with the invitees 125 of the primary meeting. This allows the system to use identical bridge configuration is used across the two meetings: the primary meeting and the sub-meeting. The system uses an identical bridge configuration for each overlapping meeting if the overlapping meetings are deliberate overlapping meetings.

If the system determines that the attributes of the second request 161B do not satisfy the one or more criteria with respect to the attributes of the first request 161A, the system generates a unique bridge configuration 123B for facilitating a second communication session for the invitees 124 of the sub-meeting. The unique bridge configuration 123B facilitates a second communication session restricts the invitees 124 of the sub-meeting from exchanging audio streams and video streams with the invitees 125 of the primary meeting participating in the first communication session. The system uses unique bridge configuration for each meeting if the overlapping meetings are not deliberate overlapping meetings.

Figure 8:
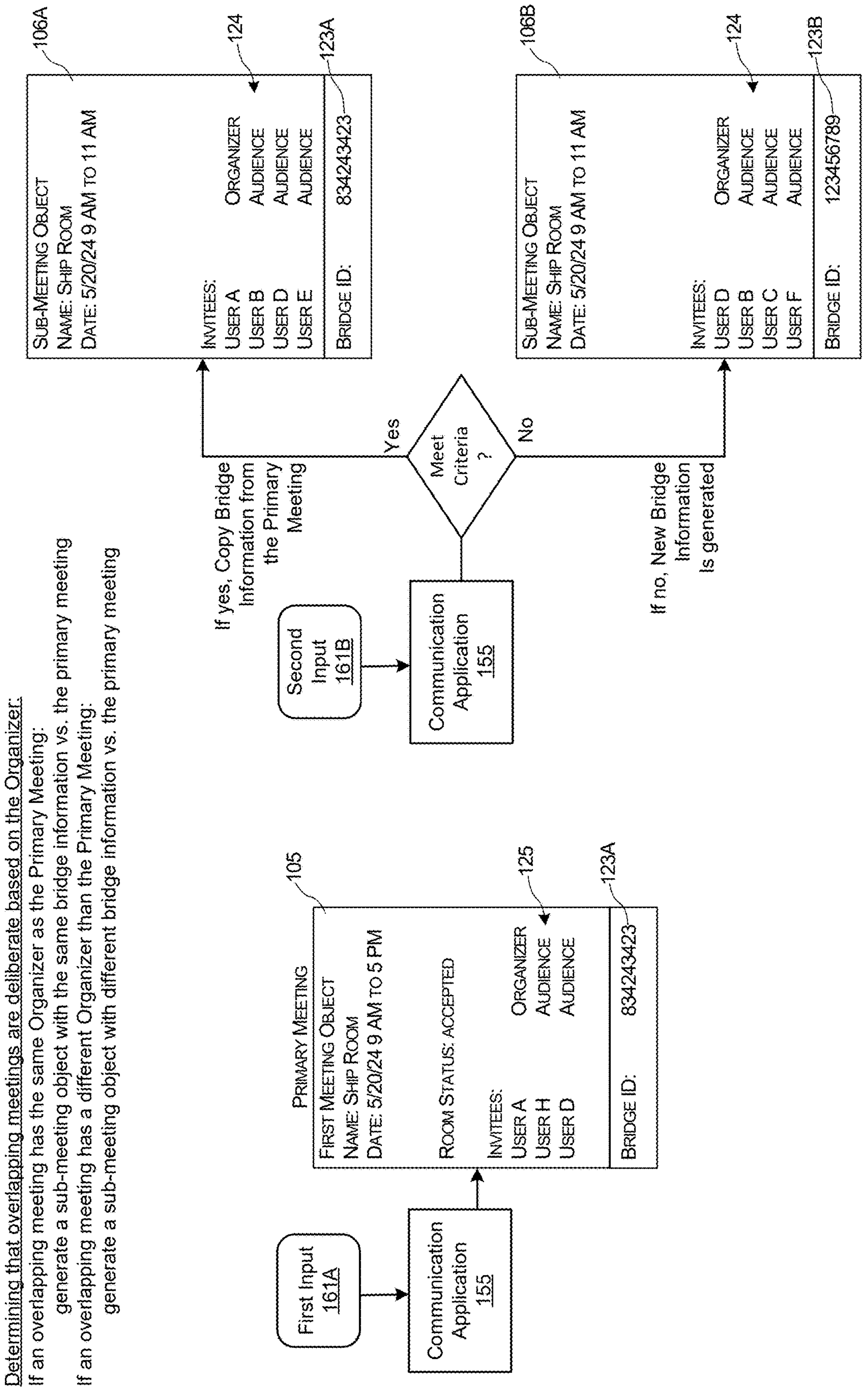
FIG. 8 shows examples of meeting objects that result when a system determines that a meeting conflict is deliberate if overlapping meetings are set up by the single user or a delegate of the user.

Referring now to FIG. 8, the system can determine if a meeting conflict is deliberate based on two meetings that are set up by a single user or a delegate of the user. In this embodiment, operations for determining that the attributes of the sub-meeting satisfy the one or more criteria with respect to the attributes of the primary meeting includes determining that an identity of an organizer for the sub-meeting is the same organizer for the primary meeting. The first bridge configuration is used for the sub-meeting and the primary meeting in response to determining that the identity of the organizer for the sub-meeting is the same organizer for the primary meeting. On the other hand, a unique bridge configuration is used for the sub-meeting in response to determining that the identity of the organizer for the sub-meeting is not the same organizer, or a delegate of the organizer, for the primary meeting.

Embodiments herein can also include criteria where the system uses identical bridge configurations for meetings that are set up from different organizers. In such embodiments, this system can generate a new unique identifier for a sub-meeting if the sub-meeting is set up by the same organizer of the primary meeting.

Figure 9:
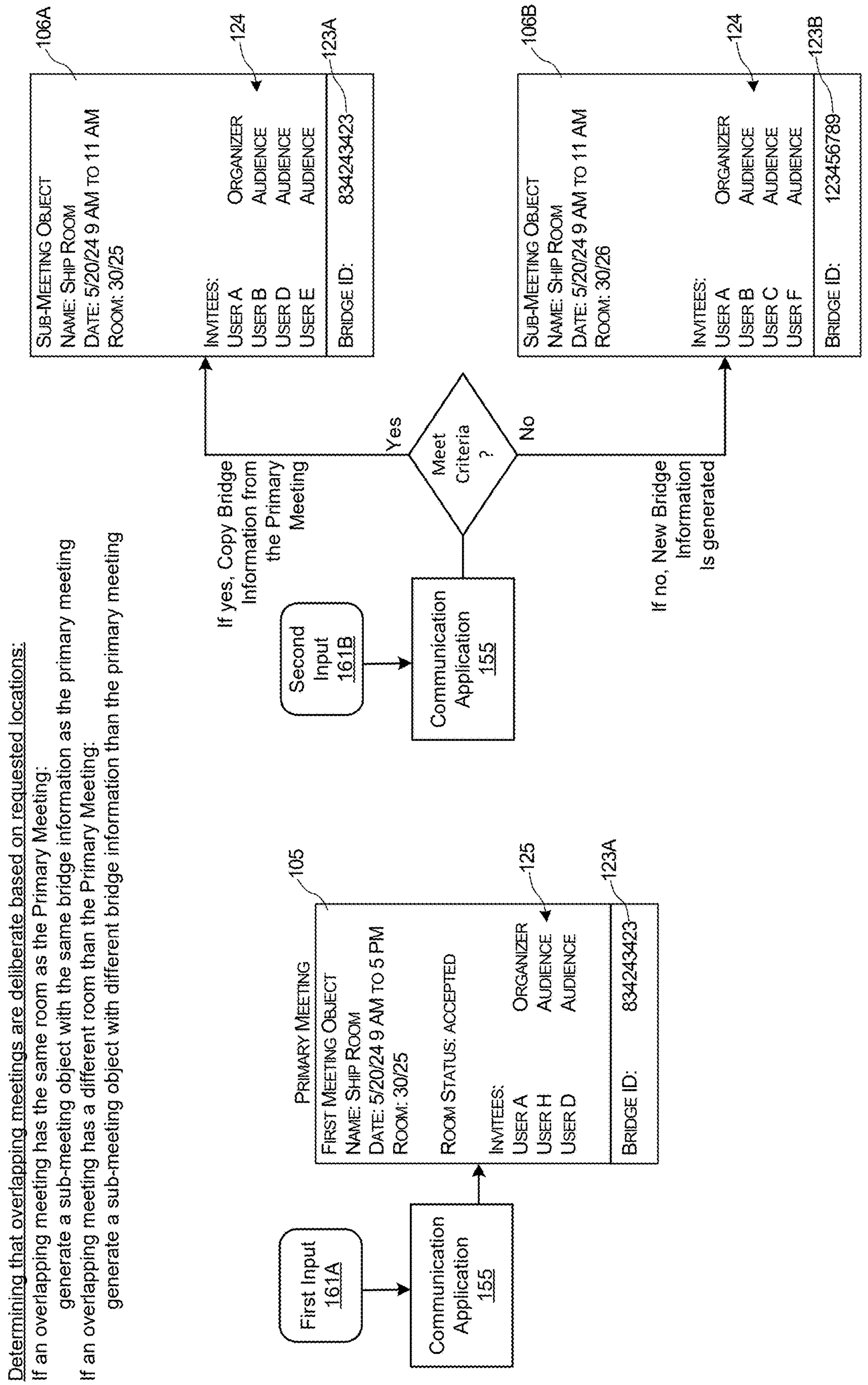
FIG. 9 shows examples of meeting objects that result when a system determines that a meeting conflict is deliberate if overlapping meetings are set up to use the same room.

Referring now to FIG. 9, the system can determine if a meeting conflict is deliberate based on overlapping meetings that claim the same location, e.g., the same conference room. In this embodiment, operations for determining that the attributes of the sub-meeting satisfy the one or more criteria with respect to the attributes of the primary meeting includes determining that a room identifier included in the request for the sub-meeting is identical as a room identifier included in the request for the primary meeting. The first bridge configuration is used for the sub-meeting and the primary meeting in response to determining that the room identifier included in the request for the sub-meeting is identical as the room identifier included in the request for the primary meeting. On the other hand, the unique bridge configuration is used for the sub-meeting in response to determining that the room identifier included in the request for the sub-meeting is not identical as the room identifier included in the request for the primary meeting.

Figure 10:
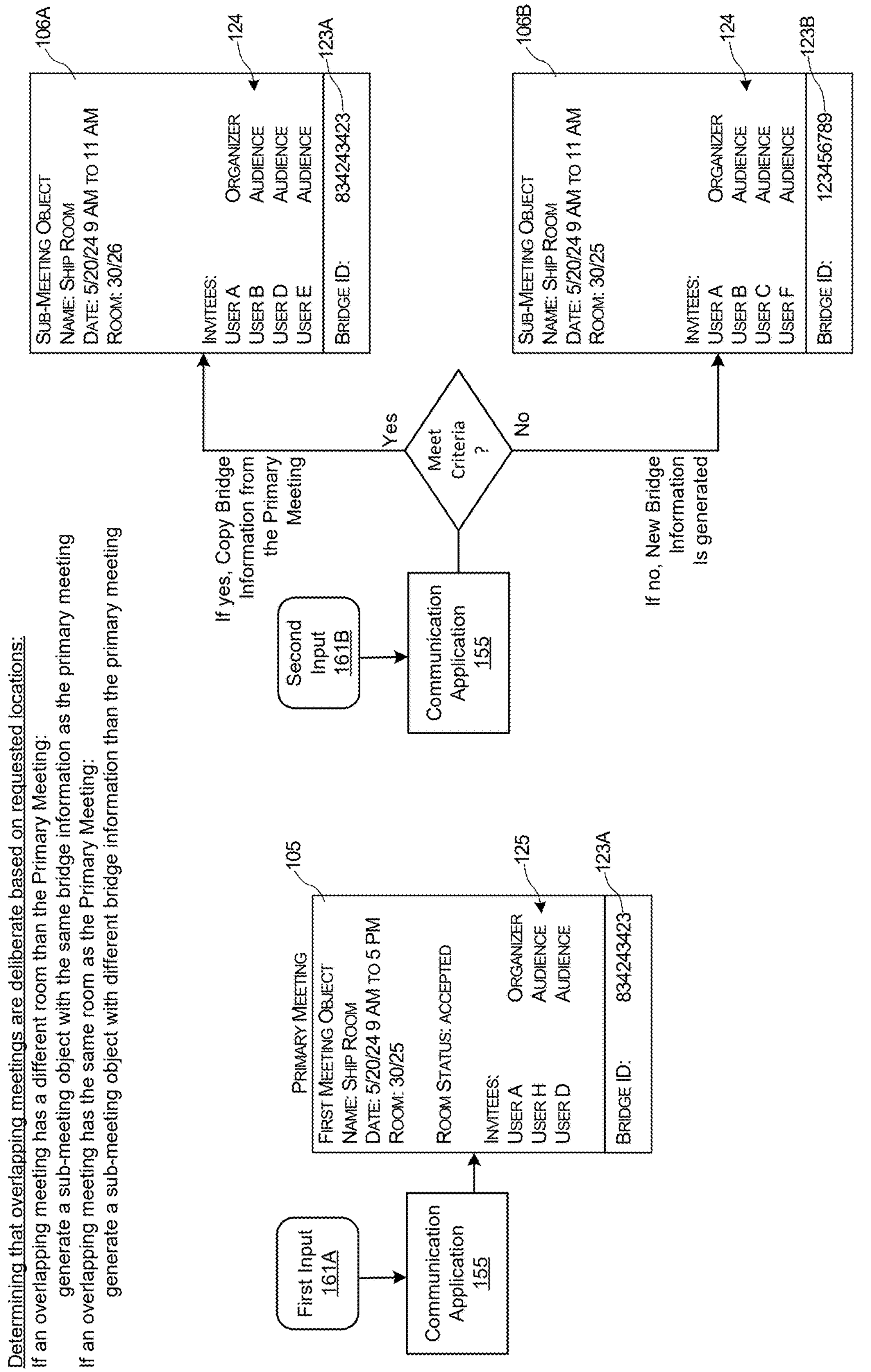
FIG. 10 shows examples of meeting objects that result when a system determines that a meeting conflict is deliberate if overlapping meetings are set up to use different rooms.

Referring now to FIG. 10, the system can determine if a meeting conflict is deliberate based on overlapping meetings that are set up for different locations, e.g., each meeting request refers to different rooms or locations. In this embodiment, operations for determining that the attributes of the sub-meeting satisfy the one or more criteria with respect to the attributes of the primary meeting includes determining that a room identifier included in the request for the sub-meeting is not identical as a room identifier included in the request for the primary meeting. The first bridge configuration is used for the sub-meeting and the primary meeting in response to determining that the room identifier included in the request for the sub-meeting is not identical as the room identifier included in the request for the primary meeting. On the other hand, in this embodiment, the unique bridge configuration is used for the sub-meeting in response to determining that the location identifier included in the request for the sub-meeting is identical as the location identifier included in the request for the primary meeting. For illustrative purposes, the terms "location" and "room" are used interchangeably and are to both be interpreted as a distinct location that is physically separate from one another and physically separate from other locations.

Figure 11:
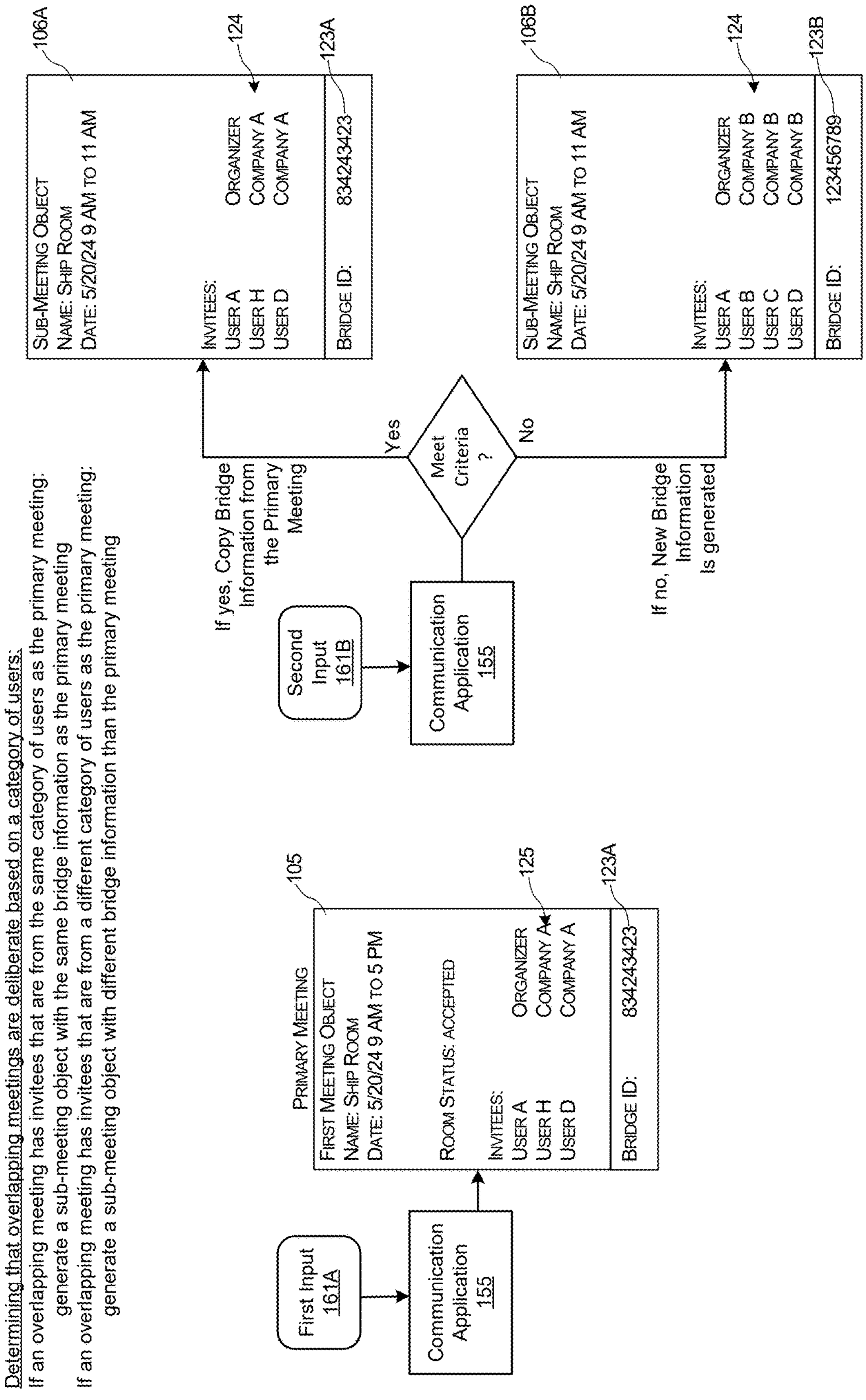
FIG. 11 shows examples of meeting objects that result when a system determines that a meeting conflict is deliberate if overlapping meetings have invitees in the same category of users.

Referring now to FIG. 11, the system can determine if a meeting conflict is deliberate based on overlapping meetings that are both associated with invitees having a common user category. For example, users having a common user category can include people on the same team, department, company, etc. User categories can be determined by one or more factors including: a user's name, title, ranking, company, email domain, etc. In this embodiment, when the system detects that invitees of a primary meeting are in the same category as invitees of a sub-meeting, the system deems these overlapping meetings to be deliberate, and thus, the system provides each set of invitees with the same bridge configuration so they can all participate in a call together.

In this embodiment, operations for determining that the attributes of the sub-meeting satisfy the one or more criteria with respect to the attributes of the primary meeting includes determining that invitees for the sub-meeting are associated with a first category of users and invitees for the primary meeting are associated with the first category of users. The first bridge configuration is used for the sub-meeting and the primary meeting in response to determining that invitees for the sub-meeting are associated with the first category of users and invitees for the primary meeting are associated with the first category of users, e.g., both groups are with the same team, company, email domain, etc. The unique bridge configuration is used for the sub-meeting in response to determining that invitees for the sub-meeting are associated with the first category of users, e.g., internal employees, and invitees for the primary meeting are associated with a second category of users, e.g., the sub-meeting is set up for external employees. This allows the internal employees to talk exclusively between themselves in the primary meeting that overlaps in time with the sub-meeting, and the external employees can talk exclusively between themselves without any communication with the internal employees.

In another embodiment, a system can determine that a meeting conflict is deliberate if overlapping meetings are both with invitees from different user categories. For example, users from a separate location or organization are considered to be from different user categories, e.g., Company A employees are in a first category and Company B employees are in a second category. This can apply to any category including, but not limited to user titles, rankings, companies, email domains, etc. Thus, people that are part of the different organizations or locations can be joined in a common conference call using a common meeting ID copied to two different overlapping meetings.

In this embodiment, operations for determining that the attributes of the sub-meeting satisfy the one or more criteria with respect to the attributes of the primary meeting includes determining that invitees for the sub-meeting are associated with a first category of users and invitees for the primary meeting are associated with a second category of users. The first bridge configuration is used for the sub-meeting and the primary meeting in response to determining that invitees for the sub-meeting are associated with the first category of users and invitees for the primary meeting are associated with the second category of users. In some embodiments, when invitees of both overlapping meetings are part of the same category, the system can use a unique bridge configuration is used for the sub-meeting, while the first meeting is used for the invitees of the primary meeting.

Figure 12:
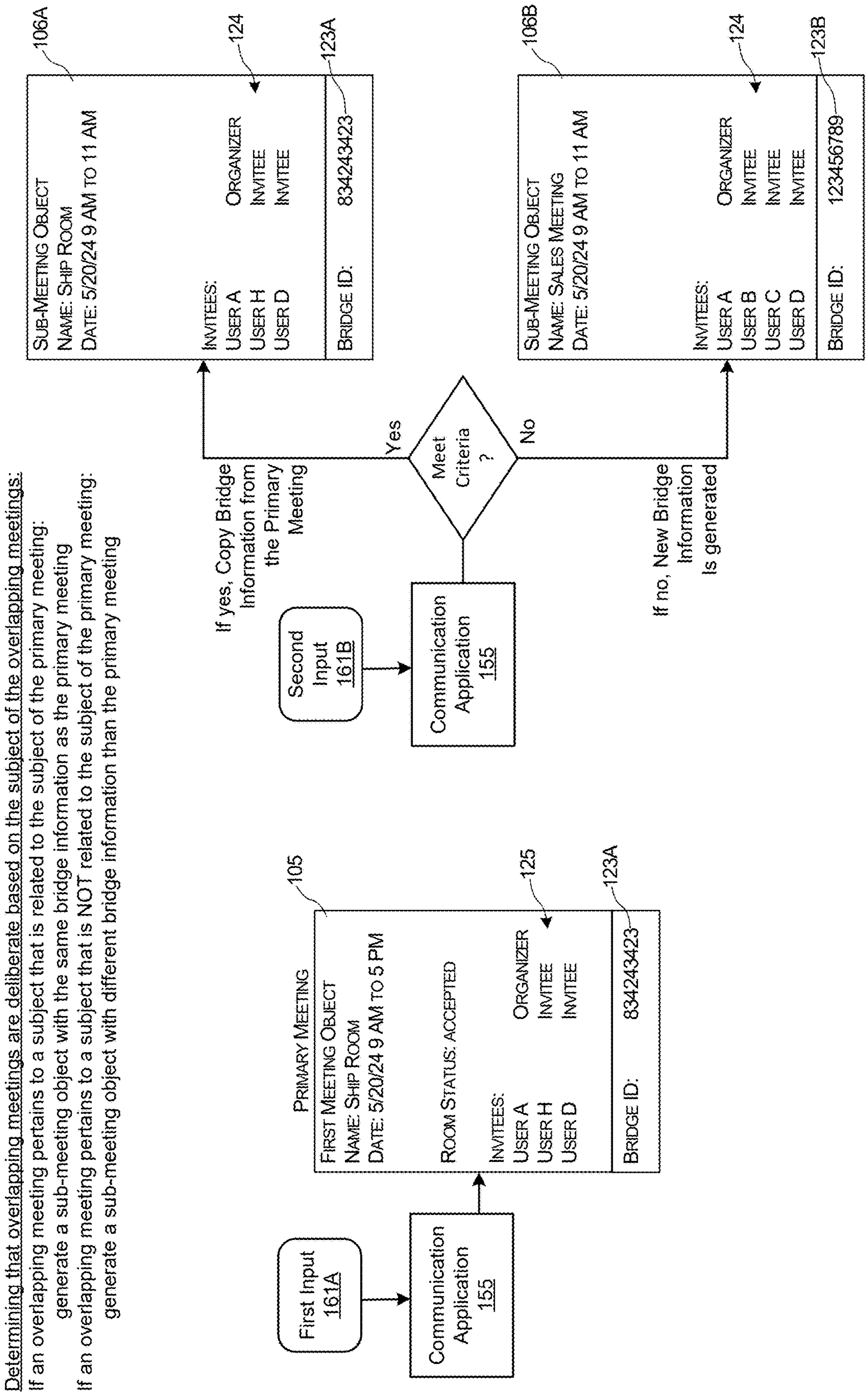
FIG. 12 shows examples of meeting objects that result when a system determines that a meeting conflict is deliberate if the context of the meetings have a threshold level of similarity, e.g., subjects are the same.

Referring now to FIG. 12, the system can determine if a meeting conflict is deliberate based on overlapping meetings that are both related to the same subject. If the subjects are the same for both overlapping meetings, then both meetings use the same bridge. In this embodiment, operations for determining that the attributes of the sub-meeting satisfy the one or more criteria with respect to the attributes of the primary meeting includes determining that a subject for the sub-meeting has a threshold level of relevance with the subject of the primary meeting. The first bridge configuration is used for the sub-meeting and the primary meeting in response to determining that the subject for the sub-meeting has the threshold level of relevance with the subject of the primary meeting. This can include sending the subject of each meeting to a large language model (LLM) with a prompt causing the LLM to generate a relevancy score of two subjects. If the subjects of each meeting have a relevancy score above or at a threshold, then one bridge configuration is used for the sub-meeting and the primary meeting. The unique and separate bridge configuration is used for the sub-meeting in response to determining that the subject for the sub-meeting does not have the threshold level of relevance with the subject of the primary meeting.

Figure 13A:
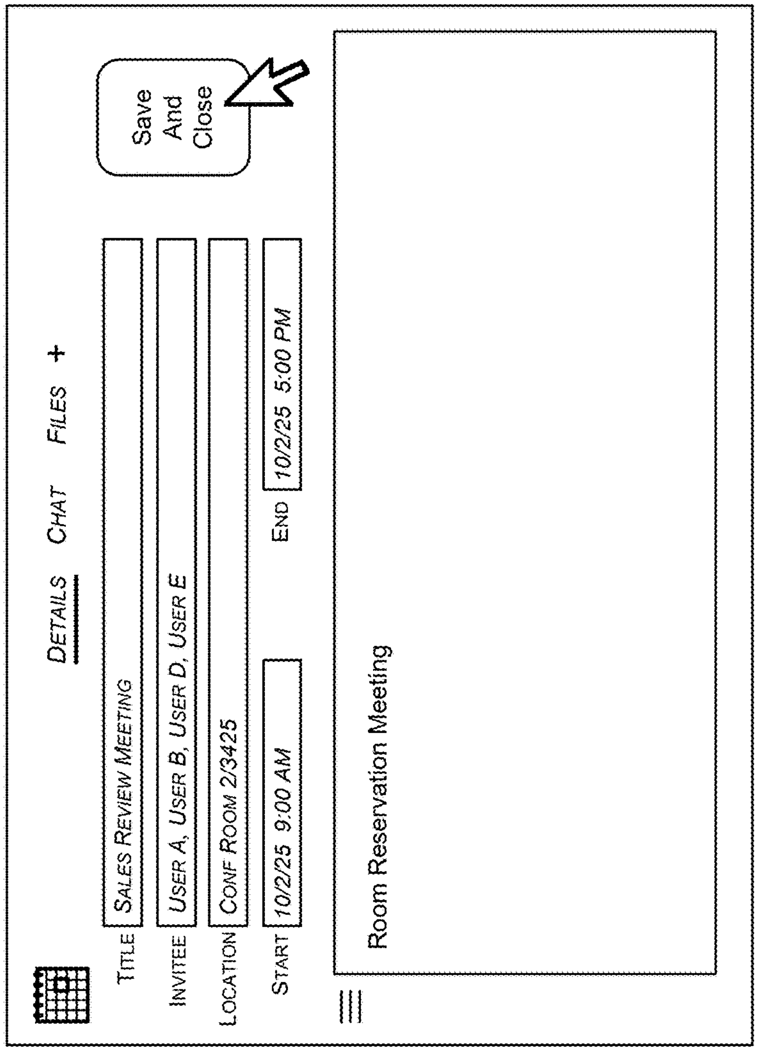
FIG. 13A shows the first stage of a process of receiving a user input for determining that a meeting conflict is deliberate or not deliberate.
Figure 13C:
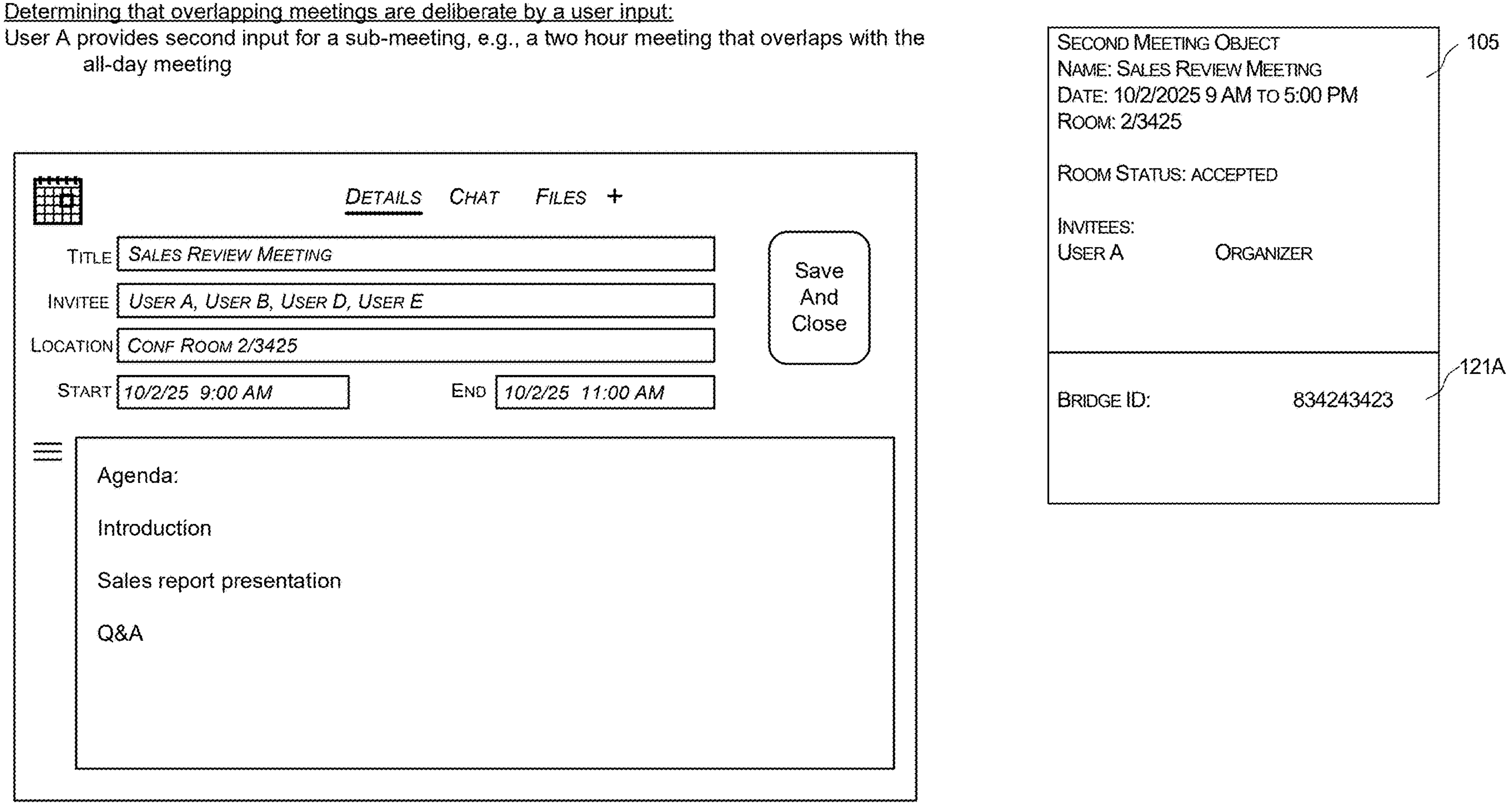
FIG. 13C shows the third stage of a process of receiving a user input for determining that a meeting conflict is deliberate or not deliberate.

Referring now to FIGS. 13A-13F, an embodiment for determining that a meeting conflict is deliberate is based on a user input provided in the process of generating an overlapping meeting object. As shown in FIG. 13A, a user input can cause the generation of a primary meeting object shown in FIG. 13B. Then, in FIG. 13C, the user provides an input for generating a request to generate a sub-meeting. The sub-meeting of FIG. 13C includes a time that overlaps with the primary meeting generated in FIG. 13B. Then, as shown in FIG. 13D, in response to receiving the second request 161B for causing the generation of the sub-meeting object, the system displays a notification 113 to instructing a user to provide an input indicating an intent of the second request of an overlapping meeting. The notification can provide a notice that the request for the primary meeting and the request for the sub-meeting create a scheduling conflict.

As shown in FIG. 13E, the system receives an input indicating that the intent of the second request is to deliberately create a scheduling conflict. This causes the system to use the first bridge configuration for the sub-meeting and the primary meeting. However, alternatively, as shown in FIG. 13F, in response to receiving another input indicating that the intent of the second request is to not deliberately create the scheduling conflict, the system uses a unique bridge configuration for the sub-meeting that is different than the bridge configuration of the primary meeting.

Figure 14:
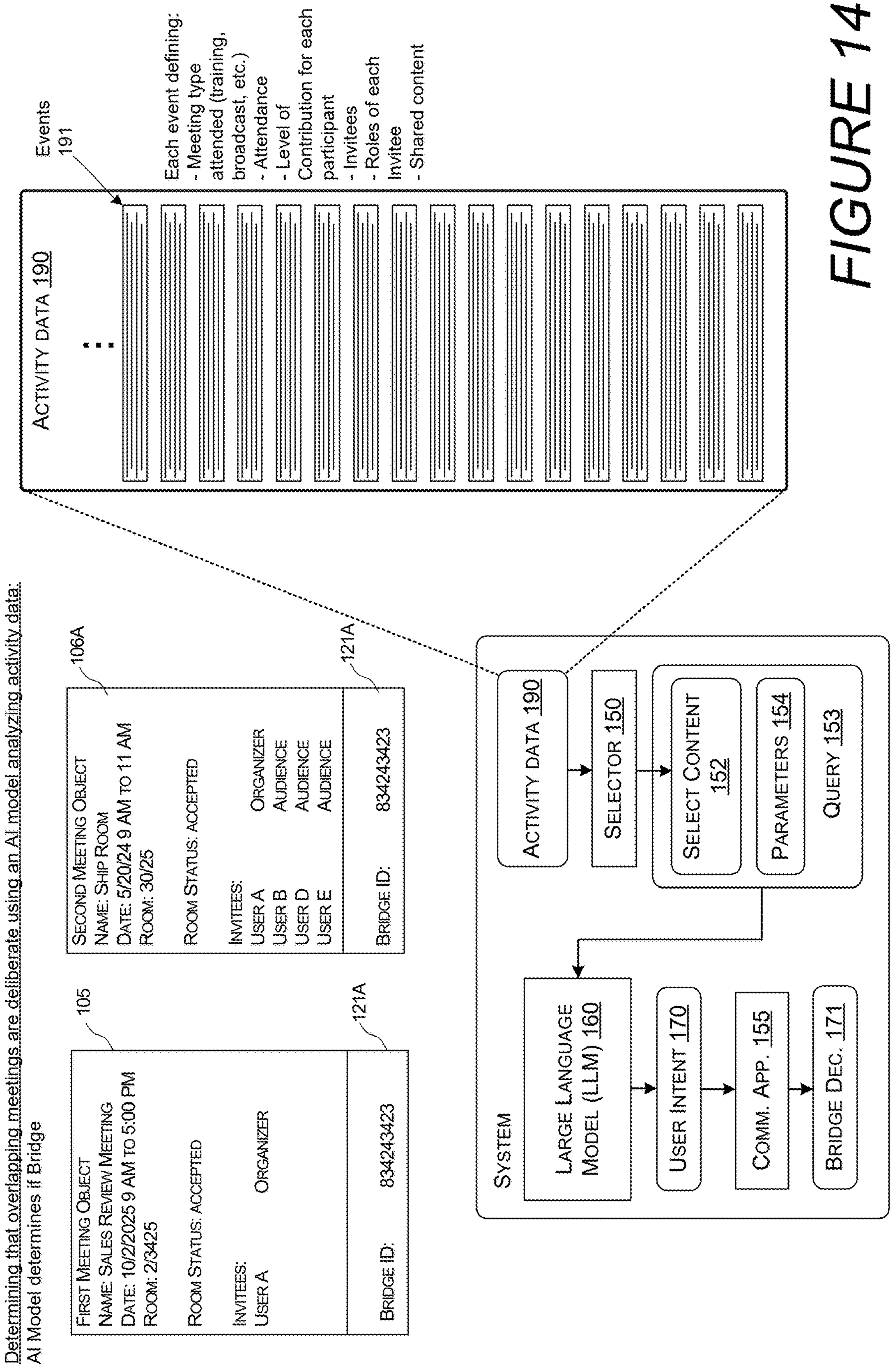
FIG. 14 shows examples of meeting objects that result when a system determines that a meeting conflict is deliberate based on activity data provided to an AI model.

Referring now to FIG. 14, the system can determine if a meeting conflict is deliberate based on an output of an AI model. These operations can include generating a query that includes activity data defining at least one of historical meeting records, attendance records, invitee lists, and user activity levels during past meetings that are dated prior to a predetermined date as grounding data for a large language model. The query includes instructions that cause the large language model to generate data defining user intent 170. The system communicates the query to the large language model causing the large language model to generate the data defining user intent 170. The data defining user intent causing the system to determine that the attributes of the sub-meeting satisfy one or more criteria with respect to the attributes of the primary meeting. The system then receives the data defining user intent 170 from the large language model. The data defining user intent 170 causes the system to generate bridge decision data 171. This can be done by the use of a communication application 155, where the bridge decision data 171 causes the communication application 155 to use the first bridge configuration for the sub-meeting and the primary meeting.

Figure 15:
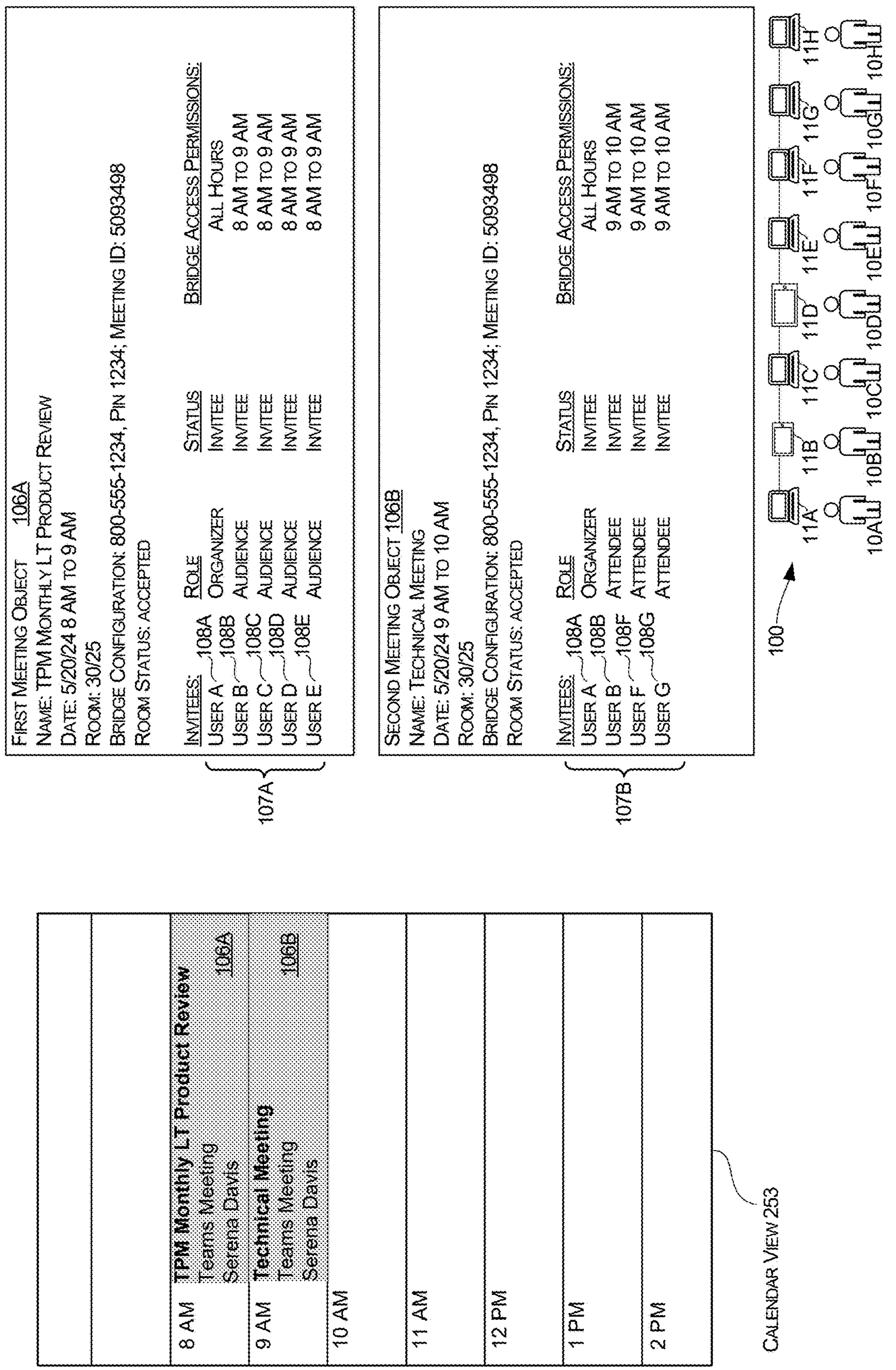
FIG. 15 shows aspects of a conference lobby feature during back-to-back conference calls while the same bridge configuration is provided across multiple meetings.

Referring now to FIG. 15, a meeting system for controlling communications for back-to-back conference calls sharing a common bridge configuration is shown and described below. In these embodiments, when the same bridge arrangement/configuration is provided across multiple meetings, a system can control access permissions to selectively permit certain groups of individuals to participate within an assigned meeting time. If a first meeting runs over the assigned meeting time, or if a person from a second subsequent meeting calls in before their assigned meeting time, that person is placed in a holding area without being connected to the active call. The person in the holding area is connected once the ongoing call ends or when the participants of the first meeting allow entry of the person in the waiting area.

FIG. 15 shows a system that manages a conference lobby feature during a back-to-back conference call, while same bridge arrangement/configuration is provided across multiple meetings. The system 100 includes a number of computing devices 11 each associated with a user 10. The computers are each interconnected using a communication session for sharing video signals, audio signals, and other shared content such as documents. In this example, there are a number of users (10A-10H) in a meeting, where User A 10A, Serena Davis, is associated with a first computing device 11A, User B 10B, Michael Wong, is associated with a second computing device 11B, User C 10C, Miguel Silva, is associated with a third computing device 11C, User D 10D, Krystal Mckinney, is associated with a fourth computing device 11D, User E, Jazmine Simmons, is associated with a fifth computing device 11E, User F 10F, Mahendra Sekaran, is associated with a sixth computing device 11F, User G 10G, Will Newman, is associated with a seventh computing device 11G, and User H 10H, Cassie Price, is associated with an eighth computing device 11H.

In the disclosed examples, one meeting 106A (which can be a sub-meeting), the TPM meeting, includes User A as the organizer and User B, User C, User D, and User E as audience members. Another meeting 106B (which can also be a sub-meeting), the Sales meeting, includes User A as the organizer and User B, User F, and User D as audience members. The device of each user is configured to participate in a communication session, e.g., a meeting, at times configured according to each meeting (also referred to herein as calendar objects 106A and 106B), while allowing member to participate on a conference call using one bridge configuration. In this embodiment, although the bridge configuration allows each set of members 107A and 107B for each meeting to communicate together, the system controls the time in which each member can join the call. For example, in response to detecting one or more criteria, the system can allow a specific user, User F, to be active on the call, e.g., communicate audio and/or video streams with other active users on the call. In addition, in response to detecting other criteria, the system can restrict a specific user, User F, from being active on the call, e.g., the system restricts a user from communicating audio and/or video streams with other active users on the call. The examples below show specific types of criteria that are used to determine if a user should be placed in a holding area or allowed to join a call. In the examples described below, the two meetings include the same bridge configuration, e.g., the same conference call ID, PIN, etc.

FIGS. 16A-16B show that if a previous meeting (the first meeting 106A) is still ongoing, a meeting server checks identities of attendees of the previous meeting. If an attendee is associated with the ongoing meeting, the server connects the attendee to the ongoing meeting. FIG. 16A shows a state of the system where the system receives a request from a user, such as User B 10B, to join the communication session. The communication session is using a bridge configuration assigned to a first meeting 106A identifying a first set of participants 107A. The bridge configuration is also assigned to the second meeting 106B identifying a second set of participants 107B. The second meeting 106B also follows the first meeting. In this example, the request is received while the first meeting 106A is ongoing. User B is also a member of the first meeting. This membership was received via an invitation from the organizer.

In some embodiments, the first meeting is ongoing during the time period of the first meeting, e.g., between the start and end time of the first meeting. For example, the first meeting 106A is ongoing during a time period defined by a start time and an end time of the first meeting, wherein changing the status of the user 10B to the wait state is in response to determining that the request of the user is received during the time period of the first meeting and in response to determining that the identity 108B of the user 10B of the request is not a member of the first set of participants 107A of the first meeting 106A.

As shown in FIG. 16A, in some embodiments, the system can check the identities of attendees. In response to the request to join the communication session using the single bridge configuration while the first meeting 106A is ongoing, the system can determine that an identity 108B of a user 10B of the request is a member of the first set of participants 107A of the first meeting 106A. As shown in FIG. 16B, if an attendee is associated with the ongoing meeting, the server connects the attendee to the ongoing meeting. The server connects the device 11B of the user 11B to the communication session in response to determining that the identity 108B of the user 10B of the request is a member of the first set of participants 107A of the first meeting 106A.

Referring now to FIGS. 17A-17E, an example is shown where the requesting user, User B, is not a member of the first meeting and is a member of the second meeting giving them access to the conference bridge during the time of the second meeting. Here, User B sends a request to join the call while the first meeting is ongoing. In this example, the requesting user, User B, is placed in a holding area then admitted to the call by a member of the first meeting.

Figure 17A:
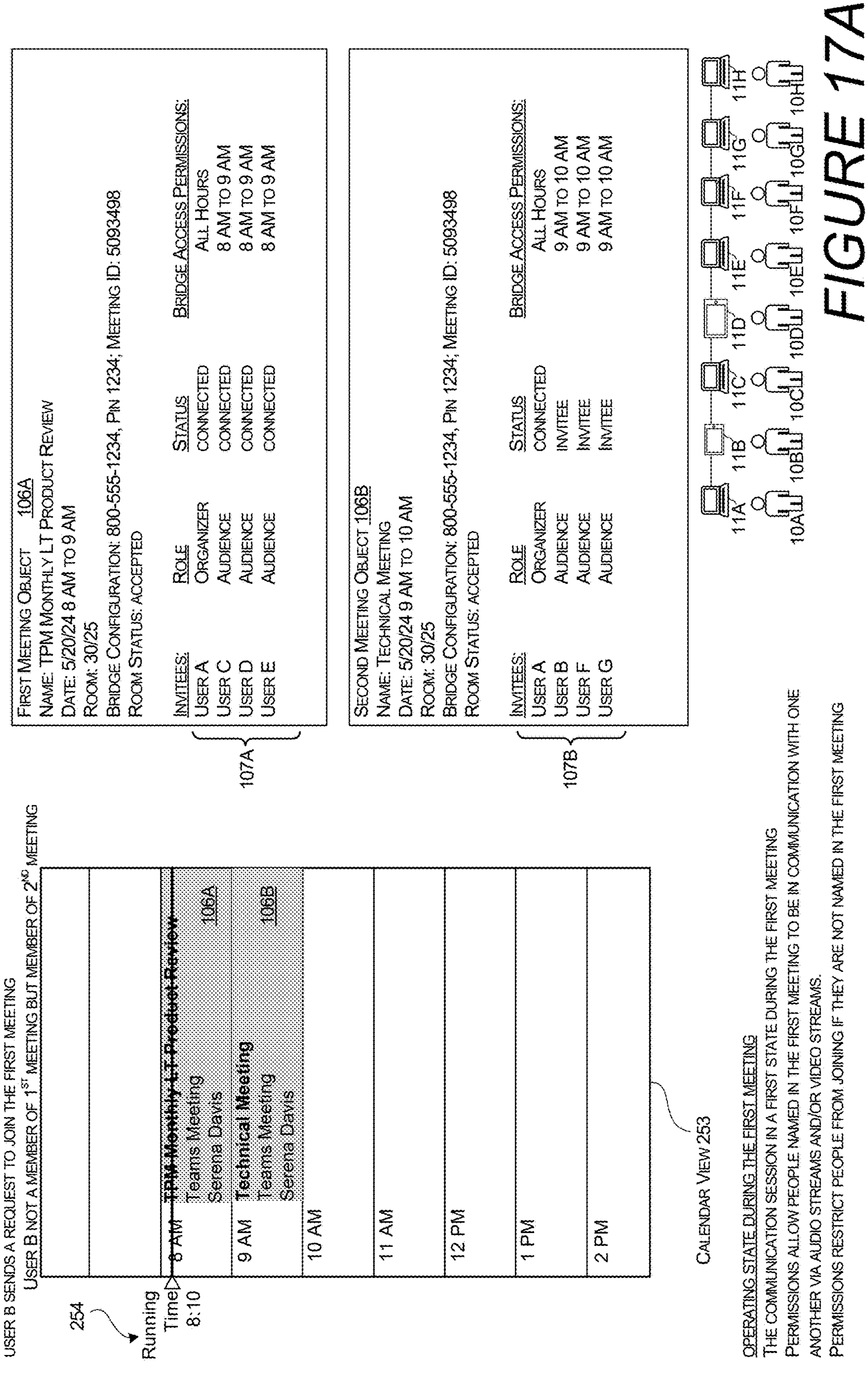
FIG. 17A shows a first state of a process of a conference lobby feature during back-to-back conference calls where a user is requesting to join a meeting.
Figure 17C:
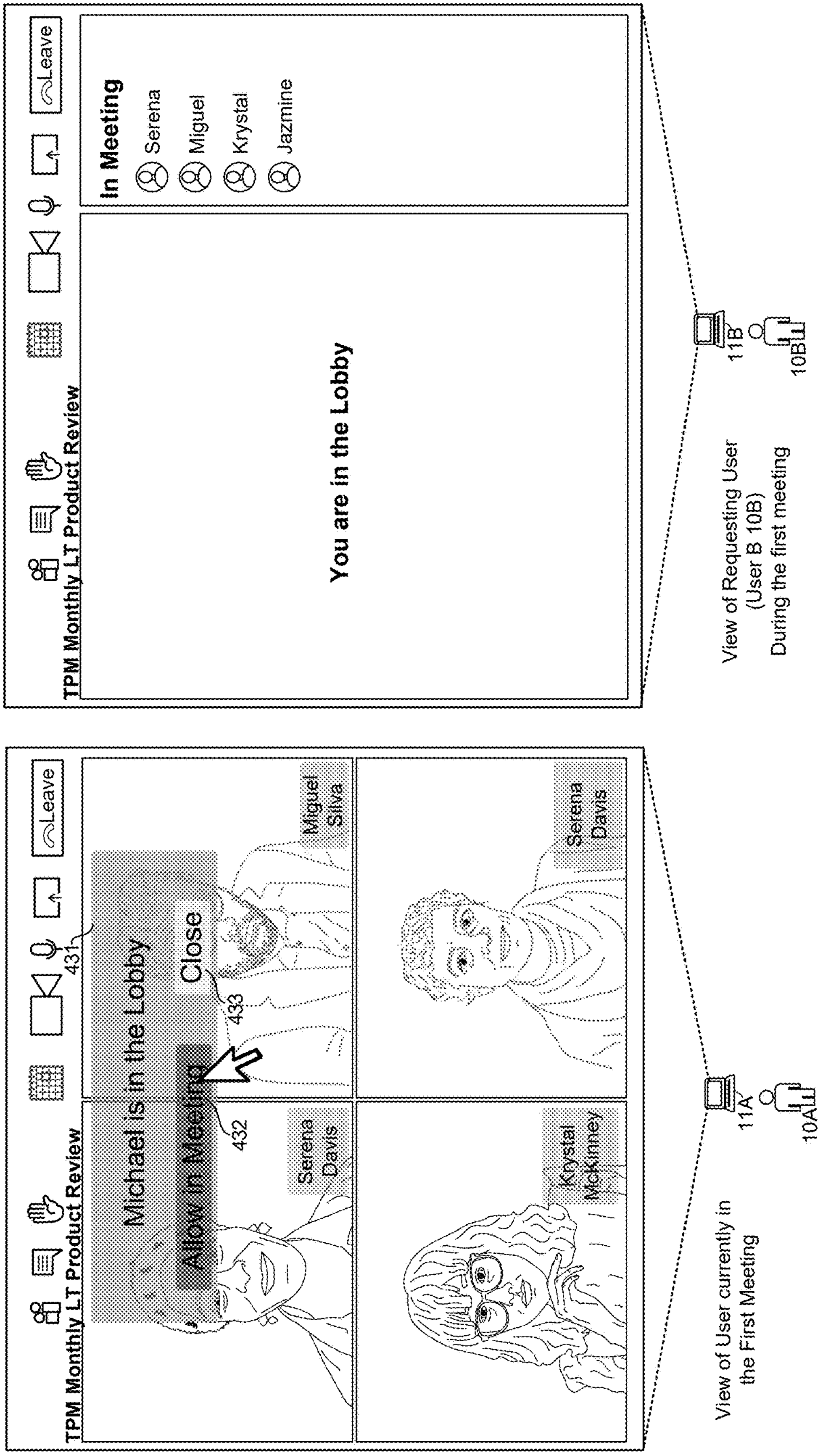
FIG. 17C shows two user interface arrangements for the person in the holding area: a first UI for the users in the meeting, and a second UI for the person in the holding area.

FIG. 17A shows that the user, User B, sends a request to join the call. Then, as shown in FIGS. 17B and 17C, since the requesting user is not associated with the ongoing meeting, the user is placed in a holding area without being connected to the active call. Thus, in response to determining that the identity 108B of the user 10B of the request is not a member of the first set of participants 107A of the first meeting 106A, as shown in FIG. 17B, the system changes the status of the user 10B to a wait state, e.g., places them in a holding area.

Then, as shown in FIG. 17C, the wait state causes a display of a status on a user interface displayed on a device 11B associated with the requesting user, User 10B. This example shows them that they are in a lobby. The system shows who is in the meeting but they are unable to communicate audio and video to the meeting participants. Also shown in FIG. 17C, the wait state causes a display of the status on a user interface displayed on a device 11A associated with a member, such as User A 10A, of the first meeting 106A. The wait state restricts communication of audio streams and video streams between a computing device 11B of the user 10B and participants of the first meeting, User A, User C, User D and User E.

As shown in FIGS. 17C, an active member of the first meeting, or a delegate, provides an input to let the requesting user, User B, in the call. The system receives the input from the participant 10A of the first meeting 106A permitting the user 10B access to the communication session. In response to receiving the input from the participant 10A of the first meeting 106A permitting the user 10B access to the communication session, the system connects the computing device 11B of the user 10B with the communication session of the active participants of the first meeting.

Figure 17E:
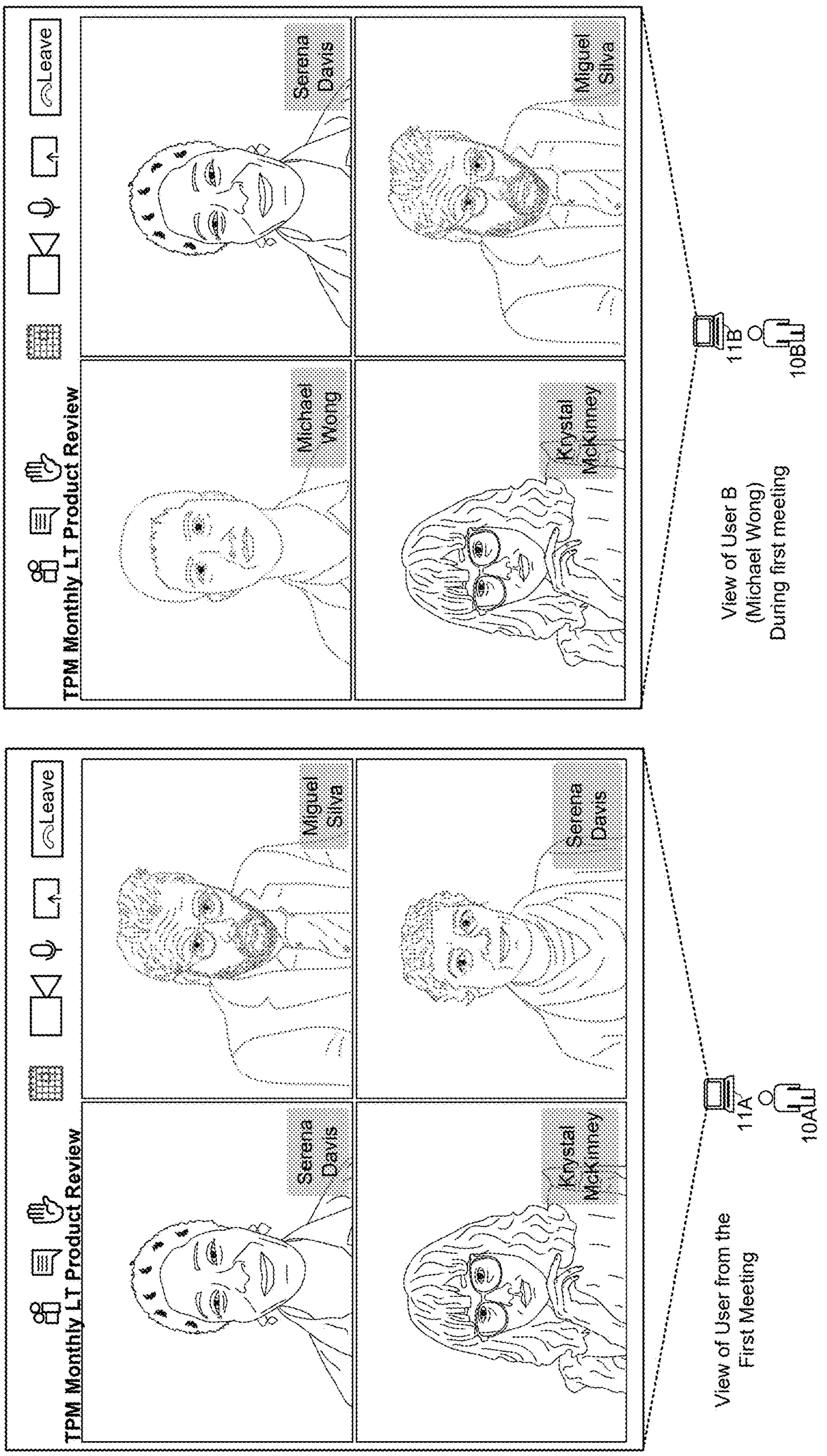
FIG. 17E shows a change in the user interface arrangements when the user is moved out of the holding area.

FIG. 17D shows how this status change is recorded in the permissions and status of the meeting object. The role and/or permission is copied from the second meeting and they are given this status in the first meeting. FIG. 17E shows the resulting user interfaces that are displayed to the requesting user, User B, and the other meeting attendees, such as User A.

Referring now to FIGS. 18A-18F, an example is shown where the requesting user, User B, is not a member of the first meeting but sends a request to join the call while the first meeting is ongoing. In this example, the requesting user, User B, is placed in a holding area then admitted to the call when the first meeting reaches an end time, e.g., 9 AM.

Figure 18A:
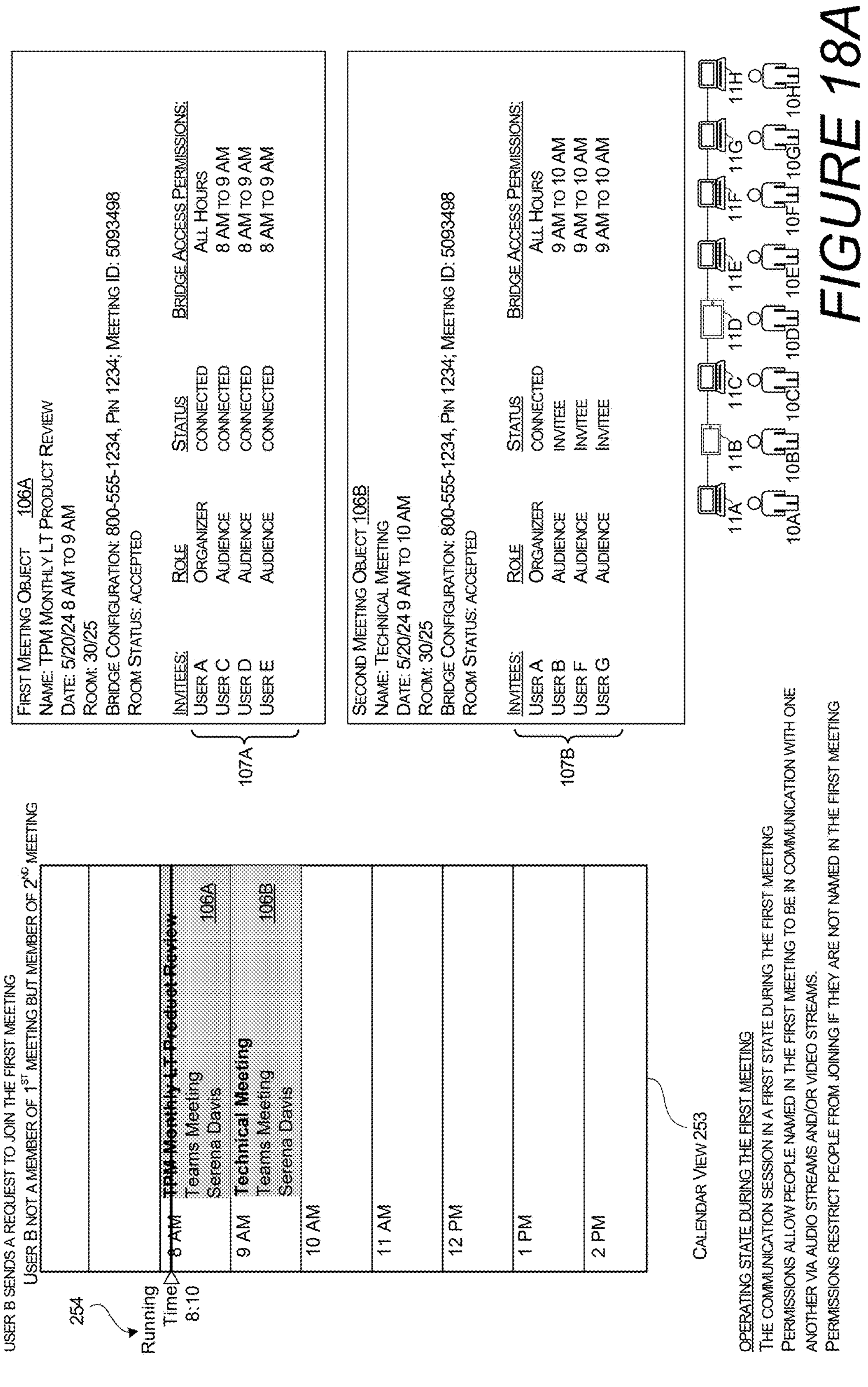
FIG. 18A shows a first state of a process of a conference lobby feature during back-to-back conference calls where a user is requesting to join a meeting.
Figure 18C:
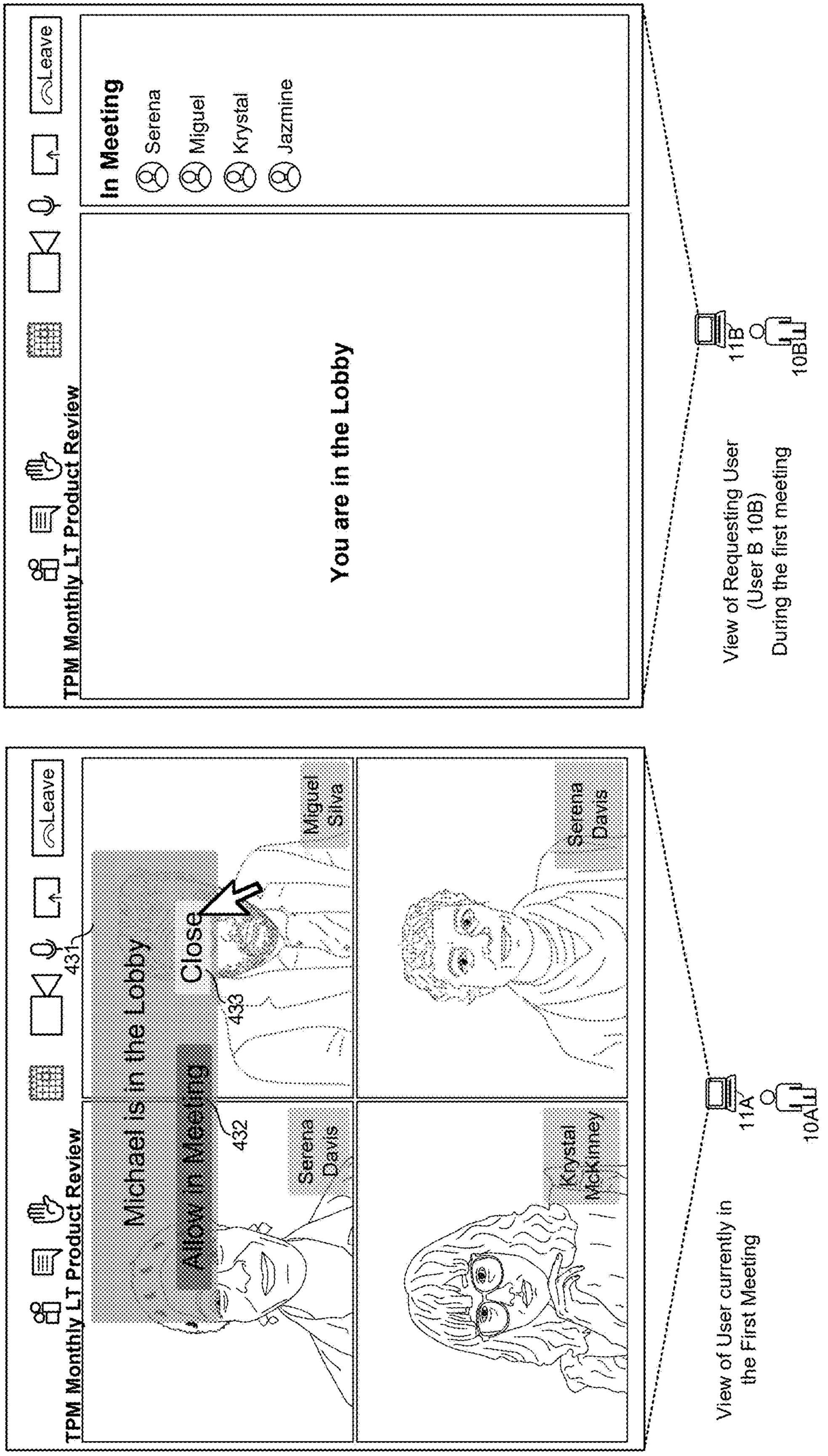
FIG. 18C shows two user interface arrangements for the person in the holding area: a first UI for the users in the meeting, and a second UI for the person in the holding area.

FIG. 18A shows that the user, User B, sends a request to join the call. Then, as shown in FIGS. 18B and 18C, since the requesting user is not associated with the ongoing meeting, the user is placed in a holding area without being connected to the active call. Thus, in response to determining that the identity 108B of the user 10B of the request is not a member of the first set of participants 107A of the first meeting 106A, as shown in FIG. 18B, the system changes the status of the user 10B to a wait state, e.g., places them in a holding area.

Then, as shown in FIG. 18C, the wait state causes a display of a status on a user interface associated with the requesting user, User 10B. This example shows them that they are in a lobby. The system shows who is in the meeting but they are unable to communicate audio and video to the meeting participants. Also shown in FIG. 18C, the wait state causes a display of the status on a user interface associated with a participant, such as User A 10A, of the first meeting 106A. The wait state restricts communication of audio streams and video streams between a computing device 11B of the user 10B and participants of the first meeting, User A, User C, User D and User E. In this example, User A does not manually admit User B into the meeting via an input.

Figure 18F:
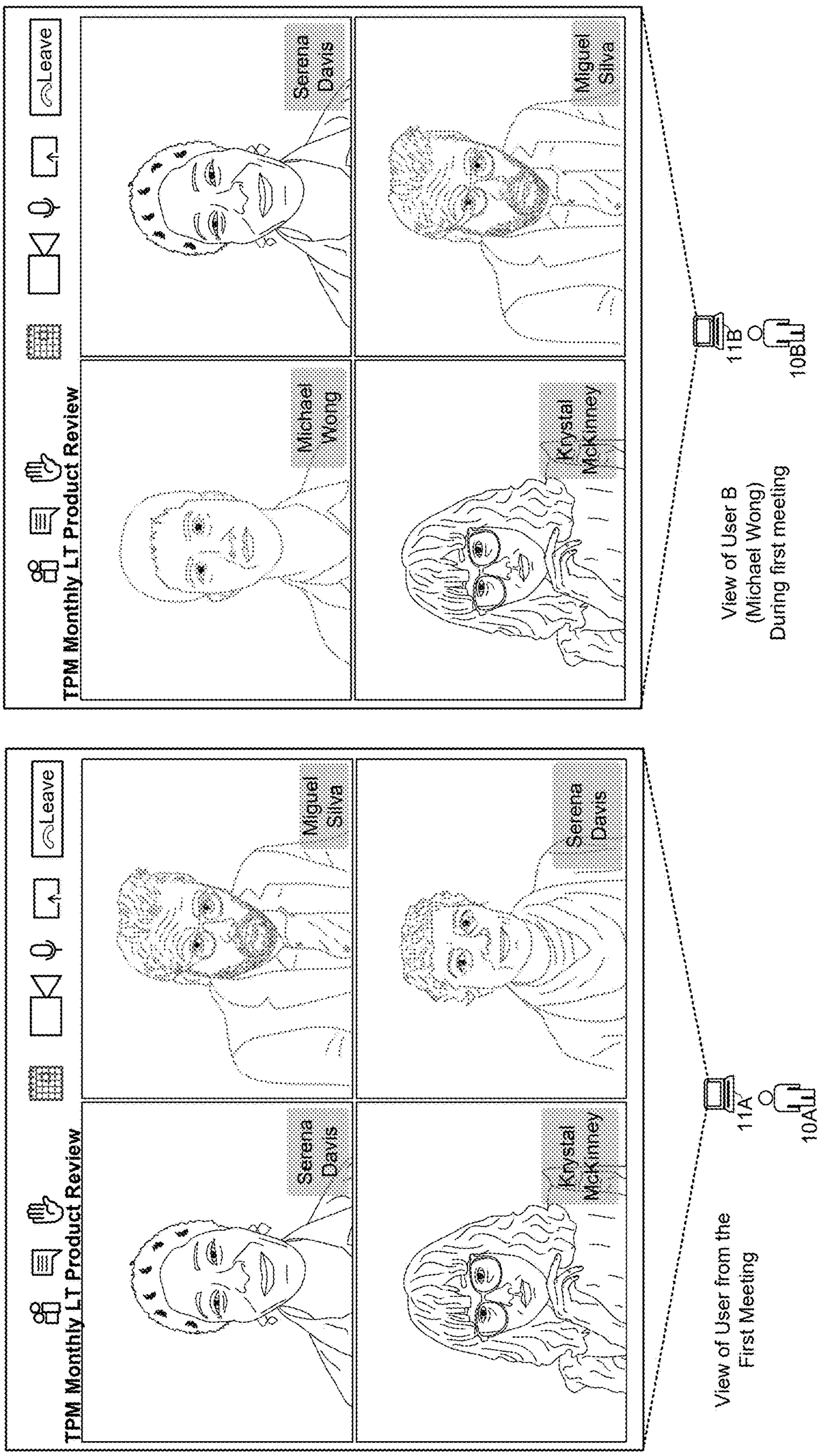
FIG. 18F shows a change in the user interface arrangements when the user is moved out of the holding area.

As shown in FIG. 18D, since there is no input to admit User B into the call, the requesting user, User B, is held in the Holding Area without communication to the active meeting participants until the first meeting ends. In this example, the meeting ends at 9:00 AM. At that time, the requesting user, User B, is then activated into the call and able to communicate with the meeting participants. In response to determining that the first meeting has ended, as shown in FIG. 18E, the system connects the computing device 11B of the user 10B with the communication session of the participants of the first meeting. FIG. 18E shows how this status change is recorded in the permissions and status of the meeting object. The role and/or permission is copied from the second meeting and they are given this status in the first meeting. FIG. 18F shows the resulting user interfaces that are displayed to the requesting user, User B, and the other meeting attendees, such as User A.

In some embodiments, the first meeting is ongoing while the attendees are still in communication with one another. An active status means they have not dropped from the call, still communicating video streams and audio streams and the server still registers them as an "attendee" until they manually drop or the server drops the connection. For example, the first meeting 106A is ongoing when individual participants that are members of the first meeting and not members of the second meeting have an active status and have not dropped from the communication session. Thus, in such embodiments, the system changes the status of the user 10B to the wait state, when the user 10B sends a request to join the call, and in response to determining that the individual participants having an active status on the call are members of the first meeting and not members of the second meeting.

In some embodiments, the first meeting is ongoing while the attendees are still in communication even if they are active on the call, e.g., online, at a time after the end time of the first meeting. In such embodiments, the attendees remaining online are those who are members of the first meeting and not members of the second meeting. The first meeting 106A has a time period defined by a start time and an end time of the first meeting. The first meeting 106A is ongoing when individual participants that are members of the first meeting and not members of the second meeting have an active connection to the communication session. Changing the status of the user 10B to the wait state is in response to determining that the request is received after the time period of the first meeting and during a time period of the second meeting and in response to determining that the individual participants that are members of the first meeting and not members of the second meeting have the active connection to the communication session.

Referring now to FIGS. 19A-19F, an example is shown where the requesting user, User B, is not a member of the first meeting but sends a request to join the call while the first meeting is ongoing. In this example, the requesting user, User B, is placed in a holding area, and then admitted to the call when a predetermined person has disconnected from the call.

Figure 19A:
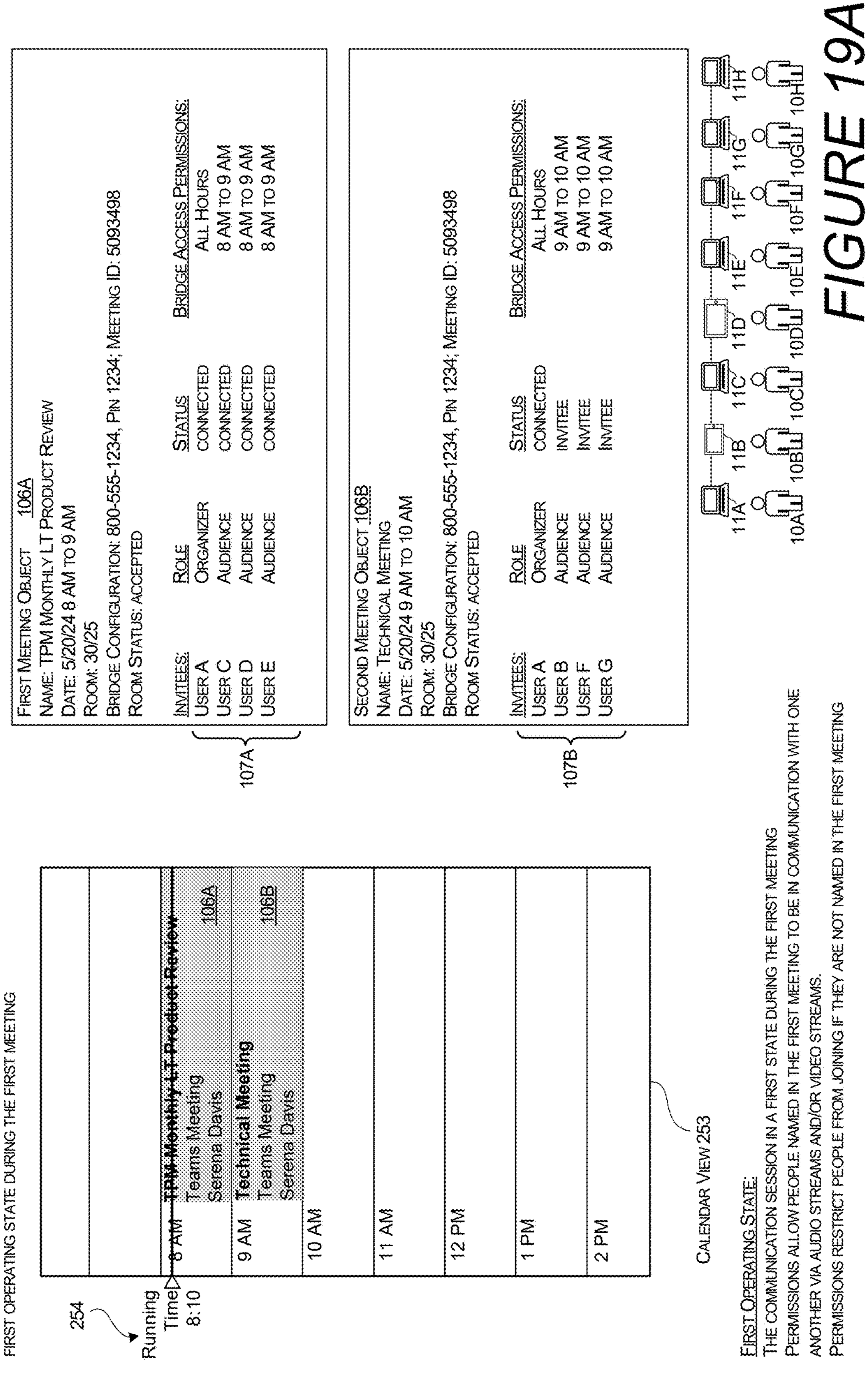
FIG. 19A shows a first state of a process of a conference lobby feature during back-to-back conference calls where a user is requesting to join a meeting.

FIG. 19A shows that the user, User B, sends a request to join the call during the first meeting, is placed in a holding area with no connection, and then allowed into the call when a predetermined user, e.g., User D, leaves the meeting. This embodiment is particularly helpful in an interview situation where a candidate for the second meeting, e.g., User G, does not see a candidate, e.g., User D, for the first meeting. This may also be used in situations where predetermined users are selected based on email domain, roles in a meeting, or departments in a company. That way, certain groups, e.g., people who are internal to a company or team and people who are external to a company or team do not overlap on a call. Same can be applied for roles, e.g., when audience members leave, then organizers can be exclusively connected.

As shown in FIGS. 19B and 19C, since the requesting user, User B, is not associated with the ongoing meeting, the user is placed in a holding area without being connected to the active call. In response to determining that the identity 108B of the user 10B of the request is not a member of the first set of participants 107A of the first meeting 106A, as shown in FIG. 19B, the system changes the status of the user 10B to a wait state, e.g., places them in a holding area.

Figure 19D:
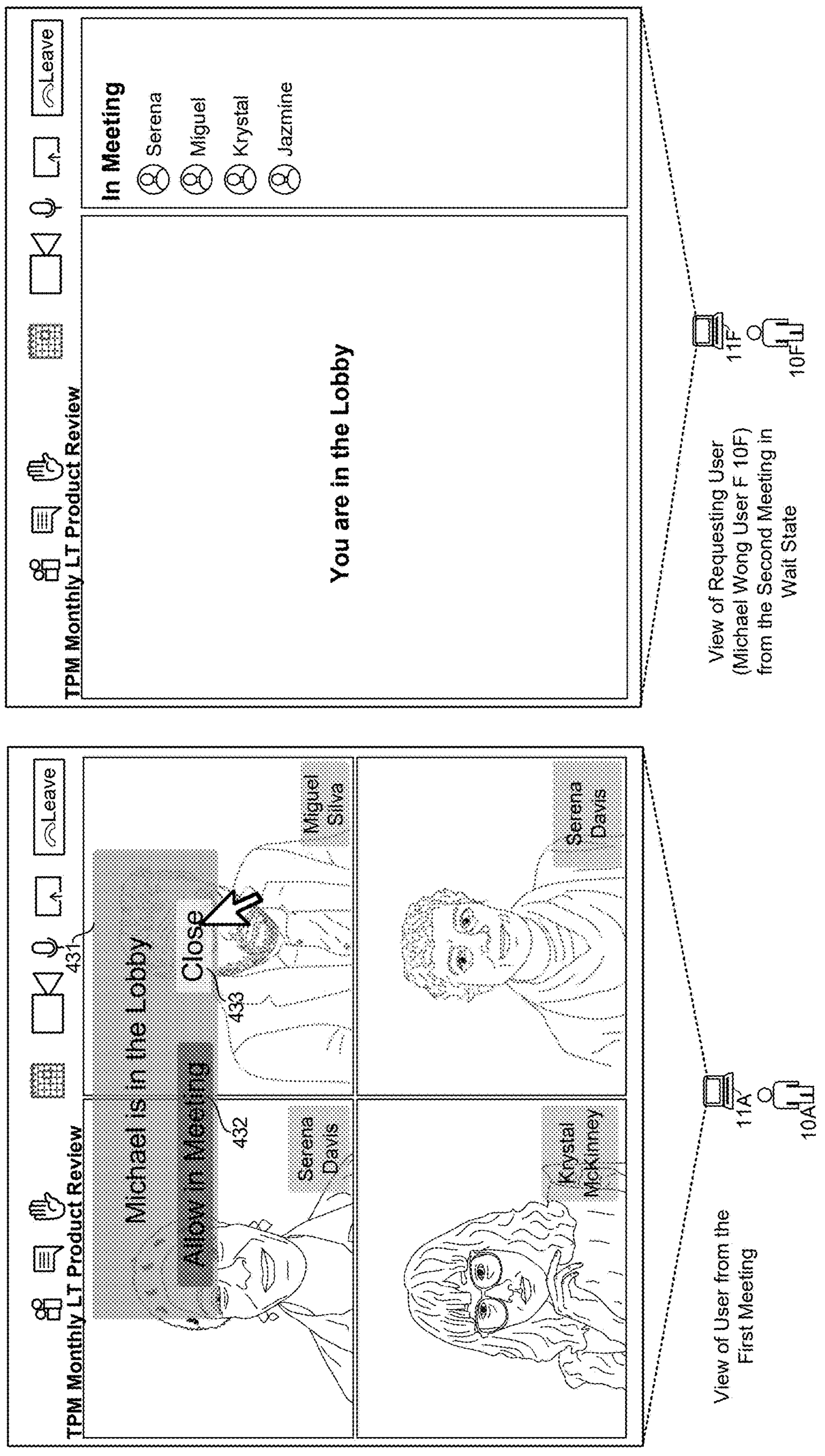
FIG. 19D shows two user interface arrangements for the person in the holding area: a first UI for the users in the meeting, and a second UI for the person in the holding area.

Then, as shown in FIG. 19D, the wait state causes a display of a status on a user interface associated with the requesting user, User 10B. This example shows them that they are in a lobby. The system shows who is in the meeting, e.g., the conference call, but they are unable to communicate audio and video to the meeting participants. Also shown in FIG. 19C, the wait state causes a display of the status on a user interface associated with a participant, such as User A 10A, of the first meeting 106A. The wait state restricts communication of audio streams and video streams between a computing device 11B of the user 10B and participants of the first meeting, User A, User C, User D and User E. As shown in FIG. 19D, since there is no input to admit User B into the call, the requesting user, User B, is held in the Holding Area without communication to the active meeting participants.

Figure 19F:
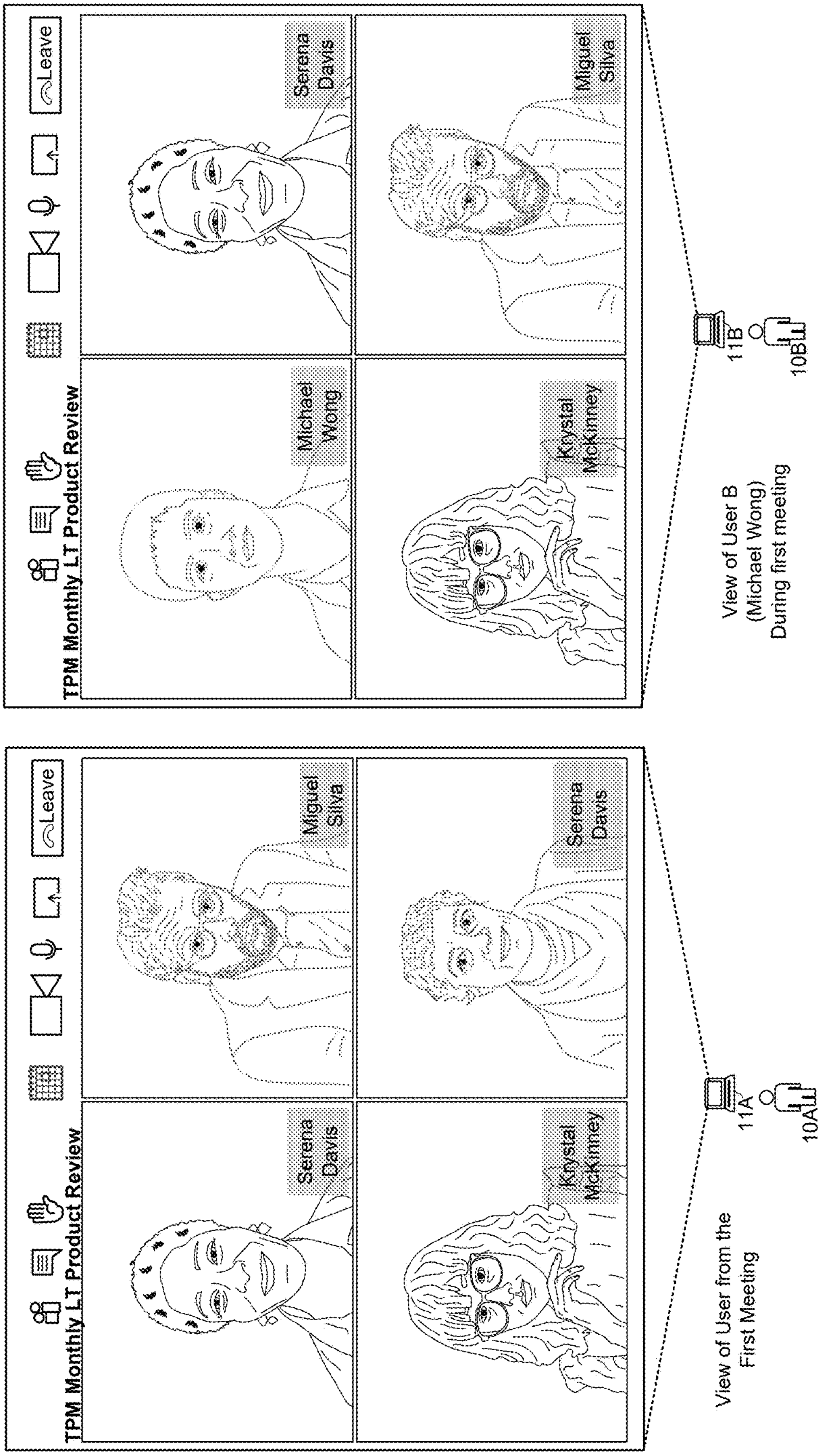
FIG. 19F shows a change in the user interface arrangements when the user is moved out of the holding area.

Then, as shown in FIG. 19E, a predetermined user, User D, leaves the first meeting during the time of the first meeting. In response, User B, is then activated into the call and able to communicate with the meeting participants. In response to determining that a predetermined user that is a member of the first meeting that is not a member of the second meeting has left the call, the system connects the computing device 11B of the user 10B with the communication session of the participants of the first meeting. FIG. 19E shows how this status change is recorded in the permissions and status of the meeting object. The role and/or permission is copied from the second meeting and they are given this status in the first meeting. FIG. 19F shows the resulting user interfaces that are displayed to the requesting user, User B, and the other meeting attendees, such as User A.

Referring now to FIGS. 20A-20F, an example is shown where the requesting user, User B, is not a member of the first meeting but sends a request to join the call while the first meeting is ongoing. In this example, the requesting user, User B, is placed in a holding area, and then admitted to the call when a predetermined group of people have disconnected from the call. In one embodiment, the predetermined group can include all members of the first meeting who are not members of the following meeting, e.g., an adjacent, second meeting. The predetermined group can also include users having a specific email domain, a predetermined number of people, or a threshold number of people. In one example, when users having an external email domain have dropped from the call, and only users having an internal email domain are active on the call, the system connects the users in the waiting area.

In another example, a threshold can be three people, and when at least three people who are members of the first meeting but not members of the second meeting disconnect from the call, the system connects the users in the waiting area. In yet another example, a threshold can be a percentage of active users who are members of the first meeting but not members of the second meeting. In such an example, if a threshold is 75% and 3 out of 4 people who are members of the first meeting but not members of the second meeting disconnect from the call, or there are 25% of the active users remaining, the system connects the users in the waiting area. For illustrative purposes, a user described herein as connecting to a call or disconnecting from a call, means that a user is connecting to, or disconnecting from, a conference call using the bridge connection that is assigned to both the first and second meeting.

Figure 20A:
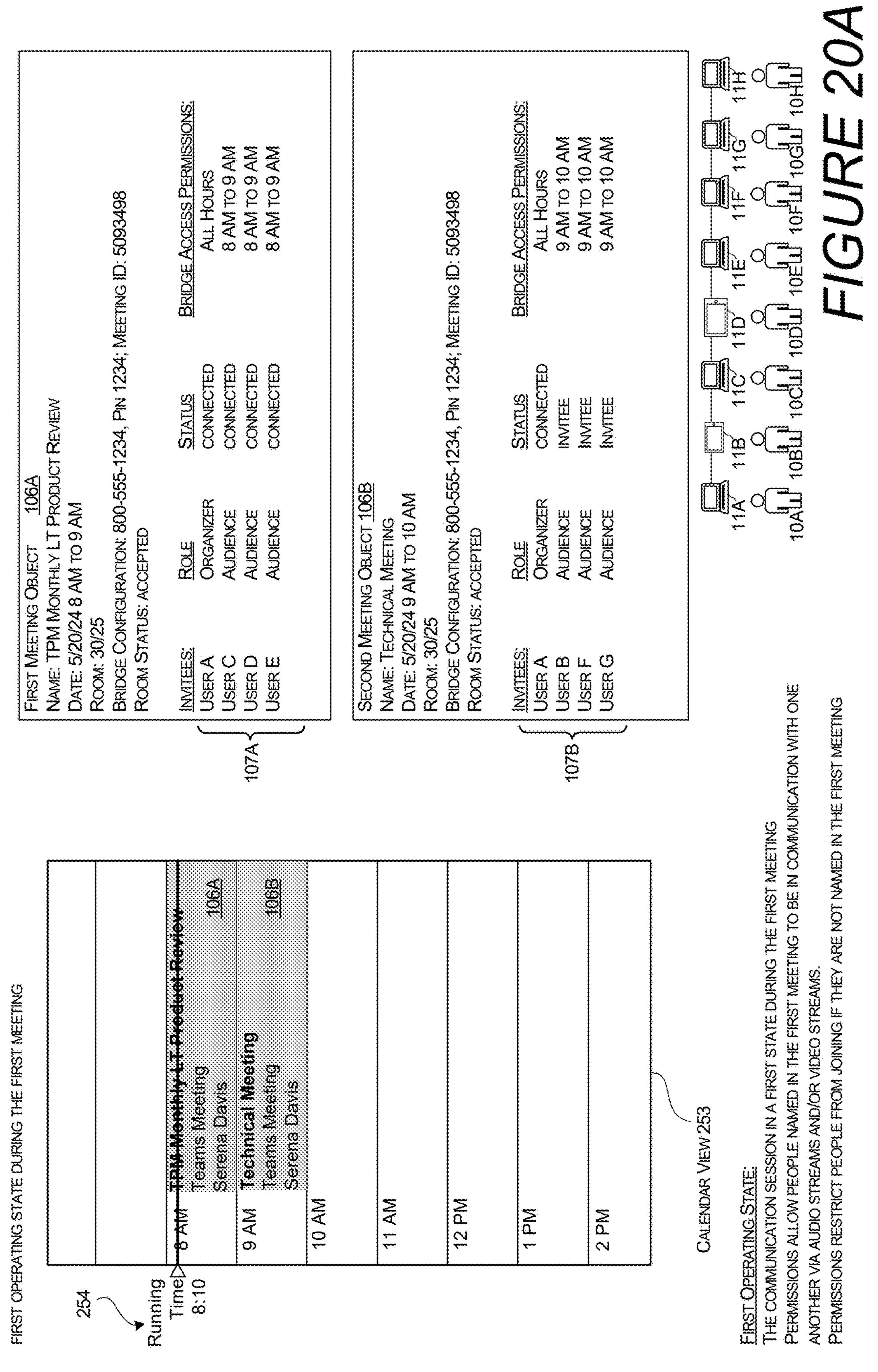
FIG. 20A shows a first state of a process of a conference lobby feature during back-to-back conference calls where a user is requesting to join a meeting.

FIG. 20A shows that the user, User B, sends a request to join the call during the first meeting, is placed in a holding area with no connection, and then allowed into the call when a predetermined number of people or a specific group of people leave the meeting. In this example, an example policy is set so that User B (invitee of the second meeting but not member of the first meeting) is allowed to join during the first meeting when all of the people who are members of the first meeting but not members of the second meeting have left. This embodiment is particularly helpful in company meetings with external members, sales meetings, etc. That way, certain groups, e.g., people who are internal to a company or team and people who are external to a company or team do not overlap on a call. The same can be applied for roles, e.g., when audience members leave, then organizers can be exclusively connected to a call without other users having other roles.

As shown in FIGS. 20B and 20C, since the requesting user, User B, is not associated with the ongoing meeting (the first meeting), the user is placed in a holding area without being connected to the active call. In response to determining that the identity 108B of the user 10B of the request is not a member of the first set of participants 107A of the first meeting 106A, as shown in FIG. 20B, the system changes the status of the user 10B to a wait state, e.g., places them in a holding area and restricts the computer of User 10B from connecting audio and/or video streams with the communication session.

Figure 20D:
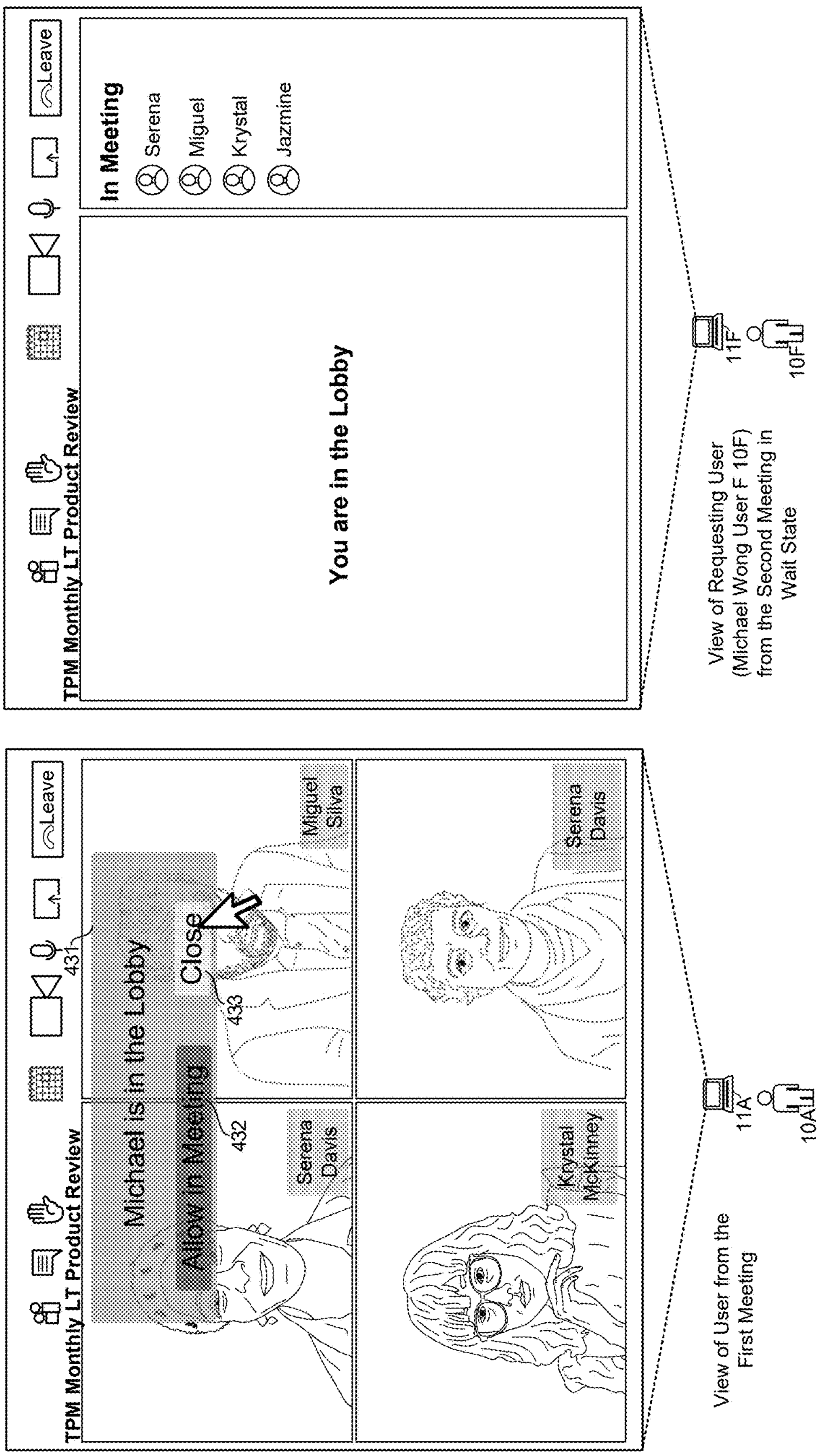
FIG. 20D shows two user interface arrangements for the person in the holding area: a first UI for the users in the meeting, and a second UI for the person in the holding area.

Then, as shown in FIG. 20D, the wait state causes a display of a status on a user interface associated with the requesting user, User 10B. This example shows them that they are in a lobby. The system shows who is in the meeting, e.g., the conference call, but they are unable to communicate audio and video to the meeting participants. Also shown in FIG. 20D, the wait state causes a display of the status on a user interface associated with a participant, such as User A 10A, of the first meeting 106A. The wait state restricts communication of audio streams and video streams between a computing device 11B of the user 10B and participants of the first meeting, User A, User C, User D and User E. As shown in FIG. 20D, since there is no input to admit User B into the call, the requesting user, User B, is held in the Holding Area without communication to the active meeting participants.

Then, as shown in FIG. 20E, when a predetermined group of users leave the first meeting while the call is ongoing, the user in the waiting room, User B, is then activated into the call and able to communicate with the active meeting participants. In this example, the predetermined group includes all members of the first meeting who are not members of the following meeting, e.g., an adjacent, second meeting. Thus, the remaining active member of the call is User A, and after the predetermined group leaves the call, the system connects User B to the call and User B is removed from the waiting area. This includes operations where in response to determining that a predetermined group of users who are members of the first meeting, and not members of the second meeting, have left the call, the system connects the devices of all users in the waiting area. In this example, the computing device 11B of the user 10B is connected to the communication session of the remaining participants of the first meeting.

Figure 20F:
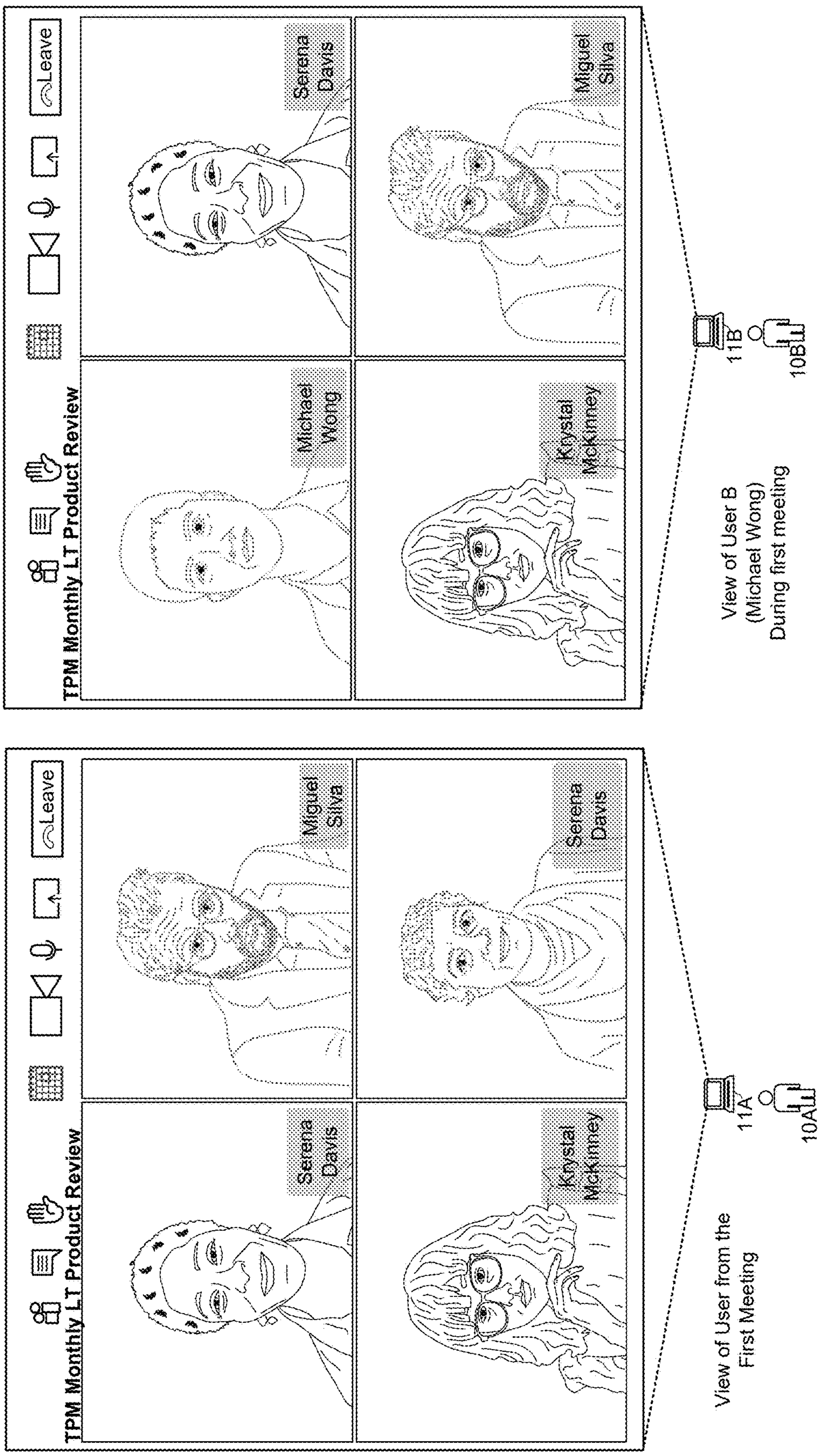
FIG. 20F shows a change in the user interface arrangements when the user is moved out of the holding area.

FIG. 20E shows how this status change is recorded in the permissions and status of the meeting object. The role and/or permission is copied from the second meeting and they are copied to the first meeting. For example, User B's role is an audience member in the second meeting, thus when accepted into the first meeting, User B receives the same role, e.g., an audience member, which in this example gives User B access rights to content and people as they were assigned in the second meeting. FIG. 20F shows the resulting user interfaces that are displayed to the requesting user, User B, and the other meeting attendees, such as User A.

In the embodiments described herein, the first meeting is ongoing while the attendees are still in communication with one another. An active status means they have not dropped from the call, still communicating video streams and audio streams and the server still registers them as an "attendee" until they manually drop or the server drops the connection. For example, the first meeting 106A is ongoing when individual participants that are members of the first meeting and not members of the second meeting have an active status and have not dropped from the communication session. Changing the status of the user 10B to the wait state is in response to determining that the individual participants that are members of the first meeting and not members of the second meeting have the active connection to the communication session.

In some embodiments, the first meeting is ongoing while the attendees are still in communication even if they are online after the call is beyond the end time of the first meeting. In such embodiments, the attendees remaining online are those who are members of the first meeting and not members of the second meeting. The first meeting 106A has a time period defined by a start time and an end time of the first meeting. The first meeting 106A is ongoing when individual participants that are members of the first meeting and not members of the second meeting have an active connection to the communication session. Changing the status of the user 10B to the wait state is in response to determining that the request is received after the time period of the first meeting and during a time period of the second meeting and in response to determining that the individual participants that are members of the first meeting and not members of the second meeting have the active connection to the communication session. In this embodiment, even after the end time of the first meeting, the first set of users are in the communication session, permissions of the system still prevent a person from the second meeting, who is also not a member of the first meeting, to join the call. This prevents overlap of distinct user groups during the call.

Figure 21:
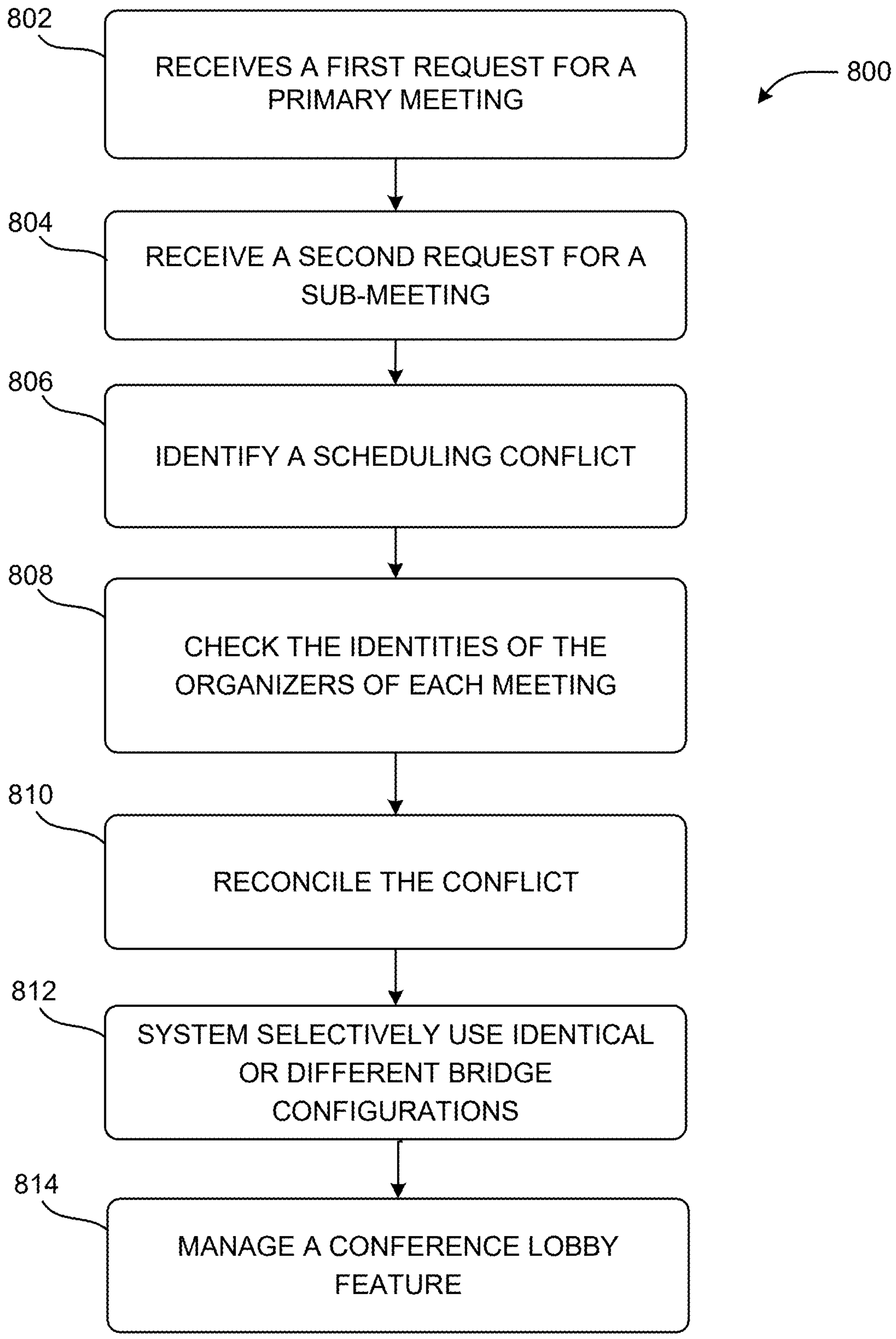
FIG. 21 is a flow diagram showing aspects of a routine for utilizing the network effect of end-user viral adoption of services and applications by clustering users based on characteristics of requests to configure new tenants.

Turning now to FIG. 21, the following describes aspects of a routine 800 that causes operations for targeting the algorithm in managing overlapping meetings and meeting invites, and properly scheduling/accepting invites; selectively using identical or different bridge configurations mixer/dial-in number/PIN depending on whether meeting invites are directed to deliberate overlapping meetings; and managing a meeting-based invitation-based conference lobby feature during a back-to-back conference call, while same bridge arrangement/configuration is provided across multiple meetings. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media and computer-readable media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine are described herein as being implemented, at least in part, by an application, component and/or circuit, such as a device module that can be included in any one of the memory components disclosed herein, including but not limited to RAM. In some configurations, the device module can be a dynamically linked library (DLL), a statically linked library, functionality enabled by an application programing interface (API), a compiled program, an interpreted program, a script or any other executable set of instructions. Data, such as input data or a signal from a sensor, received by the device module can be stored in a data structure in one or more memory components. The data can be retrieved from the data structure by addressing links or references to the data structure.

Although the following illustration refers to the components depicted in the present application, it can be appreciated that the operations of the routine may be also implemented in many other ways. For example, the routine may be implemented, at least in part, by a processor or circuit of another remote computer (which can be a server) or a local processor or circuit of a local computer (which can be a client device receiving a message or a client device sending the message). Any aspect of the routine, which can include the generation of a prompt, communication of any of the messages with the prompt to an Natural Language Processing (NLP) algorithm, use of an NLP algorithm, or a display of a result generated by an NLP algorithm, can be performed on either a device sending a message, a device receiving a message, or on a server managing communication of the messages for a thread. In addition, one or more of the operations of the routine may alternatively or additionally be implemented, at least in part, by a chipset working alone or in conjunction with other software modules. Any service, circuit or application suitable for providing input data indicating the state of any device may be used in operations described herein.

The routine 800 starts at operation 802, where the system receives a first request for a primary meeting. This can include a first request 111A for a primary meeting 105 that is scheduled for a first time period. The first request includes an identifier 109 for a meeting room. This can be for an all-day meeting.

At 804, the system receives a second request 111B for a sub-meeting 106A that is scheduled for a second time period overlapping at least a portion of the first time period. The second request including the identifier 109 for the same meeting room that is included in the request for the primary meeting. This input is for a meeting that is shorter than the primary meeting and this attempt is to schedule the same room as the primary meeting.

At operation 806, the system identifies a scheduling conflict. A scheduling conflict can include two or more meetings that have an overlapping time full or partially overlapping and have a request for the same room. This operation can include determining that the second request for the sub-meeting includes the identifier 109 for the same meeting room identified in the first request for the primary meeting. This operation can include determining that the second time period of the sub-meeting overlaps at least the portion of the first time period of the primary meeting. This can include analyzing the start time and end time of each meeting and determining if time periods for each meeting overlap one another. In some embodiments, the system identifies a scheduling conflict in response to determining that the second request for the sub-meeting includes the identifier for the same meeting room as the request for the primary meeting and in response to determining that the second time period of the sub-meeting overlaps at least the portion of the first time period of the primary meeting.

At operation 808, the system determines that the conflicted meetings are set by the same person or a delegate of the same user. For example, if User A schedules both meetings, the system determines that the meetings are requested by the same user that is considered as the same user. If User A schedules one meeting and User B is assigned as a delegate of User A, and User B schedules the second meeting, the system determines that the meetings are requested by the same user that is considered as the same user. In some embodiments, the system determines that the first request for the primary meeting and the second request for the sub-meeting are arranged by a user or a delegate of the user in response to identifying the scheduling conflict.

At operation 810, the system reconciles the conflict if the conflict is deliberate. This reconciliation of the conflict occurs when the conflict is created by the same user or a delegate of that user. In some embodiments, the system reconciles the conflict in response to determining that the request for the primary meeting and the request for the sub-meeting are both arranged by the user or a delegate of the user. The reconciliation includes reserving the room and allowing the original organizer to exclusively continue making reservations for the same room in the same slot. One technical benefit is that when invitees see that the room has been accepted, they are more inclined to come to the meeting, vs. a scenario where it is conflicted, the meeting room shows up as declined, and users do not participate in person. Room resources and policies are also copied to the sub-meeting from the primary meeting only if the organizer is the same person or a delegate of that person. This feature also provides a security benefit in that if others try to reserve a room under another identity, the room is declined and they cannot get access to the room resources.

Operation 810 includes allocating the meeting room for the primary meeting and the sub-meeting, wherein the allocation restricts the meeting room from being scheduled by other users other than the user or a delegate of the user, and as shown in FIG. 2 system enables users to view the room acceptance, thereby addressing the technical issue and technical solutions described herein. This can include communicating a confirmation 112 of a reservation for the meeting room to invitees included in the primary meeting and the sub-meeting for display of the confirmation.

In some embodiments, in determining that the conflict is deliberate, the sub-meeting is deliberate if it has a shorter time period than the primary meeting addition to being reserved by the same person or a delegate of that person. In such embodiments, the routine includes reconciling the conflict if the second time period for the sub-meeting is shorter than the first time period for the primary meeting. In the disclosed embodiments, if two or more overlapping meetings are determined to be deliberate, the system reconciles the conflict for the same room by accepting the room for both meetings. However, if the conflict does not meet the criteria for being deliberate, the system issues a conflict for the room for the sub-meeting and/or issues a separate bridge configuration for that meeting, and other sub-meetings that meet the criteria for being deliberate. As shown in FIG. 3, the system declines the invitation to the sub-meeting if the sub-meeting is not set by the first user or a delegate of the first user. This includes operations for determining that the first request for the primary meeting is requested by a first user, determining that the second request for the sub-meeting is requested by a second user, and determining that the second user is different than the first user and determining that the second user is not a delegate of the first user. In response to determining that the second user is different than the first user and determining that the second user is not the delegate of the first user, allocating the meeting room for the primary meeting for the first time period, communicating a confirmation of the meeting room to invitees of the primary meeting, restricting the second room from reserving the meeting room, and communicating a confirmation of a rejection of the meeting room to invitees included in the sub-meeting and the second user.

As shown in FIG. 4, the system determines that the conflict is not deliberate if the sub-meeting is the same length as the primary meeting, e.g., the user makes an inadvertent duplication of the request, the room is canceled for the sub-meeting. In the routine, when the second time period is not shorter than the first time period, the routine includes determining that the second time period for the sub-meeting is not shorter than the first time period for the primary meeting. In response to determining that the second time period for the sub-meeting is not shorter than the first time period for the primary meeting, allocating the meeting room for the primary meeting for the first time period, restricting the second room from reserving the meeting room, and communicating a confirmation of a rejection of the meeting room to invitees included in the sub-meeting and the second user.

As shown in FIG. 5, the system uses the same bridge call information for the sub-meeting if the overlapping meetings are deliberate. In response to determining that the first request for the primary meeting and the second request for the sub-meeting are arranged by the user or the delegate of the user, copying call bridge information from the primary meeting to the sub-meeting, wherein the invitees from the primary meeting and the invitees from the sub-meeting are granted permissions to join a communication session using the call bridge information.

Also shown in FIG. 5, the system copies meeting permissions from the primary meeting for the sub-meeting if the conflict is deliberate. This includes access to conference room camera controllers, control over camera direction, camera and microphone activation control, deactivation of microphones and cameras, room shade controllers, etc. In the routine, in response to determining that the first request for the primary meeting and the second request for the sub-meeting are arranged by the user or the delegate of the user, copying permissions for meeting devices for facilitating communication of audio streams and video streams of a communication session, the permissions allowing the invitees from the primary meeting and the invitees from the sub-meeting to modify operating states of the meeting devices.

As shown in FIG. 6, the system also copies meeting policies from the primary meeting for the sub-meeting if the conflict is deliberate. This includes volume levels, access to files, camera settings. In response to determining that the first request for the primary meeting and the second request for the sub-meeting are arranged by the user or the delegate of the user, copying meeting policies for meeting devices and files, the policies indicating at least one of volume levels for speakers receiving audio streams of a communication session, access to shared files, or video settings for cameras capturing video streams of the communication session.

As shown in FIG. 7, the system provides access to files from the primary meeting for the sub-meeting if the conflict is deliberate. In response to determining that the first request for the primary meeting and the second request for the sub-meeting are arranged by the user or the delegate of the user, granting access to shared files of the primary meeting to the sub-meeting.

At operation 812, the system selectively uses identical or different bridge configurations for overlapping meetings. FIG. 7 shows an example where a system selectively uses identical or different bridge configurations mixer/dial-in number/PIN depending on whether meeting invites are directed to deliberate overlapping meetings. The system for selectively using identical or different bridge configurations for overlapping meetings can include operations for receive a first request 161A for causing a generation of a primary meeting object 105 defining attributes of a primary meeting for a first time period, the first request causing the system to generate a first bridge configuration 123A for facilitating a first communication session. For example, FIG. 7 shows that a first input generates a first meeting primary meeting and bridge information for the primary meeting. The system then generates the primary meeting object 105 including attributes of the primary meeting. The system also generates the first bridge configuration 123A for inclusion in the attributes of the primary meeting, the first bridge configuration 123A for facilitating the first communication session. Also shown in FIG. 7, a second input includes data for the overlapping meeting. The second input causes the system to determine if the overlap is deliberate, e.g., meets criteria. The system receives a second request 161B for causing a generation of a sub-meeting object 106 defining attributes of a sub-meeting for a second time period that overlaps at least a portion of the first time period. In response to receiving the second request 161B for causing a generation of a sub-meeting object 106 defining a sub-meeting for the second time period that overlaps at least a portion of the first time period: the system generates the sub-meeting object 106 defining the sub-meeting for the second time period that overlaps at least the portion of the first time period, and determine that the attributes of the sub-meeting satisfy one or more criteria with respect to the attributes of the primary meeting. Attributes of a meeting can be the name of an organizer, a description room number, etc. Based on any criteria for the content of a meeting or any attribute, the system can determine if an overlapping meeting is deliberate or not deliberate.

The system uses identical bridge configuration across the individual meetings if a conflict of meetings is deliberate. For example, in response to determining that the attributes of the sub-meeting satisfy the one or more criteria with respect to the attributes of the primary meeting, e.g., determining if a sub-meeting is deliberately setup as a conflict with a primary meeting, the system copies the first bridge configuration 123A from the primary meeting object for storage in association with the sub-meeting object 106, the first bridge configuration 123A permitting invitees 124 of the sub-meeting to join the first communication session with the invitees 125 of the primary meeting; and in response to determining that the attributes of the second request 161B do not satisfy the one or more criteria with respect to the attributes of the first request 161A, generate a unique bridge configuration 123B for facilitating a second communication session for the invitees 124 of the sub-meeting, wherein the unique bridge configuration 123B for facilitating a second communication session restricts the invitees 124 of the sub-meeting from exchanging audio streams and video streams with the invitees 125 of the primary meeting participating in the first communication session. The system uses a different bridge configuration or unique bridge configuration for each meeting if they are not deliberate overlapping meetings.

As shown in FIG. 8, in some embodiments, the system determines that a meeting conflict is deliberate if two meetings are set up by a single user or a delegate of the user. In such embodiments, the system determines that the attributes of the sub-meeting satisfy the one or more criteria with respect to the attributes of the primary meeting by determining that an identity of an organizer for the sub-meeting is the same organizer for the primary meeting. The first bridge configuration is used for the sub-meeting and the primary meeting in response to determining that the identity of the organizer for the sub-meeting is the same identity of the organizer for the primary meeting. The unique bridge configuration is used for the sub-meeting in response to determining that the identity of the organizer for the sub-meeting is not the same organizer for the primary meeting.

As shown in FIG. 9, in some embodiments, the system determines that a meeting conflict is deliberate if the rooms are the same. In such embodiments, the system determines that the attributes of the sub-meeting satisfy the one or more criteria with respect to the attributes of the primary meeting includes determining that a room identifier included in the request for the sub-meeting is identical as a room identifier included in the request for the primary meeting. The first bridge configuration is used for the sub-meeting and the primary meeting in response to determining that the room identifier included in the request for the sub-meeting is identical as the room identifier included in the request for the primary meeting, wherein the unique bridge configuration is used for the sub-meeting in response to determining that the room identifier included in the request for the sub-meeting is not identical as the room identifier included in the request for the primary meeting.

As shown in FIG. 10, in some embodiments, the system determines that a meeting conflict is deliberate if the rooms are different. Just the opposite of claim 3. For scenarios where users from different rooms want to be on the same bridge. In such embodiments, the system determines that the attributes of the sub-meeting satisfy the one or more criteria with respect to the attributes of the primary meeting includes determining that a room identifier included in the request for the sub-meeting is not identical as a room identifier included in the request for the primary meeting. The first bridge configuration is used for the sub-meeting and the primary meeting in response to determining that the room identifier included in the request for the sub-meeting is not identical as the room identifier included in the request for the primary meeting. A unique bridge configuration is used for the sub-meeting in response to determining that the room identifier included in the request for the sub-meeting is identical as the room identifier included in the request for the primary meeting.

As shown in FIG. 11, in some embodiments, the system determines that a meeting conflict is deliberate if the groups of invitees are associated with one another, e.g., employees are with the same company stay on the same bridge. In such embodiments, the system determines that the attributes of the sub-meeting satisfy the one or more criteria with respect to the attributes of the primary meeting includes determining that invitees for the sub-meeting are associated with a first category of users and invitees for the primary meeting are associated with a first category of users, wherein the first bridge configuration is used for the sub-meeting and the primary meeting in response to determining that invitees for the sub-meeting are associated with the first category of users and invitees for the primary meeting are associated with the second category of users, wherein the unique bridge configuration is used for the sub-meeting in response to determining that invitees for the sub-meeting are associated with the first category of users and invitees for the primary meeting are also associated with the first category of users.

As shown in FIG. 12, in some embodiments, the system determines that a meeting conflict is deliberate if the context of the meetings have a threshold level of similarity, e.g., if the subjects are the same, then use the same bridge. In such embodiments, the system determines that the attributes of the sub-meeting satisfy the one or more criteria with respect to the attributes of the primary meeting includes determining that a subject for the sub-meeting has a threshold level of relevance with the subject of the primary meeting, wherein the first bridge configuration is used for the sub-meeting and the primary meeting in response to determining that the subject for the sub-meeting has the threshold level of relevance with the subject of the primary meeting, wherein the unique bridge configuration is used for the sub-meeting in response to determining that the subject for the sub-meeting does not have the threshold level of relevance with the subject of the primary meeting.

As shown in FIGS. 13A-13F, in some embodiments, the system determines that a meeting conflict is deliberate based on a user input provided while generating the second invitation. In such embodiments, in response to receiving the second request 161B for causing the generation of the sub-meeting object, the system displays a notification to provide an input indicating an intent of the second request of an overlapping meeting, the notification providing notice that the request for the primary meeting and the request for the sub-meeting create a scheduling conflict. A user or a computer can provide an input indicating that the intent of the second request is to deliberately create a scheduling conflict and use the first bridge configuration for the sub-meeting. In response to receiving the input indicating that the intent of the second request is to deliberately create the scheduling conflict, use the first bridge configuration for the sub-meeting; and in response to receiving another input indicating that the intent of the second request is to not deliberately create the scheduling conflict, use the unique bridge configuration for the sub-meeting.

At operation 814, the system manages a conference lobby feature during a back-to-back conference call, while same bridge arrangement/configuration is provided across multiple meetings. FIGS. 16A-16B show that if a previous meeting is still ongoing, a meeting server checks identities of attendees. If an attendee is associated with the ongoing meeting, the server connects the attendee to the ongoing meeting. This includes receiving a request to join the communication session using the single bridge configuration assigned to a first meeting 106A identifying a first set of participants 107A and a second meeting 106B identifying a second set of participants 107B that follows the first meeting, the request received while the first meeting 106A is ongoing.

In some embodiments, the first meeting is ongoing during the time period of the first meeting, e.g., between the start and end time of the first meeting. For example, the first meeting 106A is ongoing during a time period defined by a start time and an end time of the first meeting, wherein changing the status of the user 10B to the wait state is in response to determining that the request of the user is received during the time period of the first meeting and in response to determining that the identity 108B of the user 10B of the request is not a member of the first set of participants 107A of the first meeting 106A.

As shown in FIG. 16A, in some embodiments, the system can check the identities of attendees. In response to the request to join the communication session using the single bridge configuration while the first meeting 106A is ongoing, the system can determine that an identity 108B of a user 10B of the request is a member of the first set of participants 107A of the first meeting 106A. As shown in FIG. 16B, if an attendee is associated with the ongoing meeting, the server connects the attendee to the ongoing meeting. The server connects the device 11B of the user 11B to the communication session in response to determining that the identity 108B of the user 10B of the request is a member of the first set of participants 107A of the first meeting 106A.

Then, as shown in FIGS. 17B and 17C, if the attendee is not associated with the ongoing meeting, the attendee is placed in a "holding area" without being connected to the active call. Thus, in response to determining that the identity 108B of the user 10B of the request is not a member of the first set of participants 107A of the first meeting 106A: the system changes the status of the user 10B to a wait state, the wait state causing a display of a status on a user interface associated with the user 10B, the wait state causing a display of the status on a user interface associated with a participant 10A of the first meeting 106A, the wait state restricting a communication of audio streams and video streams between a computing device 11B of the user 10B and participants of the first meeting. As shown in FIGS. 17C-17E and 18C-18D: the user is connected to the call once the ongoing meeting ends; or is manually let in by an attendee of the first meeting. In such embodiments, the system receives an input from the participant 10A of the first meeting 106A permitting the user 10B access to the communication session or determining that the first meeting has ended, and in response to receiving the input from the participant 10A of the first meeting 106A permitting the user 10B access to the communication session or determining that the first meeting has ended, connect the computing device 11B of the user 10B with the communication session of the participants of the first meeting.

In some embodiments, the first meeting is ongoing while the attendees are still in communication with one another. An active status means they have not dropped from the call, still communicating video streams and audio streams and the server still registers them as an "attendee" until they manually drop or the server drops the connection. For example, the first meeting 106A is ongoing when individual participants that are members of the first meeting and not members of the second meeting have an active status and have not dropped from the communication session. Changing the status of the user 10B to the wait state is in response to determining that the individual participants that are members of the first meeting and not members of the second meeting have the active connection to the communication session.

In some embodiments, the first meeting is ongoing while the attendees are still in communication even if they are online after the first meeting is beyond the end time. In such embodiments, the attendees remaining online are those who are members of the first meeting and not members of the second meeting. The first meeting 106A has a time period defined by a start time and an end time of the first meeting. The first meeting 106A is ongoing when individual participants that are members of the first meeting and not members of the second meeting have an active connection to the communication session. Changing the status of the user 10B to the wait state is in response to determining that the request is received after the time period of the first meeting and during a time period of the second meeting and in response to determining that the individual participants that are members of the first meeting and not members of the second meeting have the active connection to the communication session.

Figure 22:
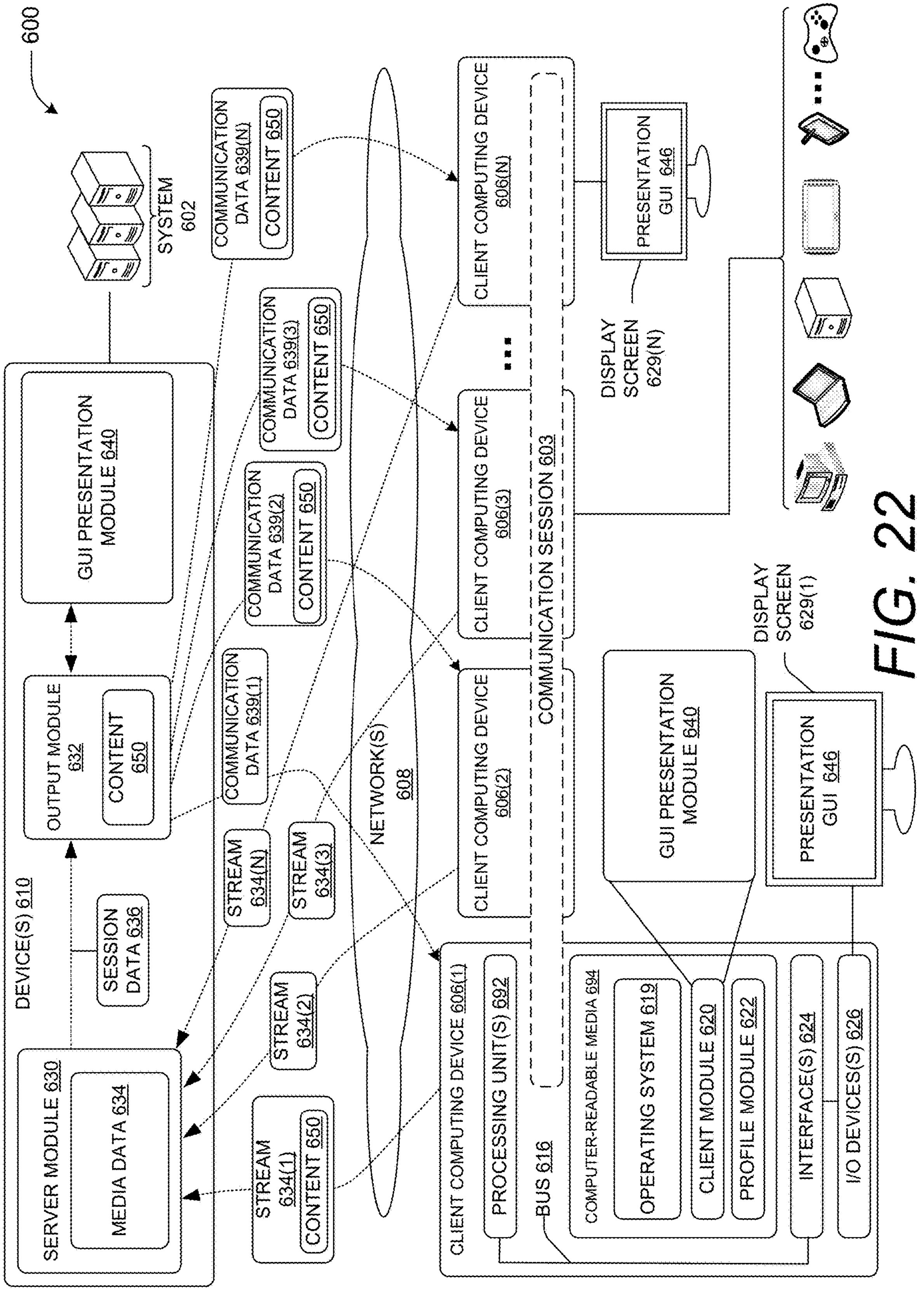
FIG. 22 is a diagram illustrating a distributed computing environment capable of implementing aspects of the techniques and technologies presented herein.

Turning now to FIG. 22, a diagram illustrating an example environment 600 in which a system 602 can implement the disclosed techniques is shown. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 603. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds can be communicated with the messages.

The system 602 of FIG. 22 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses. Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 22 illustrates that client computing device 606(1) is in some way connected to a display device (e.g., a display screen 629(N)), which can display a UI according to the techniques described herein.

In the example environment 600 of FIG. 22, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 22) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 22, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer. The content 650 also include input data from each user, which can be used to control a direction and location of a representation. The content can also include instructions for sharing data and identifiers for recipients of the shared data. Thus, the content 650 is also referred to herein as input data 650 or an input 650.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 23:
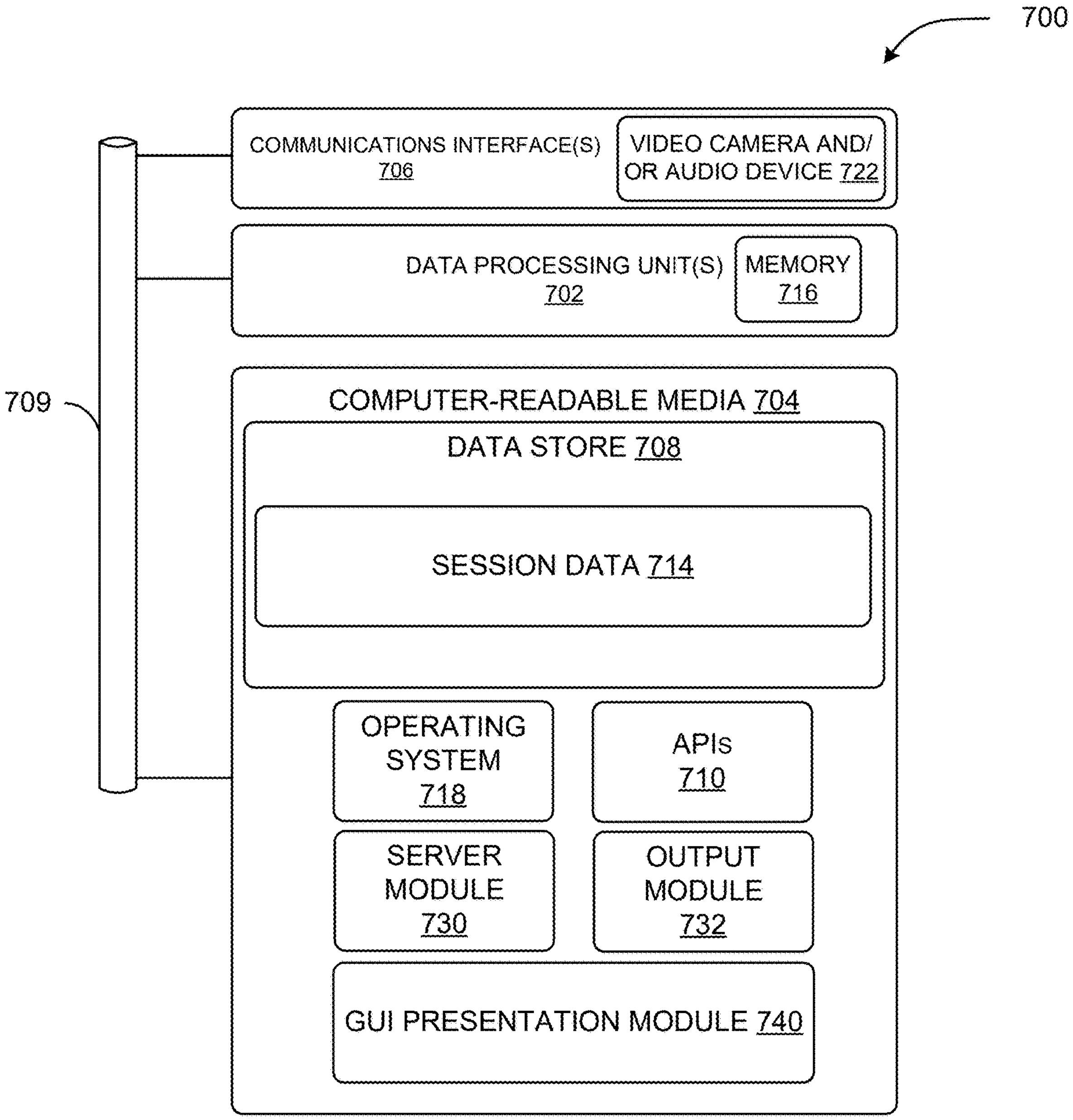
FIG. 23 is a computer architecture diagram illustrating a computing device architecture for a computing device capable of implementing aspects of the techniques and technologies presented herein.

FIG. 23 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media.

Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, computer-readable storage medium, computer-readable storage device, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store the primary calendar and secondary calendar, and other session data that show the status and activity level of each user. The session data can include a total number of participants (e.g., users and/or client computing devices) in a communication session, activity that occurs in the communication session, a list of invitees to the communication session, and/or other data related to when and how the communication session is conducted or hosted. The data store 708 may also include session data 714, such as the meeting objects described herein. The session data 714 can also include video, audio, or other content that can be shared in a meeting. The session data can also include permissions for each user. For example, session data can indicate that past meetings included users having speaker roles and other roles. This data can also indicate preferences, e.g., that a user wants to join meetings with video broadcasting turned on and preferences to indicate that they wish to prioritize meetings that lists them as a presenter as a high priority meeting. In another example, a role of a designated presenter can be granted to some users and other users can have an audience role. The permissions can define specific instructions that are permitted and restricted during different states of a meeting or call that is in progress using a bridge configuration. For example, TABLE 1 includes permissions for each user based on a status or role they have during a specific state of a call using a bridge configuration.

INVITEE: NO VIDEO OR AUDIO CONNECTION, NOT YET CALLED OR JOINED

ATTENDEE: VIDEO AND AUDIO COMMUNICATION PERMITTED WITH MEETING MEMBERS

WAITING AREA: NO VIDEO OR AUDIO COMMUNICATION WITH MEETING MEMBERS SYSTEM PERMITTED TO SHOW THE STATUS OF THE PERSON IN WAITING AREA TO MEETING MEMBERS SYSTEM PERMITTED TO SHOW THE STATUS OF MEETING MEMBERS TO THE PERSON IN WAITING AREA

TABLE 1: USER PERMISSIONS AND/OR STATUS

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A method, for execution on a data processing system, for reconciling a meeting conflict caused by overlapping meetings assigned to a meeting room, the method comprising:

storing, in a reservation data structure in the memory, a first reservation record for a first meeting associated with a resource identifier for the meeting room and a first time period;

storing, in the reservation data structure, a second reservation record for a second meeting associated with the resource identifier and a second time period;

determining, by executing a resource comparison operation using the resource identifier of the reservation data structure, that the second meeting includes the identifier for the same meeting room identified in the first meeting;

determining, by executing a time-interval comparison operation on the first time period and second time period, that the second time period of the second meeting overlaps at least the portion of the first time period of the first meeting;

identifying a scheduling conflict in response to determining that the second meeting includes the resource identifier for the same meeting room as the first meeting and in response to determining that the second time period of the second meeting overlaps at least the portion of the first time period of the first meeting;

in response to identifying the scheduling conflict, determining that the first meeting and the second meeting are arranged by a user or a delegate of the user;

reconciling the conflict in response to determining that the first meeting and the second meeting are both arranged by the user or a delegate of the user, wherein the reconciliation includes:

allocating, by executing a modification operation on the reservation data structure, the meeting room for the first meeting and the second meeting, wherein the allocation restricts the meeting room from being scheduled by other users other than the user or a delegate of the user, and communicating a confirmation of a reservation for the meeting room to invitees included in the first meeting and the second meeting for display of the confirmation.

2. The method of claim 1, wherein the second time period is shorter than the first time period, and wherein reconciling the conflict further comprises determining that the second time period is contained within the first time period and permitting allocation of the meeting room to both the first meeting and the second meeting based on the second time period being shorter than the first time period.

3. The method of claim 1, further comprising:

determining that the first meeting is arranged by a first user;

determining that the second meeting is arranged by a second user;

determining that the second user is different from the first user and that the second user is not a delegate of the first user; and in response to determining that the second user is different from the first user and not a delegate of the first user:

allocating the meeting room for the first meeting during the first time period, restricting the second room from reserving allocation of the meeting room second meeting during the the second time period communicating a rejection of the meeting room reservation for the second meeting to invitees of the second meeting.

4. The method of claim 1, further comprising:

determining that the second time period is not shorter than the first time period for the primary meeting; and in response to determining that the second time period is not shorter than the first time period, allocating the meeting room to the first meeting during the first time period, restricting allocation of the meeting room for the second meeting during the overlapping portion of the second time period, and communicating a rejection of the meeting room reservation for the second meeting to invitees of the second meeting.

5. The method of claim 1, further comprising:

in response to determining that the first meeting and the second meeting are arranged by the user or the delegate of the user, copying call bridge information associated with the first meeting to the second, wherein invitees of the first meeting and invitees of the second meeting are granted permission to join a communication session using the call bridge information.

6. The method of claim 1, further comprising: in response to determining that the first request for the first meeting and the second request for the sub-meeting are arranged by the user or the delegate of the user, copying permissions for meeting devices for facilitating communication of audio streams and video streams of a communication session, the permissions allowing the invitees from the first meeting and the invitees from the sub-meeting to modify operating states of the meeting devices.

7. The method of claim 1, further comprising:

in response to determining that the first meeting and the second meeting are arranged by the user or the delegate of the user, copying meeting policies associated with meeting devices or shared files from the first meeting to the second meeting, the meeting policies defining at least one of: volume levels for speakers receiving audio streams of a communication session, access permissions to shared files, or video settings for cameras capturing video streams of the communication session.

8. The method of claim 1, further comprising: in response to determining that the first meeting and the second request for the second meeting are arranged by the user or the delegate of the user, granting invitees of the second meeting access to shared files associated with the first meeting.

9. The method of claim 1, further comprising:

generating, by the data processing system, a graphical user interface representation of a reservation status for the meeting room based on the reconciliation of the scheduling conflict, the graphical user interface representation indicating that the meeting room is reserved for both the first meeting and the second meeting despite the overlapping time periods; and causing the graphical user interface representation to be displayed on computing devices associated with invitees of the first meeting and the second meeting, wherein the graphical user interface representation includes a room status indicator showing that the meeting room is reserved and unavailable for scheduling by users other than the user or the delegate of the user.

10. The method of claim 1, further comprising:

in response to determining that the first meeting and the second meeting are both arranged by the user or a delegate of the user, automatically copying, without additional user input, a bridge configuration from the first reservation record to the second reservation record in the reservation data structure, the bridge configuration comprising at least a dial-in identifier and an access credential for a communication session, wherein the first reservation record stores the bridge configuration in association with the resource identifier for the meeting room;

updating the second reservation record in the reservation data structure to store the copied bridge configuration; and causing a display of the copied bridge configuration on computing devices of invitees included in the second meeting, wherein the copied bridge configuration grants the invitees of the second meeting access to the communication session using the dial-in identifier and the access credential copied from the first reservation record.

11. A system for reconciling a meeting conflict caused by overlapping meetings assigned to a meeting room, the system comprising:

one or more processing units; and a computer-readable storage medium having encoded thereon computer-executable instructions to cause the one or more processing units to:

storing, in a reservation data structure in the memory, a first reservation record for a first meeting associated with a resource identifier for the meeting room and a first time period;

storing, in the reservation data structure, a second reservation record for a second meeting associated with the resource identifier and a second time period;

determine, by executing a resource comparison operation using the resource identifier of the reservation data structure, that the second meeting includes the identifier for the same meeting room identified in the first meeting;

determine, by executing a time-interval comparison operation on the first time period and second time period, that the second time period of the second meeting overlaps at least the portion of the first time period of the first meeting;

identify a scheduling conflict in response to determining that the second meeting includes the resource identifier for the same meeting room as the first meeting and in response to determining that the second time period of the second meeting overlaps at least the portion of the first time period of the first meeting;

in response to identifying the scheduling conflict, determine that the first meeting and the second meeting are arranged by a user or a delegate of the user;

reconcile the conflict in response to determining that the first meeting and the second meeting are arranged by the user or a delegate of the user, wherein the reconciliation includes:

allocating, by executing a modification operation on the reservation data structure, the meeting room for the first meeting and the second meeting, wherein the allocation restricts the meeting room from being scheduled by other users other than the user or a delegate of the user, and communicating a confirmation of a reservation for the meeting room to invitees included in the first meeting and the second meeting.

12. The system of claim 11, wherein the second time period is shorter than the first time period, wherein reconciling the conflict is further based on the second time period being shorter than the first time period.

13. The system of claim 11, wherein the instructions further cause the one or more processing units to:

determine that the second time period is not shorter than the first time period; and in response to determining that the second time period is not shorter than the first time period, allocate the meeting room to the first meeting during the first time period, restrict allocation of the meeting room for the second meeting during the overlapping portion of the second time period, and communicating a rejection of the meeting room reservation for the second meeting to invitees of the second meeting.

14. The system of claim 11, wherein the instructions further cause the one or more processing units to: in response to determining that the first request for the primary meeting and the second request for the second meeting are arranged by the user or the delegate of the user, copy permissions for meeting devices for facilitating communication of audio streams and video streams of a communication session, the permissions allowing the invitees from the primary meeting and the invitees from the second meeting to modify operating states of the meeting devices.

15. A computer-readable storage medium having encoded thereon computer-executable instructions that cause a data processing system to reconcile a meeting conflict caused by overlapping meetings assigned to a meeting room, the computer-executable instructions causing the one or more processing units of the data processing system to:

storing, in a reservation data structure in the memory, a first reservation record for a first meeting associated with a resource identifier for the meeting room and a first time period;

storing, in the reservation data structure, a second reservation record for a second meeting associated with the resource identifier and a second time period;

determine, by executing a resource comparison operation using the resource identifier of the reservation data structure, that the second meeting includes the identifier for the same meeting room identified in the first meeting;

determine, by executing a time-interval comparison operation on the first time period and second time period, that the second time period of the second meeting overlaps at least the portion of the first time period of the first meeting;

identify a scheduling conflict in response to determining that the second meeting includes the resource identifier for the same meeting room as the first meeting and in response to determining that the second time period of the second meeting overlaps at least the portion of the first time period of the first meeting;

in response to identifying the scheduling conflict, determine that the first meeting and the second meeting are arranged by a user or a delegate of the user;

reconcile the conflict in response to determining that the first meeting and the second meeting are arranged by the user or a delegate of the user, wherein the reconciliation includes:

allocating, by executing a modification operation on the reservation data structure, the meeting room for the first meeting and the second meeting, wherein the allocation restricts the meeting room from being scheduled by other users other than the user or a delegate of the user, and communicating a confirmation of a reservation for the meeting room to invitees included in the first meeting and the second meeting.

16. The computer-readable storage medium of claim 15, wherein the second time period is shorter than the first time period, and wherein reconciling the conflict further comprises determining that the second time period is contained within the first time period and permitting allocation of the meeting room to both the first meeting and the second meeting based on the second time period being shorter than the first time period.

17. The computer-readable storage medium of claim 15, wherein the instructions further cause the one or more processing units to:

determine that the first meeting is arranged by a first user;

determine that the second meeting is arranged by a second user;

determine that the second user is different from the first user and that the second user is not a delegate of the first user; and in response to determining that the second user is different from the first user and not a delegate of the first user;

allocating the meeting room for the first meeting during the first time period, restrict allocation of the meeting room second meeting during the the second time period communicating a rejection of the meeting room reservation for the second meeting to invitees of the second meeting.

18. The computer-readable storage medium of claim 15, wherein the instructions further cause the one or more processing units to:

determine that the second time period is not shorter than the first time period; and in response to determining that the second time period is not shorter than the first time period, allocate the meeting room to the first meeting during the first time period, restrict allocation of the meeting room for the second meeting during the overlapping portion of the second time period, and communicating a rejection of the meeting room reservation for the second meeting to invitees of the second meeting.

19. The computer-readable storage medium of claim 15, wherein the instructions further cause the one or more processing units to:

in response to determining that the first meeting and the second meeting are arranged by the user or the delegate of the user, copy call bridge information associated with the first meeting to the second, wherein invitees of the first meeting and invitees of the second meeting are granted permission to join a communication session using the call bridge information.

20. The computer-readable storage medium of claim 15, wherein the instructions further cause the one or more processing units to: in response to determining that the first request for the primary meeting and the second request for the second meeting are arranged by the user or the delegate of the user, copy permissions for meeting devices for facilitating communication of audio streams and video streams of a communication session, the permissions allowing the invitees from the primary meeting and the invitees from the second meeting to modify operating states of the meeting devices.

* * * * *